US011211069B2

(12) United States Patent
Nakamura

(10) Patent No.: US 11,211,069 B2
(45) Date of Patent: Dec. 28, 2021

(54) INFORMATION PROCESSING SYSTEM, INFORMATION PROCESSING METHOD, AND NON-TRANSITORY RECORDING MEDIUM

(71) Applicant: Ricoh Company, Ltd., Tokyo (JP)

(72) Inventor: Yutaka Nakamura, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 77 days.

(21) Appl. No.: 16/575,773

(22) Filed: Sep. 19, 2019

(65) Prior Publication Data

US 2020/0175982 A1 Jun. 4, 2020

(30) Foreign Application Priority Data

Nov. 30, 2018 (JP) .............................. JP2018-226147

(51) Int. Cl.
*G10L 15/22* (2006.01)
*G10L 15/30* (2013.01)

(52) U.S. Cl.
CPC .............. *G10L 15/22* (2013.01); *G10L 15/30* (2013.01); *G10L 2015/223* (2013.01)

(58) Field of Classification Search
USPC ...................................................... 704/1–504
See application file for complete search history.

(56) References Cited

U.S. PATENT DOCUMENTS

| 5,884,249 | A * | 3/1999 | Namba ................. G06F 40/268 704/9 |
| 6,253,184 | B1 * | 6/2001 | Ruppert ............. G03G 15/5016 704/272 |
| 6,865,284 | B2 * | 3/2005 | Mahoney ............. G06K 9/2063 283/72 |
| 8,510,115 | B2 * | 8/2013 | Sawano ................... G07C 9/37 704/275 |
| 8,589,156 | B2 * | 11/2013 | Burke ..................... G10L 15/32 704/231 |
| 9,383,956 | B2 * | 7/2016 | Chang ..................... H04W 4/12 |
| 2006/0009980 | A1 * | 1/2006 | Burke ..................... G10L 15/30 704/270 |

(Continued)

FOREIGN PATENT DOCUMENTS

| JP | 2003-051887 | 2/2003 |
| JP | 2003-131681 | 5/2003 |

(Continued)

OTHER PUBLICATIONS

U.S. Appl. No. 16/351,629, filed Mar. 13, 2019, Yutaka Nakamura.

*Primary Examiner* — Marcus T Riley

(74) *Attorney, Agent, or Firm* — Xsensus LLP

(57) ABSTRACT

An information processing system includes first circuitry and second circuitry. The first circuitry generates a processing command based on a recognition result of audio information acquired from a voice input device, and instructs the second circuitry to process process data based on the processing command. The second circuitry generates an execution command in response to the instruction from the first circuitry, and transmits the execution command to the information processing apparatus to instruct the information processing apparatus to execute processing of the process data.

16 Claims, 39 Drawing Sheets

(56) References Cited

U.S. PATENT DOCUMENTS

| | | | | |
|---|---|---|---|---|
| 2007/0061150 | A1* | 3/2007 | Sawano | G10L 17/00 |
| | | | | 704/275 |
| 2013/0109353 | A1* | 5/2013 | Chang | G06F 3/0482 |
| | | | | 455/411 |
| 2015/0081757 | A1* | 3/2015 | Yagi | H04L 67/325 |
| | | | | 709/201 |
| 2015/0186759 | A1* | 7/2015 | Braun | G06K 15/1811 |
| | | | | 358/1.18 |
| 2017/0208181 | A1* | 7/2017 | Kim | H04N 1/0023 |
| 2017/0359489 | A1* | 12/2017 | Lopez | H04N 1/6019 |
| 2018/0069962 | A1* | 3/2018 | Kato | H04L 12/1822 |
| 2019/0108494 | A1* | 4/2019 | Nelson | H04L 12/1831 |
| 2019/0108834 | A1* | 4/2019 | Nelson | G10L 15/22 |
| 2019/0273767 | A1* | 9/2019 | Nelson | H04L 65/403 |
| 2019/0354358 | A1* | 11/2019 | Nelson | G06N 5/022 |
| 2019/0355363 | A1* | 11/2019 | Nelson | G06F 9/44505 |
| 2020/0175982 | A1* | 6/2020 | Nakamura | H04N 1/00244 |

FOREIGN PATENT DOCUMENTS

| | | |
|---|---|---|
| JP | 2007-034462 | 2/2007 |
| JP | 2011-222046 | 11/2011 |

* cited by examiner

FIG. 10

| printColor | |
|---|---|
| ☑ Define synonyms ⓘ ☐ Allow automated expansion | |
| auto_color | auto_color |
| monochrome | monochrome, black and white |
| color | color, full color |
| two_color | two color |
| single color | single color |
| red_and_black | red and black |

FIG. 11

(a)
| Add user expression |
| --- |
| Please copy this with settings: two-color, double-sided, and 2 in 1. |
| Please copy this document with settings: Tray 1, fitting, and double-sided. |
| Make two copies of this document in dark monochrome. |
| Make three copies with 4 in 1. |
| Execute copy with settings: color and auto tray. |
| Please copy this document at 80% from Tray 1. |
| Copy dark on one side. |
| Copy dark in black and white. |

Action (b)
| copy |
| --- |

(c)
| | Entity | ENTITY ⓘ | VALUE |
| --- | --- | --- | --- |
| ☐ | copies | @copies | Scopies |
| ☐ | paperTray | @paperTray | SpaperTray |
| ☐ | magnification | @magnification | Smagnification |
| ☐ | printColor | @printColor | SprintColor |
| ☐ | printSide | @printSide | SprintSide |
| ☐ | combine | @combine | Scombine |
| ☐ | density | @density | Sdensity |
| | ⋮ | ⋮ | ⋮ |

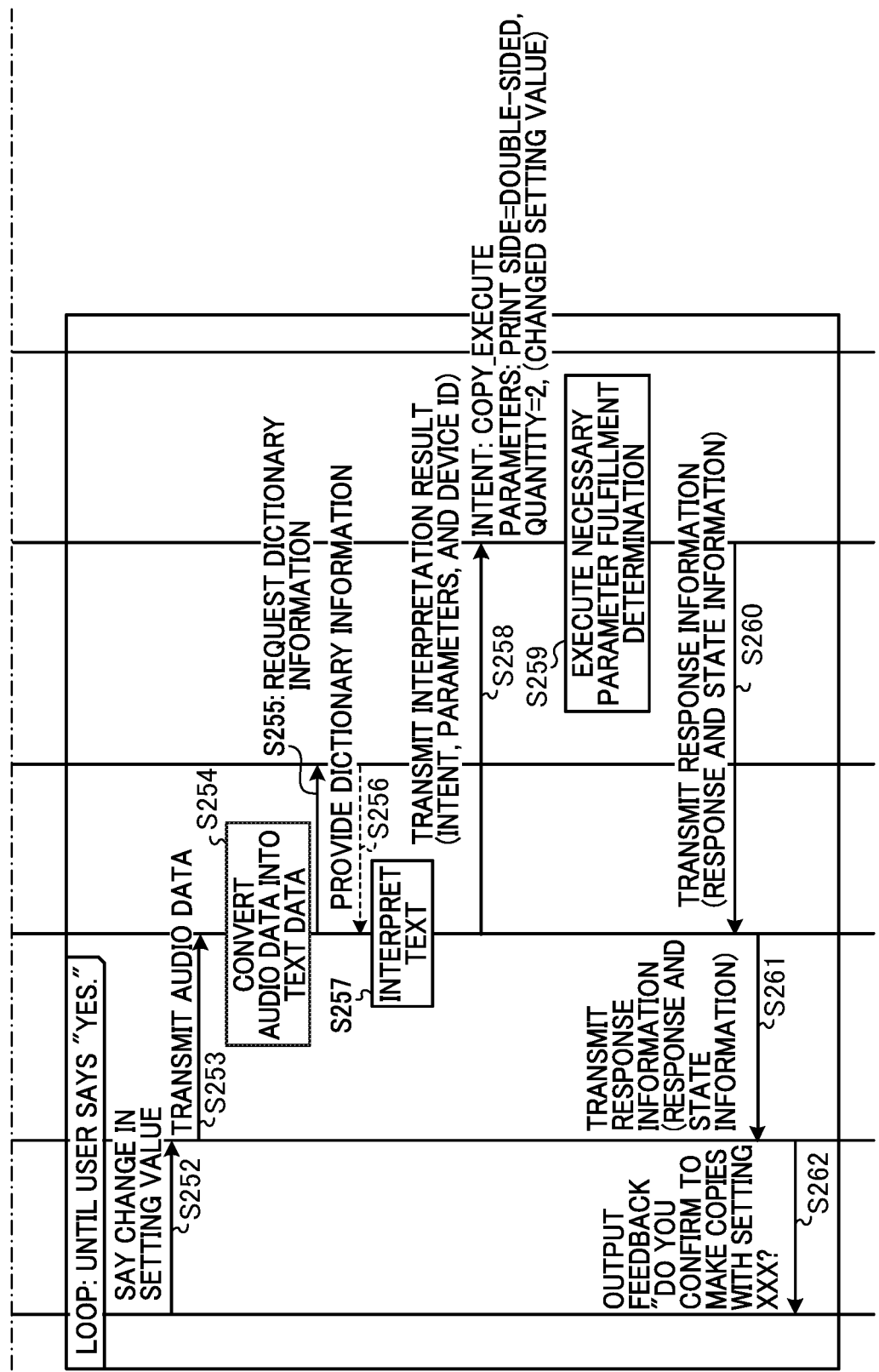

INFORMATION PROCESSING SYSTEM, INFORMATION PROCESSING METHOD, AND NON-TRANSITORY RECORDING MEDIUM

CROSS-REFERENCE TO RELATED APPLICATION

This patent application is based on and claims priority pursuant to 35 U.S.C. § 119(a) to Japanese Patent Application No. 2018-226147 filed on Nov. 30, 2018 in the Japan Patent Office, the entire disclosure of which is hereby incorporated by reference herein.

BACKGROUND

Technical Field

The present invention relates to an information processing system, an information processing method, and a non-transitory recording medium.

Description of the Related Art

Nowadays, there are an artificial intelligence (AI) voice assistant technology enabling operation of an apparatus with voice and smart household appliances operable with voice. The field of voice operation is expected to further grow.

According to an existing control system, audio data acquired by a mobile terminal is transmitted to a server, which converts the audio data into a control command and transmits the control command to an apparatus.

SUMMARY

In one embodiment of this invention, there is provided an improved information processing system that includes, for example, first circuitry and second circuitry. The first circuitry generates a processing command based on a recognition result of audio information acquired from a voice input device, and instructs the second circuitry to process process data based on the processing command. The second circuitry generates an execution command in response to the instruction from the first circuitry, and transmits the execution command to the information processing apparatus to instruct the information processing apparatus to execute processing of the process data.

In one embodiment of this invention, there is provided an improved information processing method that includes, for example: using first circuitry, generating a processing command based on a recognition result of audio information acquired from a voice input device; using the first circuitry, instructing second circuitry to process process data based on the processing command; using the second circuitry, generating an execution command in response to the instruction from the first circuitry; and using the second circuitry, transmitting the execution command to the information processing apparatus to instruct the information processing apparatus to execute processing of the process data.

In one embodiment of this invention, there is provided a non-transitory recording medium storing a plurality of instructions which, when executed by one or more processors, cause the processors to perform the above-described information processing method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 10 is a diagram illustrating an example of entity information used to interpret input user voice in the voice operation system of the first embodiment;

FIG. 11 is a diagram illustrating an example of entity information registered based on an utterance phrase in the voice operation system of the first embodiment;

FIGS. 28A and 28B are sequence diagrams illustrating a procedure of a quantity setting operation performed in the voice operation system of the second embodiment;

Figure 1:
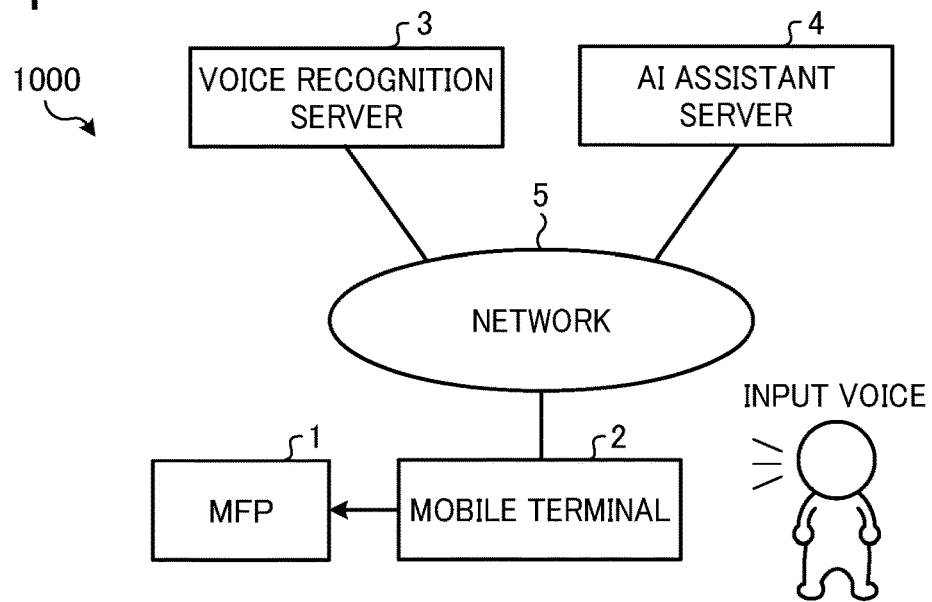
FIG. 1 is a system configuration diagram of a voice operation system of a first embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. In the drawings illustrating embodiments of the present invention, members or components having the same function or shape will be denoted with the same reference numerals to avoid redundant description.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

The following description will be given of voice operation systems according to embodiments of the present invention as application examples of an information processing system, an information processing method, and a non-transitory recording medium of the present invention.

A first embodiment of the present invention will be described.

A system configuration of a voice operation system 1000 of the first embodiment will first be described.

FIG. 1 is a system configuration diagram of the voice operation system 1000 of the first embodiment. As illustrated in FIG. 1, in the voice operation system 1000 of the first embodiment, a multifunction peripheral (MFP) 1, a mobile terminal 2, a voice recognition server 3, and an artificial intelligence (AI) assistant server 4 are connected to each other via a predetermined network 5 such as a local area network (LAN), for example. The MFP 1 is an example of an information processing apparatus. The mobile terminal 2 is an example of an information processing device, such as a smart phone or a tablet terminal. The mobile terminal 2 is provided with a voice input device, such as a microphone, which receives voice input from a user. The information processing apparatus is not limited to the MFP, and may be a different type of electronic apparatus, which includes office equipment such as an electronic whiteboard or a projector. The voice recognition server 3 corresponds to a first server, and the AI assistant server 4 corresponds to a second server.

The mobile terminal 2 receives voice input from a user for a voice operation of the MFP 1, and outputs audio feedback to the user in response to an operation received from the user. The mobile terminal 2 further relays data communication (e.g., text data communication) between the voice recognition server 3 and the AI assistant server 4.

The voice recognition server 3 analyzes audio data received from the mobile terminal 2, and converts the audio data into text data. The AI assistant server 4 analyzes the text data, converts the text data into a job execution command to the MFP 1, and transmits the job execution command to the mobile terminal 2. The job execution command represents a previously registered user intention.

The MFP 1 executes a job in accordance with the job execution command transmitted from the mobile terminal 2. The mobile terminal 2 may perform wired or wireless communication with the MFP 1. That is, the mobile terminal 2 may be an operation terminal physically connected to the MFP 1 via a cable or any desired communication line.

In the present example, the voice operation system 1000 includes two servers: the voice recognition server 3 and the AI assistant server 4. Alternatively, the voice recognition server 3 and the AI assistant server 4 may be physically implemented as one server or as three or more servers.

A hardware configuration of the MFP 1 of the first embodiment will be described.

Figure 2:
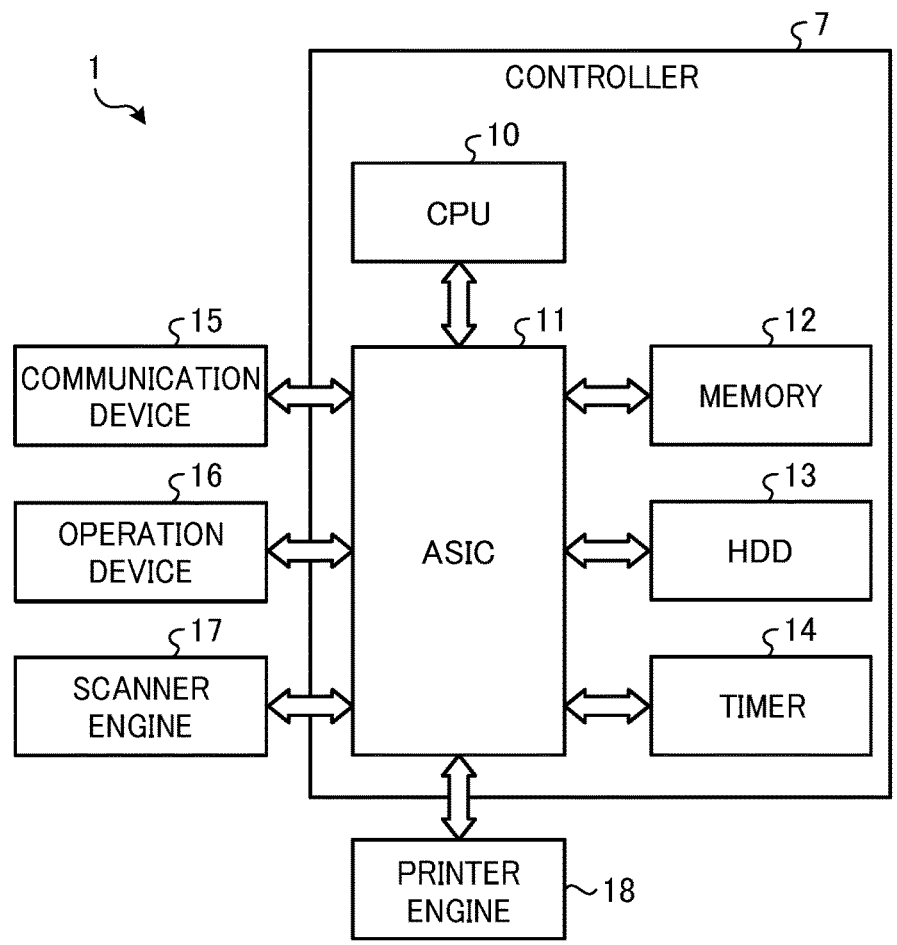
FIG. 2 is a hardware configuration diagram of a multifunction peripheral (MFP) included in the voice operation system of the first embodiment.

The MFP 1 has a plurality of functions such as a printer function and a scanner function, for example. As illustrated in FIG. 2, the MFP 1 includes a controller 7, a communication device 15, an operation device 16, a scanner engine 17, and a printer engine 18.

The controller 7 includes a central processing unit (CPU) 10, an application specific integrated circuit (ASIC) 11, a memory 12, a hard disk drive (HDD) 13, and a timer 14, which are communicably connected to each other via a bus line.

The communication device 15 is connected to the network 5, and acquires the job execution command, such as a scan instruction or a print instruction, for example, which is input in voice via the mobile terminal 2, as described later.

The operation device 16 is implemented as a touch panel integrating a liquid crystal display (LCD) and a touch sensor. When issuing a command for executing a desired operation with the operation device 16, the user specifies the desired operation by touching and operating an operation button (i.e., a software key) displayed on the operation device 16.

The scanner engine 17 controls a scanner to optically read a document. The printer engine 18 controls an image writing device to print an image on a transfer sheet, for example. The CPU 10 performs overall control of the MFP 1, which functions as an image forming apparatus. The ASIC 11 is a large-scale integration (LSI) circuit that performs various image processing for images to be processed by the scanner engine 17 and the printer engine 18. Each of the scanner engine 17 and the printer engine 18 is a functional unit that executes the job in accordance with the job execution command acquired from the mobile terminal 2.

The memory 12 stores various applications to be executed by the CPU 10 and various data for use in the execution of the applications. The HDD 13 stores image data, various programs, font data, and various files, for example. The controller 7 may include a solid state drive (SSD) in place of or in addition to the HDD 13.

A hardware configuration of the mobile terminal 2 will be described.

Figure 3:
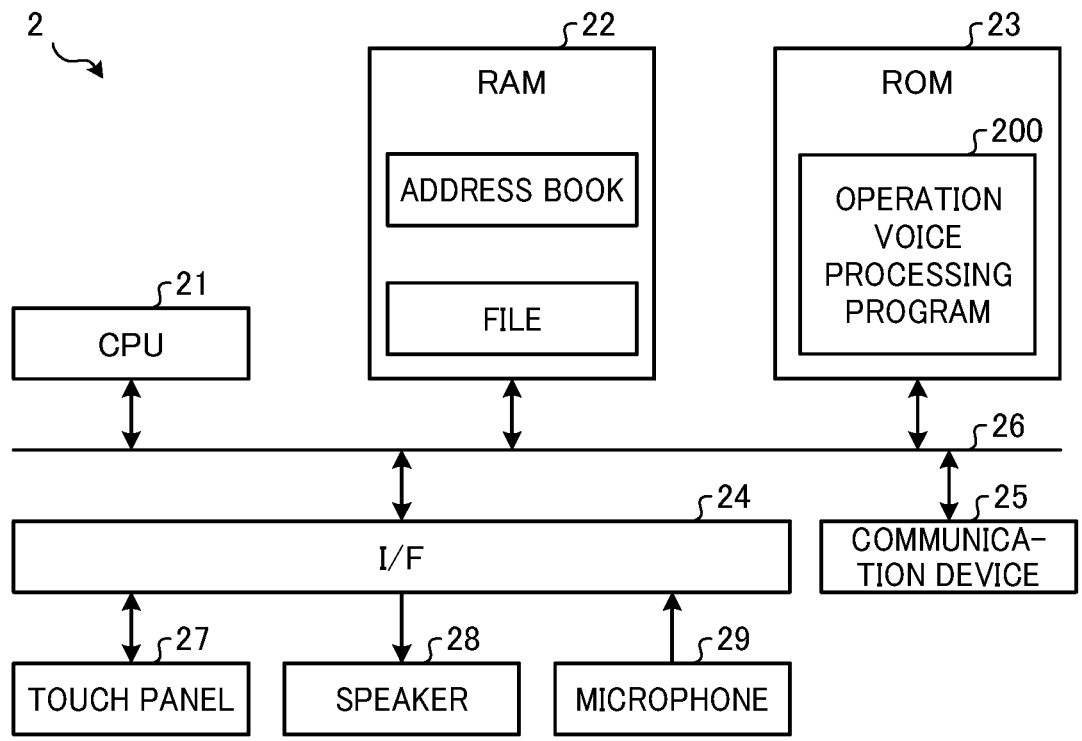
FIG. 3 is a hardware configuration diagram of a mobile terminal included in the voice operation system of the first embodiment.

As illustrated in FIG. 3, the mobile terminal 2 includes a CPU 21, a random access memory (RAM) 22, a read only memory (ROM) 23, an interface (I/F) 24, and a communication device 25, which are connected to each other via a bus line 26.

The RAM 22 stores an address book storing an electronic mail address of a user as the transmission destination of an electronic mail and a scanned image, for example. The RAM 22 further stores a file containing image data to be printed, for example.

The ROM 23 stores an operation voice processing program 200. The CPU 21 executes the operation voice processing program 200 to enable a voice input operation of the MFP 1.

The I/F 24 is connected to a touch panel 27, a speaker 28, and a microphone 29.

The microphone 29 collects (i.e., acquires) voice in telephone conversation and voice input to issue the job execution command to the MFP 1. The input voice is transmitted to the voice recognition server 3 via the communication device 25, and is converted into text data.

A hardware configuration of the voice recognition server 3 will be described.

Figure 4:
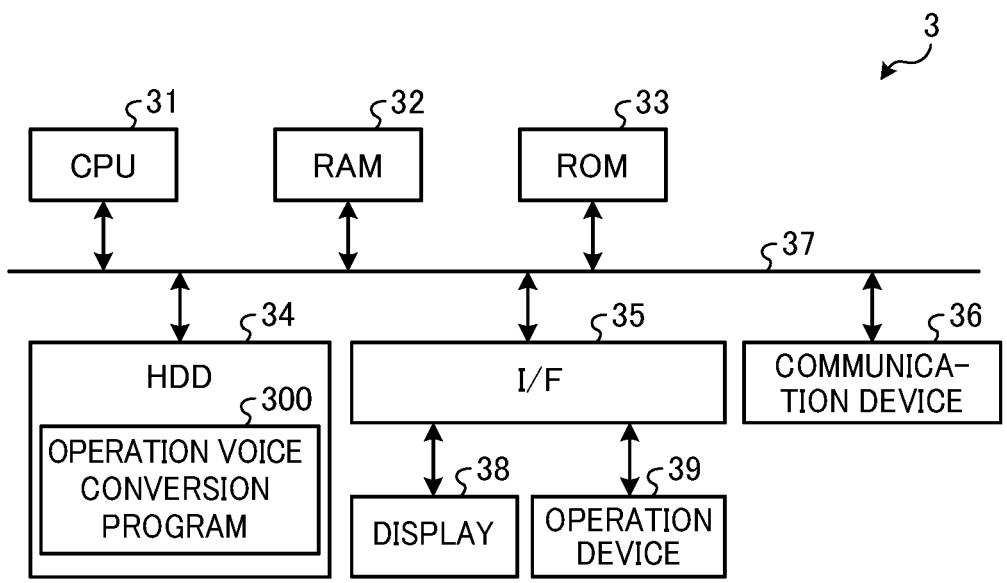
FIG. 4 is a hardware configuration diagram of a voice recognition server included in the voice operation system of the first embodiment.

As illustrated in FIG. 4, the voice recognition server 3 includes a CPU 31, a RAM 32, a ROM 33, an HDD 34, an I/F 35, and a communication device 36, which are connected to each other via a bus line 37. The I/F 35 is connected to a display 38 and an operation device 39. The HDD 34 stores an operation voice conversion program 300 for converting audio data into text data. The CPU 31 executes the operation voice conversion program 300 to convert the audio data transmitted from the mobile terminal 2 into text data, and transmits the text data to the mobile terminal 2.

A hardware configuration of the AI assistant server 4 will be described.

Figure 5:
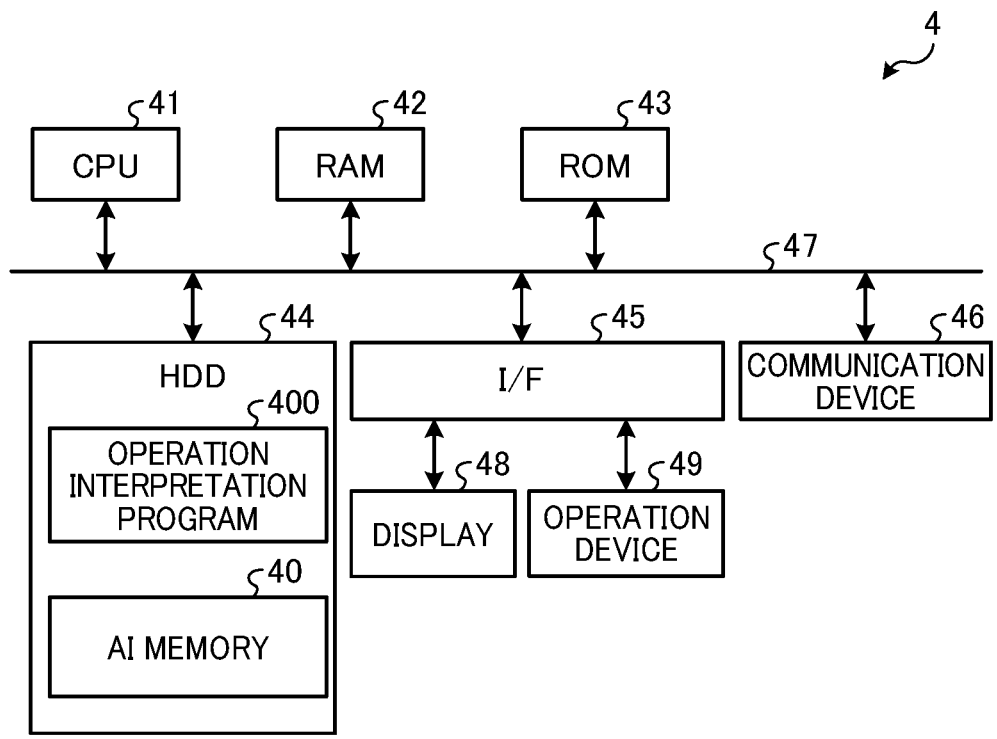
FIG. 5 is a hardware configuration diagram of an artificial intelligence (AI) assistant server included in the voice operation system of the first embodiment.

As illustrated in FIG. 5, the AI assistant server 4 includes a CPU 41, a RAM 42, a ROM 43, an HDD 44, an I/F 45, and a communication device 46, which are connected to each other via a bus line 47. The I/F 45 is connected to a display 48 and an operation device 49. The HDD 44 stores an operation interpretation program 400 for interpreting the job specified by the user. Further, the HDD 44 includes an AI memory 40. The CPU 41 executes the operation interpretation program 400 to interpret the job specified by the user based on the text data generated through the conversion performed by the voice recognition server 3. The result of interpretation is transmitted to the mobile terminal 2. The mobile terminal 2 converts the interpretation result into a job execution command, and provides the job execution command to the MFP 1. Thereby, the MFP 1 is operated with the voice input via the mobile terminal 2.

Functions of the mobile terminal 2 will be described.

Figure 6:
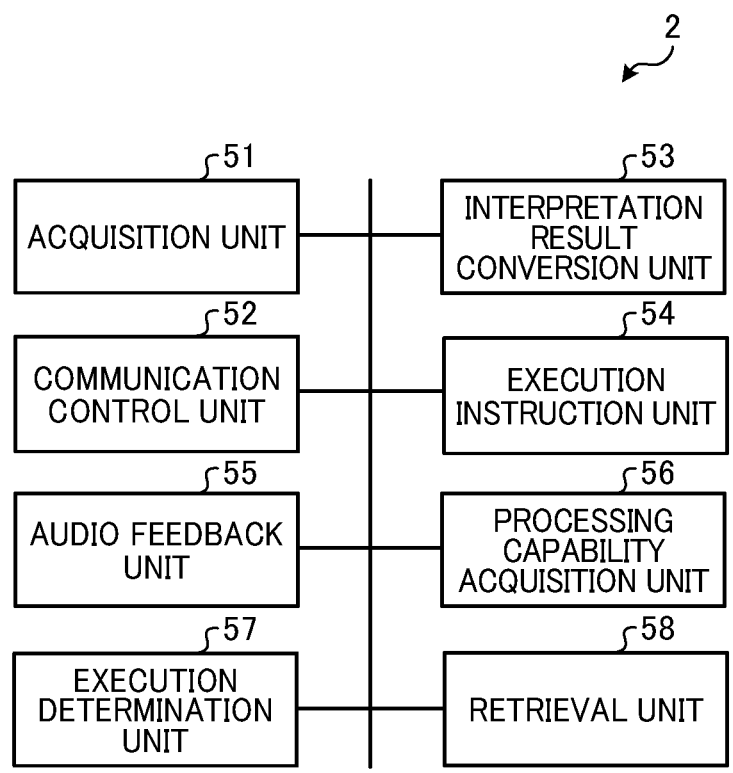
FIG. 6 is a functional block diagram of the mobile terminal in the voice operation system of the first embodiment.

The CPU 21 of the mobile terminal 2 executes the operation voice processing program 200 stored in the ROM 23, to thereby function as an acquisition unit 51, a communication control unit 52, an interpretation result conversion unit 53, an execution instruction unit 54, an audio feedback unit 55, a processing capability acquisition unit 56, an execution determination unit 57, and a retrieval unit 58, as illustrated in FIG. 6.

The acquisition unit 51 acquires the voice of the user collected via the microphone 29, i.e., the instruction voice of the user for the voice operation of the MFP 1. The communication control unit 52 controls the communication between the mobile terminal 2 and the MFP 1, the communication between the mobile terminal 2 and the voice recognition server 3, and the communication between the mobile terminal 2 and the AI assistant server 4. The interpretation result conversion unit 53 converts the interpretation result, which is obtained by the AI assistant server 4 from the text data of the instruction voice of the user, into a job execution command to the MFP 1. The execution instruction unit 54 transmits the job execution command to the MFP 1, to thereby instruct the MFP 1 to execute the job.

The audio feedback unit 55 outputs audio feedback for prompting the user to input missing data or audio feedback for prompting the user to confirm the input, for example, to implement an interactive voice input operation. The processing capability acquisition unit 56 acquires from the MFP 1 the processing capability thereof, such as the maximum processable pixel number, for example. The execution determination unit 57 compares the capability of the MFP 1 with the job specified by the user, to thereby determine whether the job specified by the user is executable with the MFP 1. The retrieval unit 58 retrieves, from a memory such as the RAM 22, the address or file specified in the voice instruction from the user.

In the present example, the acquisition unit 51, the communication control unit 52, the interpretation result conversion unit 53, the execution instruction unit 54, the audio feedback unit 55, the processing capability acquisition unit 56, the execution determination unit 57, and the retrieval unit 58 are implemented by software. Alternatively, a part or all of these units may be implemented by hardware such as an integrated circuit (IC). Further, the functions of these units may be implemented by the single operation voice processing program 200. Further, a part of the processing of these units may be executed by another program, or may be indirectly executed with another program. For example, the acquisition of information such as the processing capability of the MFP 1 may be executed by another program, and the processing capability acquisition unit 56 may acquire the information thus acquired by the another program, to thereby indirectly acquire the information stored in the MFP 1.

Functions of the voice recognition server 3 will be described.

Figure 7:
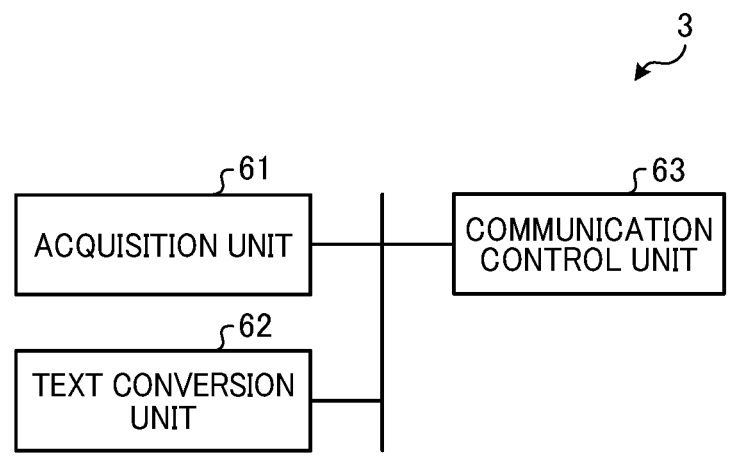
FIG. 7 is a functional block diagram of the voice recognition server in the voice operation system of the first embodiment.

The CPU 31 of the voice recognition server 3 executes the operation voice conversion program 300 stored in the HDD 34, to thereby function as an acquisition unit 61, a text conversion unit 62, and a communication control unit 63, as illustrated in FIG. 7. The acquisition unit 61 acquires the audio data of the input voice of the user transmitted from the mobile terminal 2. The text conversion unit 62 converts the audio data of the input voice of the user into text data. The communication control unit 63 controls the communication of the communication device 36 to receive the audio data of the input voice of the user and transmit the text data to the mobile terminal 2.

In the present example, the acquisition unit 61, the text conversion unit 62, and the communication control unit 63 are implemented by software. Alternatively, a part or all of these units may be implemented by hardware such as an IC. Further, the functions of these units may be implemented by the single operation voice conversion program 300. Further, a part of the processing of these units may be executed by another program, or may be indirectly executed with another program.

Functions of the AI assistant server 4 will be described.

Figure 8:
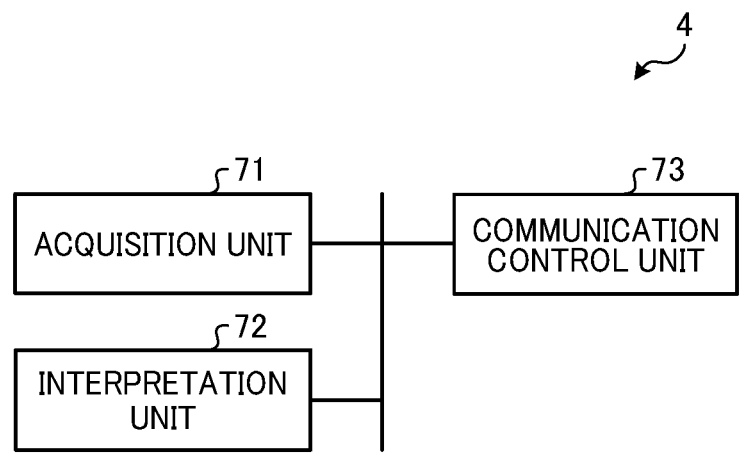
FIG. 8 is a functional block diagram of the AI assistant server in the voice operation system of the first embodiment.

The CPU 41 of the AI assistant server 4 executes the operation interpretation program 400 stored in the HDD 44, to thereby function as an acquisition unit 71, an interpretation unit 72, and a communication control unit 73, as illustrated in FIG. 8. The acquisition unit 71 acquires the text data converted from the audio data of the input voice of the user transmitted from the mobile terminal 2. The interpretation unit 72 interprets the operation instruction from the user based on the text data. The communication control unit 73 controls the communication of the communication device 46 to transmit the interpretation result to the mobile terminal 2 of the user and receive the text data converted from the audio data of the input voice of the user.

In the present example, the acquisition unit 71, the interpretation unit 72, and the communication control unit 73 are implemented by software. Alternatively, a part or all of these units may be implemented by hardware such as an IC. Further, the functions of these units may be implemented by the single operation interpretation program 400. Further, a part of the processing of these units may be executed by another program, or may be indirectly executed with another program.

Each of the operation voice processing program 200, the operation voice conversion program 300, and the operation interpretation program 400 may be provided as recorded on a computer-readable recording medium, such as a compact disc (CD)-ROM or a flexible disk (FD), in an installable or executable file format. Further, the program may be provided as recorded on a computer-readable recording medium, such as a CD-recordable (R), a digital versatile disk (DVD), a Blu-ray disc (registered trademark), or a semiconductor memory. Further, the program may be installed in the corresponding device or apparatus via a network such as the Internet, or may be previously stored in a ROM or another memory of the device or apparatus.

An overall procedure of the voice input operation will be described.

Figure 9:
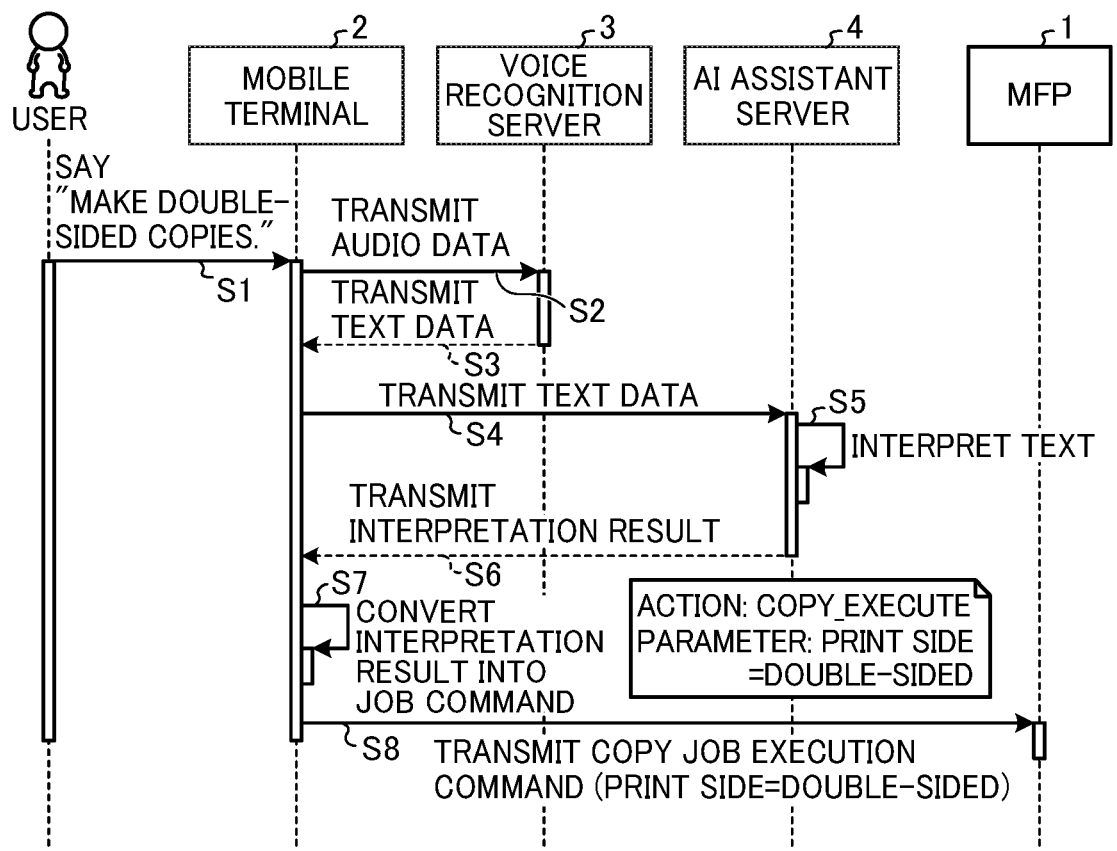
FIG. 9 is a sequence diagram illustrating an overall procedure of a voice operation performed in the voice operation system of the first embodiment.

FIG. 9 illustrates an overall procedure of the voice input operation performed in the voice operation system 1000 of the first embodiment. FIG. 9 illustrates an example in which the voice input operation is performed via the mobile terminal 2 to implement a duplex copy function of the MFP 1. In this case, the user starts the operation voice processing program 200 of the mobile terminal 2, and says "Make double-sided copies," for example. The microphone 29 of the mobile terminal 2 collects the voice of the user, and the acquisition unit 51 acquires the collected voice of the user (step S1). Then, the communication control unit 52 of the mobile terminal 2 controls the communication device 25 to transmit audio data of the utterance "Make double-sided copies" to the voice recognition server 3, to thereby request the voice recognition server 3 to convert the audio data into text data (step S2).

In the voice recognition server 3, the text conversion unit 62 converts the audio data of the utterance "Make double-sided copies" into text data. Then, the communication control unit 63 controls the communication device 36 to transmit the text data obtained through the conversion to the mobile terminal 2 (step S3). In the mobile terminal 2, the communication control unit 52 transmits the text data of the utterance "Make double-sided copies" to the AI assistant server 4 (step S4).

In the present example, the interpretation unit 72 of the AI assistant server 4 interprets that the operation that the MFP 1 is requested to execute is copy (i.e., ACTION: COPY_EXECUTE), and that the print side is double-sided (i.e., PRINT SIDE=DOUBLE-SIDED) (step S5). The interpretation unit 72 thus generates an interpretation result based on the text data. The interpretation result represents the type (i.e., action) and contents (i.e., parameters) of the job specified by the user. The communication control unit 63 of the AI assistant server 4 transmits the interpretation result to the mobile terminal 2 via the communication device 46 (step S6).

In the mobile terminal 2, the interpretation result conversion unit 53 converts the interpretation result received from the AI assistant server 4 into a job execution command to the MFP 1 (step S7). TABLE 1 given below illustrates examples of the interpretation result and the job execution command converted from the interpretation result. Information similar to that illustrated in TABLE 1 may be stored in a memory of the mobile terminal 2 such that the interpretation result conversion unit 53 refers to the stored information to convert the interpretation result into the job execution command.

TABLE 1

| Name | Value | Processing of operation voice processing program |
|---|---|---|
| Action | COPY_EXECUTE | Execute copy job |
| | SCAN_EXECUTE | Execute scan job |
| | PRINT_EXECUTE | Execute print job |
| | FAX_EXECUTE | Execute FAX job |
| Parameter | PRINT SIDE | Change setting value of print side |
| | QUANTITY | Change setting value of quantity |
| | *Other parameters specifiable as job setting values | |

In the examples of TABLE 1, "COPY_EXECUTE," "SCAN_EXECUTE," "PRINT_EXECUTE," and "FAX_EXECUTE" are given as examples of the action, and "PRINT SIDE" and "QUANTITY" are given as examples of the parameter. Examples of the parameter include all other parameters specifiable as job setting values.

The interpretation result conversion unit 53 of the mobile terminal 2 converts the interpretation result of the action "COPY_EXECUTE" into a job execution command to the MFP 1 to execute a copy job. The interpretation result conversion unit 53 similarly converts the interpretation result of the action "SCAN_EXECUTE" into a job execution command to the MFP 1 to execute a scan job, converts the interpretation result of the action "PRINT_EXECUTE" into a job execution command to the MFP 1 to execute a print job, and converts the interpretation result of the action "FAX_EXECUTE" into a job execution command to the MFP 1 to execute a facsimile (FAX) job.

If the interpretation result includes the parameter "PRINT SIDE," the interpretation result conversion unit 53 of the mobile terminal 2 generates a job execution command to the MFP 1 to change the setting value of the print side. Similarly, if the interpretation result includes the parameter "QUANTITY," the interpretation result conversion unit 53 generates a job execution command to the MFP 1 to change the setting value of the quantity.

That is, the interpretation result conversion unit 53 of the mobile terminal 2 converts the interpretation result into the job execution command by determining the type of job to be executed by the MFP 1 based on the information included in the action of the interpretation result and determining the value included in the parameter of the interpretation result as the job setting value.

The communication control unit 52 of the mobile terminal 2 controls the communication device 25 to transmit the thus-generated job execution command to the MFP 1 (step S8). In the present example, a job execution command "COPY_EXECUTE (PRINT SIDE=DOUBLE-SIDED)" is transmitted to the MFP 1. Thereby, the MFP 1 executes duplex copying.

Details of the interpretation operation in the AI assistant server 4 will be described.

The AI memory 40 in the HDD 44 of the AI assistant server 4 stores AI assistant service information for interpreting the job specified in the input voice of the user. The AI assistant service information includes entity information, action information, and intent information. The entity information associates a parameter of a job with a natural language. It is possible to register a plurality of synonyms for one parameter. The action information represents the type of the job. The intent information associates a phrase uttered by the user in the natural language with the entity information, and associates the phrase uttered by the user in the natural language with the action information. The intent information enables correct interpretation even if the order of utterance of the parameter or the nuance of the parameter is somewhat changed. The intent information further enables response text of the interpretation result to generated based on the input data.

FIG. 10 illustrates an example of the entity information, specifically the entity information corresponding to print color. In FIG. 10, a character string "printColor" represents the entity name, and character strings on the left side such as "auto_color," "monochrome," and "color" represent parameter names. Further, in FIG. 10, phrases on the right side such as "auto_color," "monochrome, black and white" and "color, full color" represent synonyms.

As understood from FIG. 10, a parameter and synonyms thereof are stored in association with each other as the entity information. That is, the synonyms are registered as well as the parameter. For example, therefore, when issuing an instruction to make monochrome copies, both utterances "Please make black-and-white copies" and "Please make monochrome copies" enable parameter setting.

In FIG. 11, (a) illustrates exemplary user utterance phrases, (b) illustrates an exemplary action name, and (c) illustrates exemplary entity information. As illustrated in (a) to (c) of FIG. 11, one of the user utterance phrases is dragged on a screen displayed on the display 48 of the AI assistant server 4, as indicated by the arrow in FIG. 11, through the operation of the operation device 49. Alternatively, one of the user utterance phrases may be dragged on a screen displayed on a display of an apparatus having accessed the AI assistant server 4 via a network through the operation of an operation device of the apparatus.

The entity information to be associated with the corresponding information is thus selected. Further, if the value is set in the selected entity information, the parameter included in the response is changed. For example, if the value is set as "SprintColor" for the utterance "Please make black-and-white copies," "printColor=monochrome" is returned as the return value. If the value is set as "SprintColor.original," "printColor=black and white" is returned as the return value, and the same contents as those of the user utterance are returned as the parameter in the response.

An interactive operation will be described

The voice operation system 1000 of the first embodiment implements an interactive system that responds to user input. Specifically, the voice operation system 1000 of the first embodiment implements an interactive MFP operation system by outputting two types of responses: input lack feedback and input confirmation feedback, as well as responses with fixed sentences for interaction, as the responses to the operation of the MFP 1.

The input lack feedback is a response output when the information for use in executing the job is incomplete. The input lack feedback is output when the result of user input is not recognized or when a necessary parameter is missing (i.e., unspecified). That is, it is unnecessary to output the input lack feedback when a parameter other than the necessary parameter is unspecified. The input lack feedback may be applied not only to the process of checking with the user about the parameter but also to the process of checking with the user about the function to be used such as the copy function or the scan function.

For example, the functions and parameters to be checked with the user may be changed depending on the type of the information processing apparatus currently in communication with the mobile terminal 2. In this case, the processing capability acquisition unit 56 may acquire information of the type and functions of the information processing apparatus at a predetermined time after the communication with the information processing apparatus is established, and the audio feedback unit 55 may determine the functions and parameters to be checked with the user based on the acquired information, for example. If the type of the information processing apparatus is the MFP, for example, the functions of the MFP 1, such as the copy function, the print function, the scan function, and the FAX function, may be checked with the user. Further, which one of the functions of the MFP 1, such as the copy function, the print function, the scan function, and the FAX function, is to be used may be checked with the user.

The input confirmation feedback is a response output when the information for use in executing the job is complete. That is, the input confirmation feedback is output when all necessary parameters are specified. Further, the input confirmation feedback is output to prompt the user to select between executing the job with the current setting values and changing the setting values. To check with the user whether to execute the job with the current setting values, each of the parameters specified by the user may be output as sound regardless of whether the parameter is a necessary parameter or not.

Figure 12:
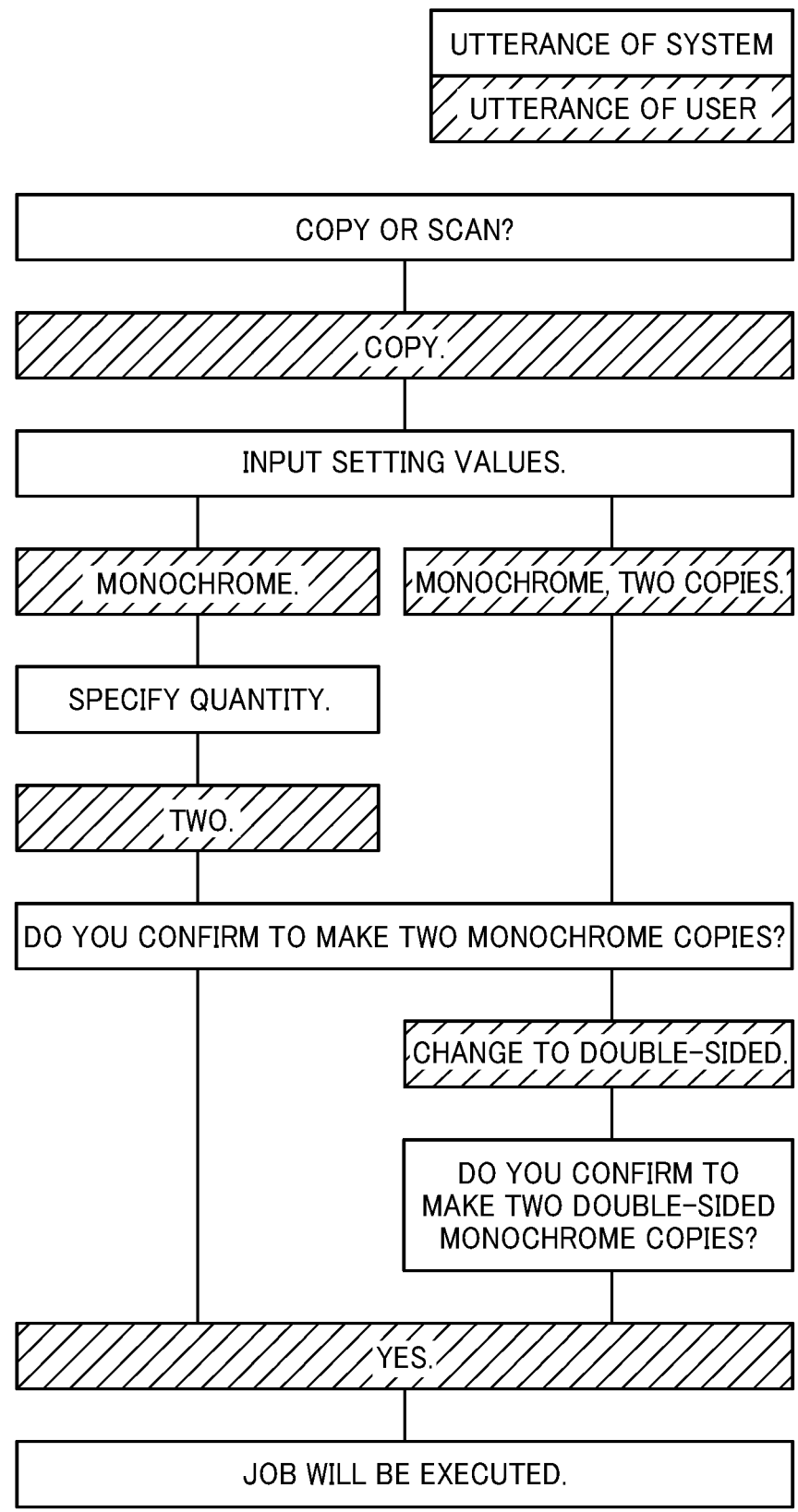
FIG. 12 is a diagram illustrating a procedure of an interactive input operation performed in the voice operation system of the first embodiment.

FIG. 12 illustrates an example of the interactive operation between the voice operation system 1000 and the user including the above-described feedback. In the example of FIG. 12, the MFP 1 is operated to make two double-sided monochrome copies. In this example, the quantity (i.e., two) is a necessary parameter. However, the necessary parameter is not limited to the quantity, and a plurality of parameters such as monochrome, color, and sheet size may be set as necessary parameters.

Information about which one of the parameters is a necessary parameter may be previously stored in a memory of the AI assistant server 4, and may be changed as appropriate by the user operating the operation device 49 or accessing the AI assistant server 4 via the network 5.

In the example of FIG. 12, utterances of the user are described in the hatched blocks, and utterances of the voice operation system 1000 are described in the white blocks. In response to audio output "Copy or scan?" from the voice operation system 1000, the user responds with an utterance "Copy" to instruct the voice operation system 1000 to execute the copy function. The voice operation system 1000 then outputs audio feedback "Input setting values" to prompt the user to input the setting values for the copy function specified by the user.

The user responds to this feedback with an utterance "Monochrome," for example. In the present example, the number of copies (i.e., quantity) is a necessary parameter, as described above. Therefore, the voice operation system 1000 prompts the user to input the number of copies with a message such as "Specify quantity." This is an example of the input lack feedback. In response to the input lack feedback, the user specifies the number of copies with an utterance such as "Two." Thereby, the unspecified necessary parameter is input, and the voice operation system 1000 responds with a message "Do you confirm to make two monochrome copies?" to prompt the user to issue a copy start instruction. This is an example of the input confirmation feedback output when the necessary information for job execution is complete.

If the user responds to the audio output "Input setting values" from the voice operation system 1000 with an utterance "Monochrome, two copies," the necessary information for job execution is complete. In this case, therefore, the voice operation system 1000 outputs the input confirmation feedback with the above-described message "Do you confirm to make two monochrome copies?"

To change the copy condition from simplex copy to duplex copy, the user performs voice input with an utterance "Change to double-sided." In this case, the necessary information for job execution is complete. Thus, the voice operation system 1000 outputs the input confirmation feedback with a message "Do you confirm to make two double-sided monochrome copies?"

The user then responds with an utterance "Yes" to the input confirmation feedback with the message "Do you confirm to make two monochrome copies?" or "Do you confirm to make two double-sided monochrome copies?" Then, the voice operation system 1000 responds with a message "Job will be executed," and executes the job specified by the user.

A procedure of the interactive input operation will be described.

Figure 13:
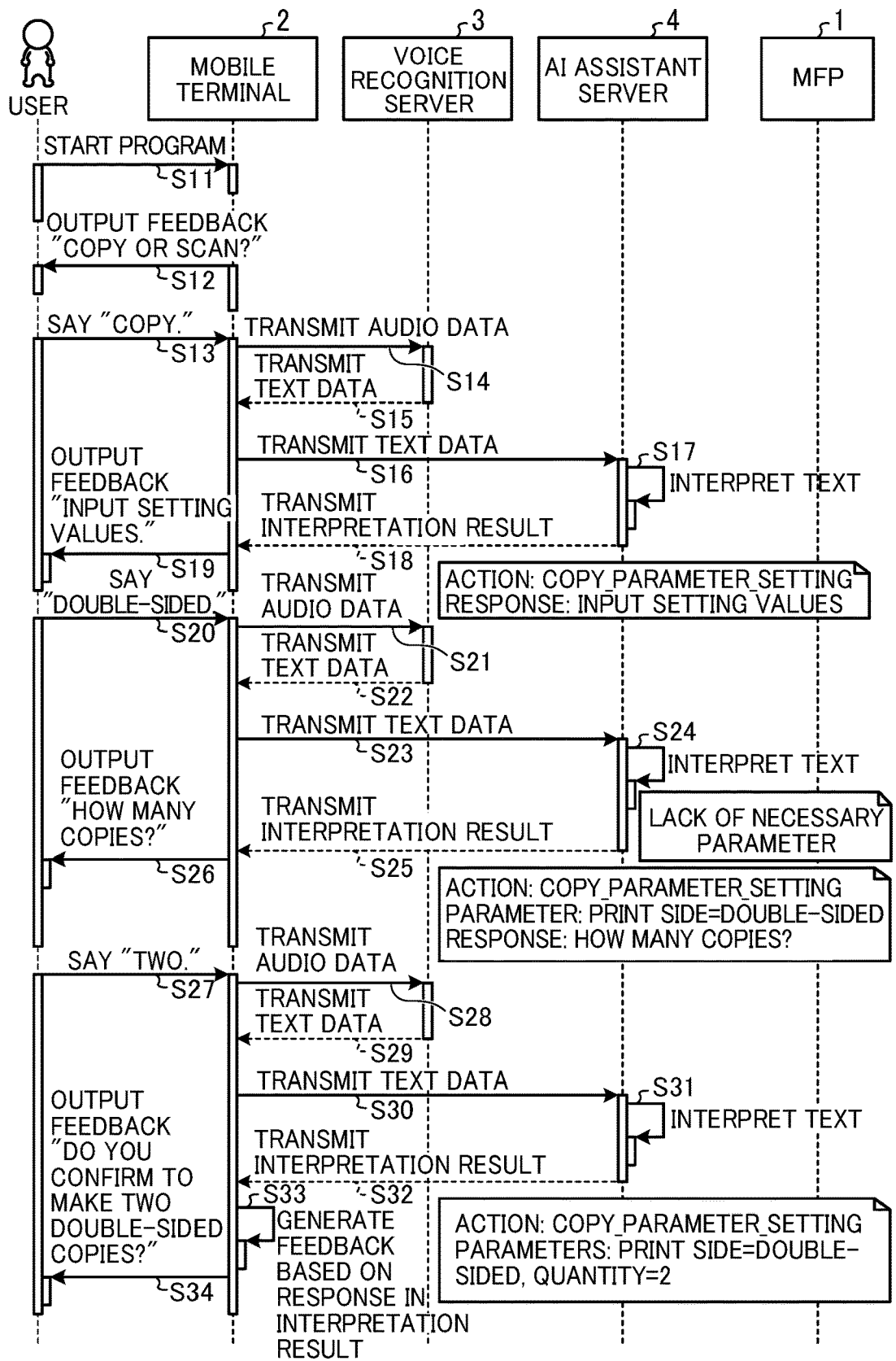
FIG. 13 is a sequence diagram illustrating a first part of a procedure of the interactive input operation performed in the voice operation system of the first embodiment.
Figure 14:
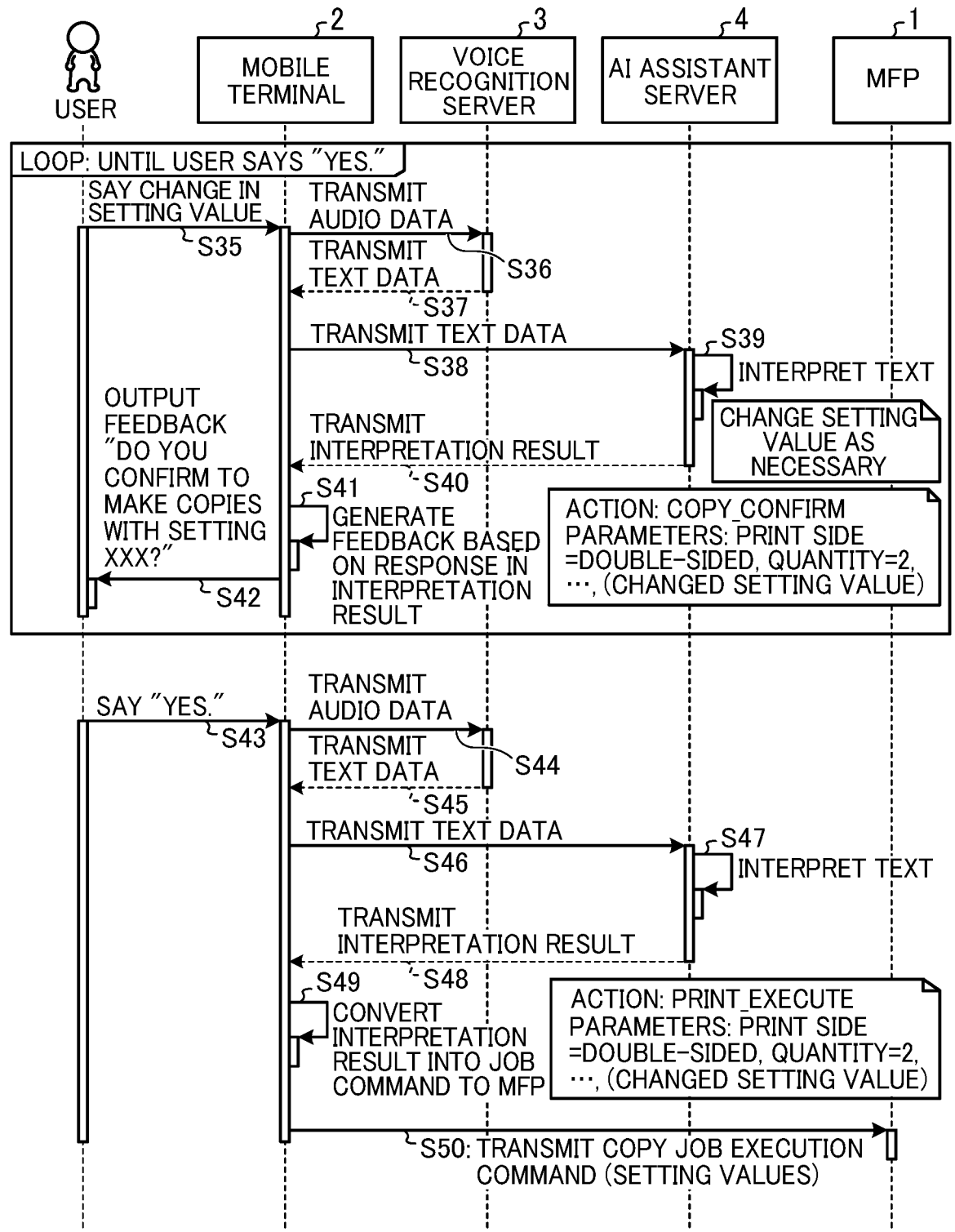
FIG. 14 is a sequence diagram illustrating a latter part of the procedure of the interactive input operation performed in the voice operation system of the first embodiment.

FIGS. 13 and 14 are sequence diagrams illustrating a procedure of the above-described interactive input operation. The sequence diagram of FIG. 13 illustrates a first part of the procedure of the interactive input operation, and the sequence diagram of FIG. 14 illustrates a latter part of the procedure of the interactive input operation.

The user first performs an operation of starting the operation voice processing program 200 of the mobile terminal 2 (step S11), and the audio feedback unit 55 of the mobile terminal 2 outputs audio feedback "Copy or scan?" (step S12). If the user responds with an utterance "Copy" (step S13), the communication control unit 52 of the mobile terminal 2 transmits audio data of the utterance "Copy" to the voice recognition server 3, to thereby request the voice recognition server 3 to convert the audio data into text data (step S14). The text conversion unit 62 of the voice recognition server 3 converts the audio data of the utterance "Copy" into text data, and transmits the text data to the mobile terminal 2 (step S15).

The acquisition unit 51 of the mobile terminal 2 acquires the text data. Further, the communication control unit 52 of the mobile terminal 2 transmits the acquired text data to the AI assistant server 4 (step S16). The interpretation unit 72 of the AI assistant server 4 interprets the action and the parameters based on the user utterance phrase represented by the received text data, as described above with FIGS. 10 and 11. In the present example, the user has uttered the word "Copy," but the necessary parameters such as the number of copies are unknown (i.e., not input).

The interpretation unit 72 therefore generates an interpretation result including an action "COPY_PARAMETER_SETTING" and a response "Input setting values" (step S17). Then, the communication control unit 73 of the AI assistant server 4 transmits the interpretation result to the mobile terminal 2 (step S18). The audio feedback unit 55 of the mobile terminal 2 outputs the input lack feedback by outputting sound "Input setting values" via the speaker 28 and displaying text "Input setting values" on the touch panel 27 (step S19).

The user responds to the input lack feedback with an utterance "Double-sided," for example (step S20). The communication control unit 52 of the mobile terminal 2 transmits audio data of the utterance "Double-sided" to the voice recognition server 3, to thereby request the voice recognition server 3 to convert the audio data into text data (step S21). The text conversion unit 62 of the voice recognition server 3 converts the audio data of the utterance "Double-sided" into text data, and transmits the text data to the mobile terminal 2 (step S22).

The acquisition unit 51 of the mobile terminal 2 acquires the text data. Further, the communication control unit 52 of the mobile terminal 2 transmits the acquired text data to the AI assistant server 4 (step S23). The interpretation unit 72 of the AI assistant server 4 interprets the action and the parameter based on the user utterance phrase represented by the received text data. In the present example, the user has uttered the phrases "Copy" and "Double-sided," but another necessary parameter such as the number of copies is unknown (i.e., lack of a necessary parameter).

Information about which one of the parameters is a necessary parameter may be previously stored in a memory of the AI assistant server 4. In this case, based on the information of the necessary parameters stored in the memory, the interpretation unit 72 may determine whether all of the necessary parameters are set with the parameters acquired from the mobile terminal 2. If any of the necessary parameters is not set, the AI assistant server 4 may prompt the user to set the necessary parameter via the mobile terminal 2.

The interpretation unit 72 therefore generates an interpretation result including the action "COPY_PARAMETER_SETTING," the parameter "PRINT SIDE=DOUBLE-SIDED," and a response "How many copies?" (step S24). Then, the communication control unit 73 of the AI assistant server 4 transmits the interpretation result to the mobile terminal 2 (step S25). The audio feedback unit 55 of the mobile terminal 2 outputs the input lack feedback by outputting sound "How many copies?" via the speaker 28 and displaying text "How many copies?" on the touch panel 27 (step S26).

Then, the user again responds to the input lack feedback with an utterance "Two," for example (step S27). The communication control unit 52 of the mobile terminal 2 transmits audio data of the utterance "Two" to the voice recognition server 3, to thereby request the voice recognition server 3 to convert the audio data into text data (step S28). The text conversion unit 62 of the voice recognition server 3 converts the audio data of the utterance "Two" into text data, and transmits the text data to the mobile terminal 2 (step S29).

The acquisition unit 51 of the mobile terminal 2 acquires the text data. Further, the communication control unit 52 of the mobile terminal 2 transmits the acquired text data to the AI assistant server 4 (step S30). The interpretation unit 72 of the AI assistant server 4 interprets the action and the parameters based on the user utterance phrase represented by the received text data. In the present example, with the transmission of the audio data of the user utterance "Two," the unspecified necessary parameter of the copy job is specified. The interpretation unit 72 therefore generates an interpretation result including an action "COPY_CONFIRM" and parameters "PRINT SIDE=DOUBLE-SIDED" and "QUANTITY=2" (step S31). Then, the communication control unit 73 of the AI assistant server 4 transmits the interpretation result to the mobile terminal 2 (step S32).

Since the unspecified necessary parameter is now specified and the copy job is ready to start, the audio feedback unit 55 of the mobile terminal 2 generates feedback text "Do you confirm to make two double-sided copies?" for example, based on the response included in the interpretation result (step S33). In this step, the audio feedback unit 55 may generate the feedback text by reading all or parts of text data stored in a memory of the mobile terminal 2 and combining the read parts of the text data.

This process of the audio feedback unit 55 is not limited to the process of step S33. The audio feedback unit 55 may similarly generate feedback text at another step when an interpretation result is acquired from the AI assistant server 4. If the text information to be fed back is included in the response of the interpretation result, however, it is unnecessary to generate the feedback text. Then, the above-described input confirmation feedback is output (step S34). In response to the input confirmation feedback, the user performs voice input to issue an instruction to change any of the setting values or start copying.

In the sequence diagram of FIG. 14, steps S35 to S42 correspond to a procedure of an operation performed in response to a voice instruction to change a setting value. In FIG. 14, if the user utters an instruction to change a setting value (step S35), the text conversion unit 62 of the voice recognition server 3 generates text data of the changed setting value, and transmits the text data to the AI assistant server 4 via the mobile terminal 2 (steps S36 to S38). The AI assistant server 4 generates an interpretation result including the changed setting value based on the user utterance phrase represented by the received text data (step S39), and transmits the interpretation result to the mobile terminal 2 (step S40).

The audio feedback unit 55 of the mobile terminal 2 generates feedback text based on the response included in the interpretation result (step S41), and outputs the above-described input confirmation feedback with a message such as "Do you confirm to make copies with setting XXX?" for example, to thereby check with the user whether to start copying with the changed setting value (step S42).

In the sequence diagram of FIG. 14, steps S43 to S50 correspond to a procedure of an operation performed by related units in response to the copy start instruction. When the user responds to the input confirmation feedback with an utterance "Yes" (step S43), audio data of the utterance is converted into text data and transmitted to the AI assistant server 4 via the mobile terminal 2 (steps S44 to S46). The AI assistant server 4 recognizes the copy start instruction based on the received text data, generates an interpretation result including the action "COPY_EXECUTE" and the parameters "PRINT SIDE=DOUBLE-SIDED" and "QUANTITY=2," and transmits the interpretation result to the mobile terminal 2 (steps S47 and S48).

The interpretation result conversion unit 53 of the mobile terminal 2 converts the interpretation result into a job execution command to the MFP 1 (step S49), and transmits the job execution command to the MFP 1 (step S50). Thereby, the MFP 1 is controlled to execute copying through the voice input operation.

An example of information fed back to the mobile terminal 2 from the AI assistant server 4 will be described.

TABLE 2 given below illustrates examples of the interpretation result fed back to the mobile terminal 2 from the AI assistant server 4.

TABLE 2

| Name | Value | Processing of operation voice processing program |
|---|---|---|
| Action | COPY_PARAMETER_SETTING | Prompt user to input job setting value |
|  | COPY_CONFIRM | Prompt user to confirm job setting value |
|  | COPY_EXECUTE | Execute copy job |
| Parameter | Print side | Change setting value of print side |
|  | Quantity | Change setting value of quantity |
|  | *Other parameters specifiable as job setting values |  |
| Response | Text | Feed back contents specified in text to user |

As illustrated in TABLE 2, an action such as "COPY_PARAMETER_SETTING" for prompting the user to input the job setting value, "COPY_CONFIRM" for prompting the user to confirm the job setting value, or "COPY_EXECUTE" for notifying the user of the start of the job execution, for example, is included in the interpretation result and fed back to the mobile terminal 2.

The audio feedback unit 55 determines the feedback to be output to the user in accordance with the action, parameters, and response included in the interpretation result. Information similar to that of TABLE 2 may be stored in a memory of the mobile terminal 2 such that the audio feedback unit 55 refers to the stored information to determine the contents of the feedback. Although TABLE 2 illustrates examples of the interpretation result of the copy job, "PARAMETER_SETTING" for prompting the user to input the job setting value and "CONFIRM" for prompting the user to confirm the job setting value may also be used as the action in the interpretation result of the print, scan, or FAX job similarly as in TABLE 2.

Further, for example, the setting value of the print side such as single-sided or double-sided or the parameter such as the number of copies is included in the interpretation result and fed back to the mobile terminal 2. Further, if there is an unspecified necessary parameter, a message for prompting the user to input (i.e., specify) the unspecified necessary parameter is included in the interpretation result as the response and fed back to the mobile terminal 2.

Interaction in the job execution and in the event of an error will be described.

Figure 15:
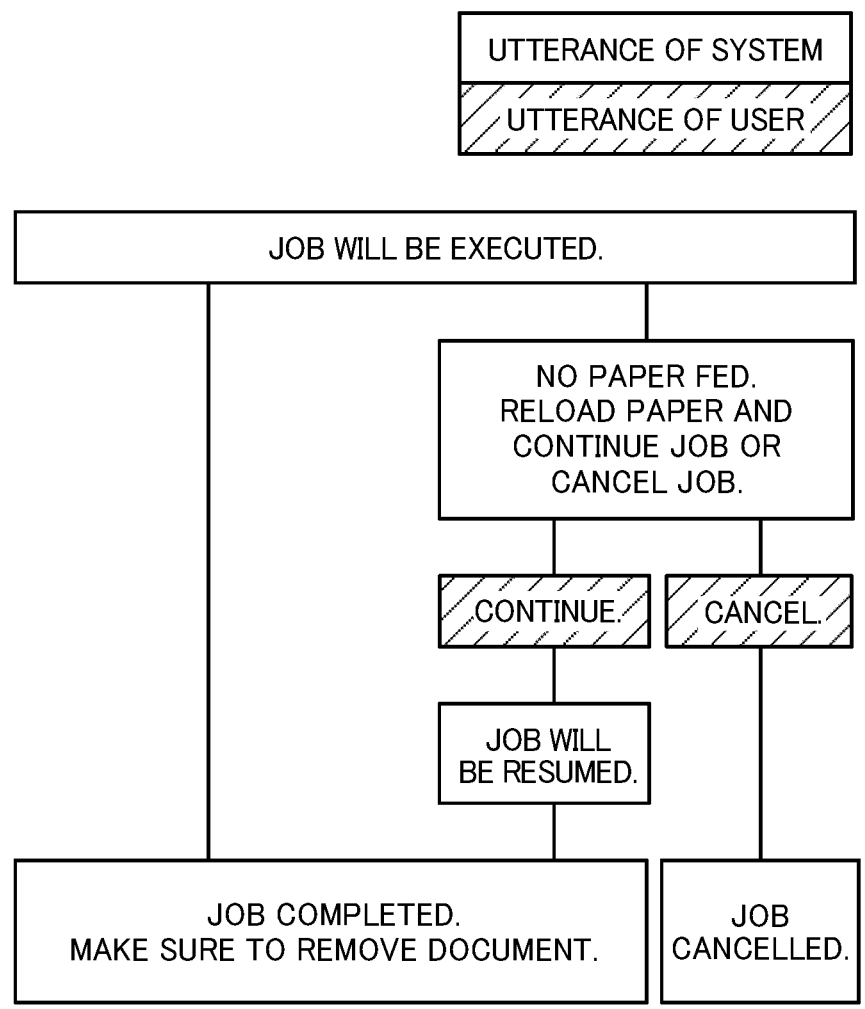
FIG. 15 is a diagram illustrating a procedure of an interactive input operation performed in the event of an error in the voice operation system of the first embodiment.

FIG. 15 illustrates an example of interaction that takes place when a job is executed in response to a user response "Yes" to the input confirmation feedback such as "Do you confirm to execute job?" for example, or when an error occurs.

When the user responds with an utterance "Yes" to the input confirmation feedback such as "Do you confirm to execute job?" for example, the MFP 1 executes the job. If the job is successfully completed, a completion message such as "Job completed. Make sure to remove document," for example, is output both in sound and text via the mobile terminal 2.

In the event of an error such as paper shortage, for example, job confirmation feedback with a message such as "No paper fed. Reload paper and continue job or cancel job" is output via the mobile terminal 2. If the user reloads paper in the MFP 1 and utters a word "Continue" in response to the job confirmation feedback, an instruction to continue the job is issued to the MFP 1, and the MFP 1 resumes the job. If the user utters a word "Cancel" to issue an instruction to cancel the job in response to the job confirmation feedback, the instruction to cancel the job is transmitted to the MFP 1, and a part of the job unfinished at the time of occurrence of the error is cancelled. Then, confirmation feedback such as "Job cancelled," for example, is output in sound and text via the mobile terminal 2.

A procedure of an interactive input operation performed in the job execution and in the event of an error will be described.

Figure 16:
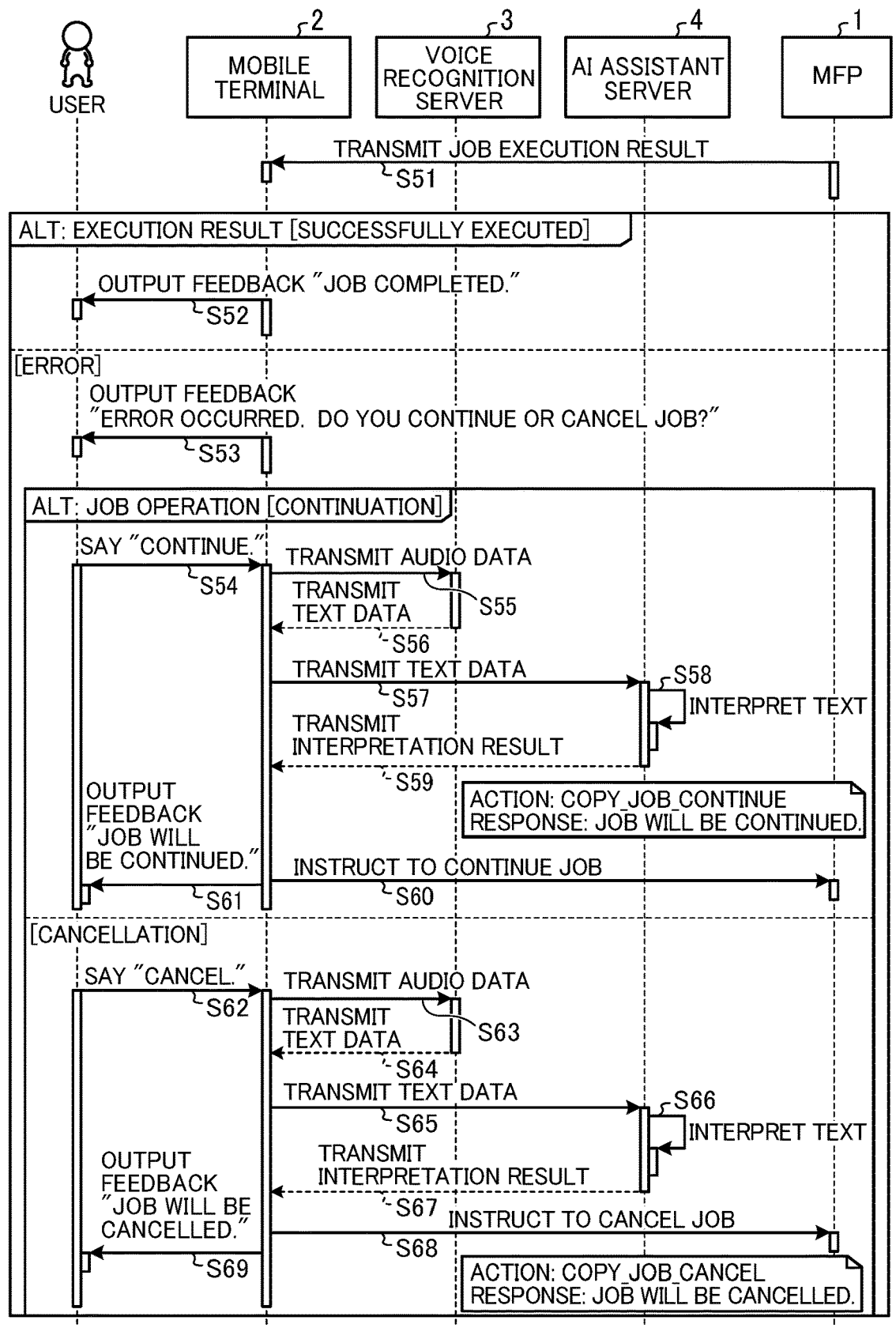
FIG. 16 is a sequence diagram illustrating the procedure of the interactive input operation performed in the event of an error in the voice operation system of the first embodiment.

FIG. 16 is a sequence diagram illustrating a procedure of the interactive input operation performed in the job execution and in the event of an error. The MFP 1 executes the specified job, and transmits to the mobile terminal 2 an execution result notifying the successful completion of the job or the occurrence of an error (step S51). In response to receipt of the execution result notifying the successful completion of the job, the audio feedback unit 55 of the mobile terminal 2 outputs an audio message such as "Job completed," for example (step S52). In response to receipt of the execution result notifying the occurrence of an error, on the other hand, the audio feedback unit 55 of the mobile termnninal 2 outputs an audio message asking the user whether to continue the job, such as "Error occurred. Do you continue or cancel job?" for example (step S53).

Step S54 to S61 in FIG. 16 correspond to a procedure of an operation performed by related units when the user specifies the continuation of the job. In response to the inquiry "Error occurred. Do you continue or cancel job?" the user eliminates the cause of the error and responds with an utterance "Continue" (step S54). In this case, audio data of the utterance is converted into text data and transmitted to the AI assistant server 4 (steps S55 to S57).

The AI assistant server 4 generates an interpretation result including an action "COPY_JOB_CONTINUE" and a response "Job will be continued," and transmits the interpretation result to the mobile terminal 2 (steps S58 and S59). The execution instruction unit 54 of the mobile terminal 2 instructs the MFP 1 to continue the job (step S60). Further, the audio feedback unit 55 of the mobile terminal 2 outputs the input confirmation feedback with the response "Job will be continued" (step S61).

Step S62 to S69 in FIG. 16 correspond to a procedure of an operation performed by related units when the user specifies the cancellation of the job. In response to the inquiry "Error occurred. Do you continue or cancel job?" the user responds with an utterance "Cancel" (step S62). In this case, audio data of the utterance is converted into text data and transmitted to the AI assistant server 4 (steps S63 to S65).

The AI assistant server 4 generates an interpretation result including an action "COPY_JOB_CANCEL" and a response "Job will be cancelled," and transmits the interpretation result to the mobile terminal 2 (steps S66 and S67). The execution instruction unit 54 of the mobile terminal 2 instructs the MFP 1 to cancel the job (step S68). Further, the audio feedback unit 55 of the mobile terminal 2 outputs the input confirmation feedback with the response "Job will be cancelled" (step S69).

An interactive parameter adjustment operation based on the apparatus capability of the MFP 1 will be described.

Figure 17:
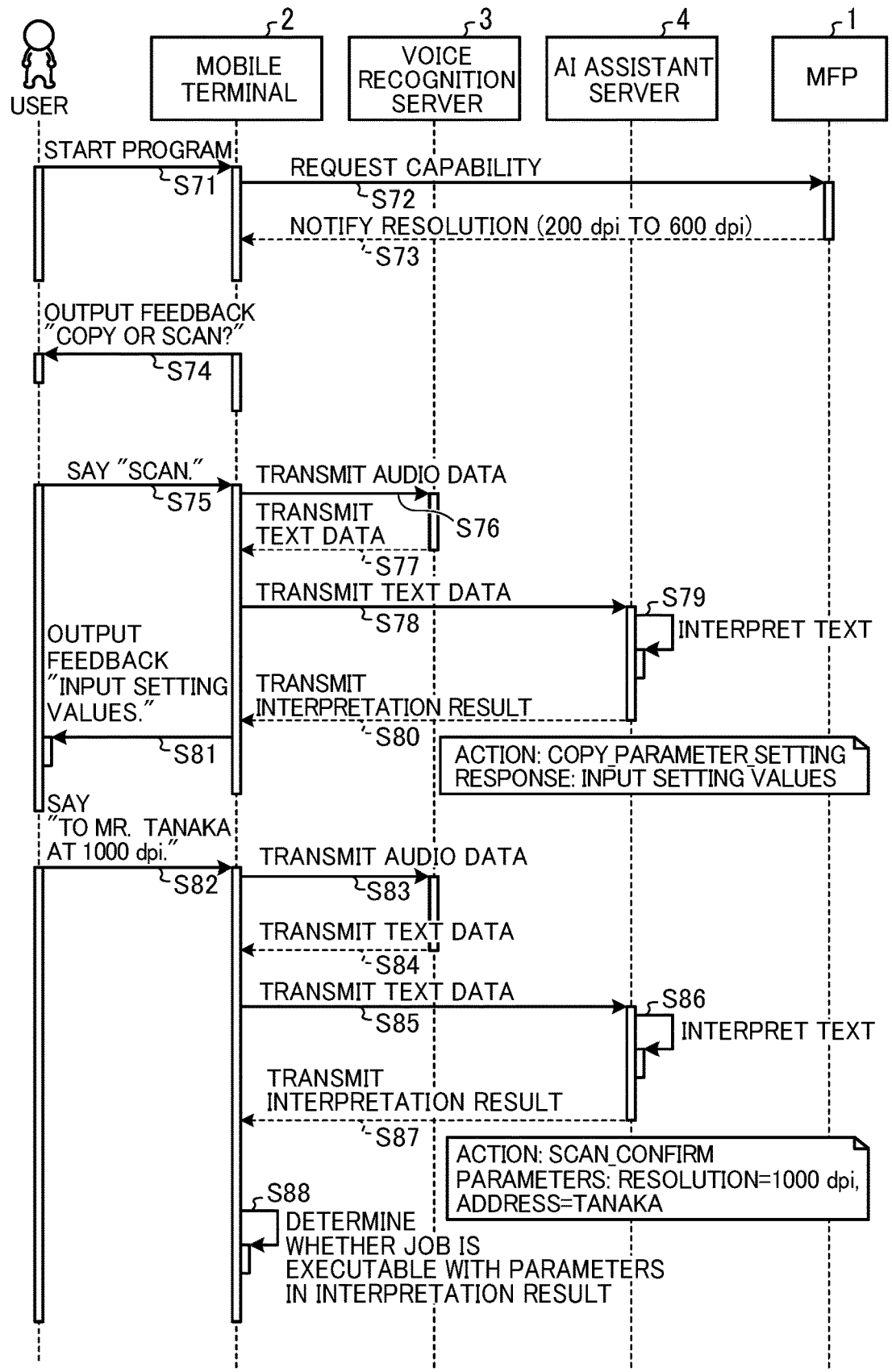
FIG. 17 is a sequence diagram illustrating a first part of a procedure of an operation performed in the voice operation system of the first embodiment to cause the MFP to execute scanning in accordance with the apparatus capability of the MFP through the interactive input operation.
Figure 18:
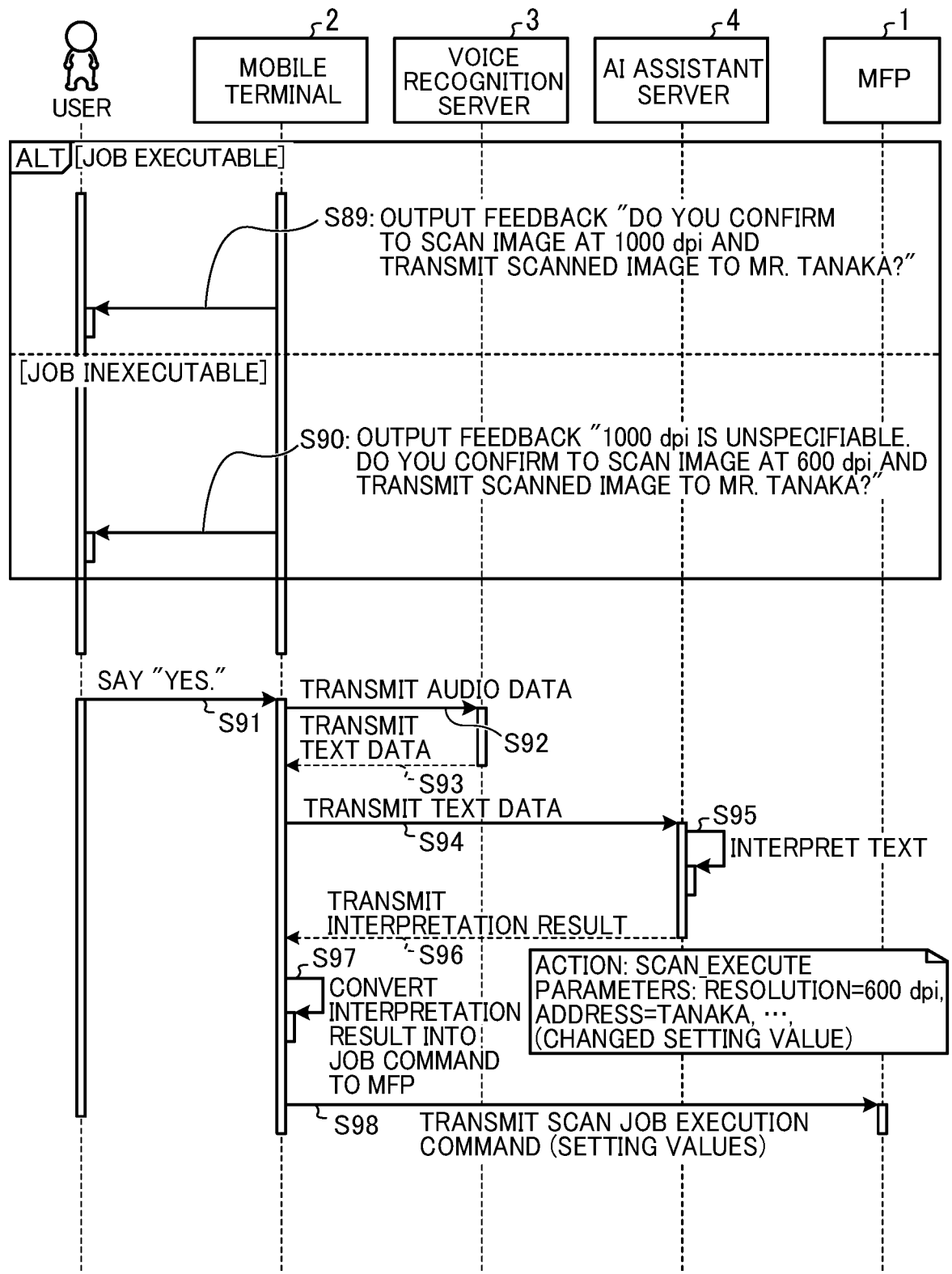
FIG. 18 is a sequence diagram illustrating a latter part of the procedure of the operation performed in the voice operation system of the first embodiment to cause the MFP to execute scanning in accordance with the apparatus capability of the MFP through the interactive input operation.

The voice operation system 1000 of the first embodiment executes the job in accordance with the apparatus capability of the MFP 1 through an interactive operation. FIG. 17 is a sequence diagram illustrating a procedure of an operation to determine whether the MFP 1 has sufficient apparatus capability for executing the job specified by the user. FIG. 18 is a sequence diagram illustrating a procedure of an operation performed when the job is executable with the apparatus capability of the MFP 1 and an operation performed when it is difficult to execute the job with the apparatus capability of the MFP 1.

In the sequence diagram of FIG. 17, the user first starts the operation voice processing program 200 of the mobile terminal 2 (step S71), and the processing capability acquisition unit 56 of the mobile terminal 2 inquires of the MFP 1 about the processable resolution thereof, for example, to acquire the capability of the MFP 1 (step S72). In response to the inquiry, the MFP 1 replies to the mobile terminal 2 with information of the processable resolution, such as "200 dots per inch (dpi) to 600 dpi" (step S73). Thereby, the mobile terminal 2 recognizes the processable resolution of the MFP 1.

The processing capability acquisition unit 56 may previously acquire the information of the processing capability at a predetermined time after the communication between the mobile terminal 2 and the MFP 1 is established. Alternatively, the information of the processing capability may be acquired by another program, and the processing capability acquisition unit 56 may acquire the information thus acquired by the another program, to thereby indirectly acquire the information stored in the MFP 1.

Then, the audio feedback unit 55 of the mobile terminal 2 outputs audio feedback for prompting the user to specify the job, such as "Copy or scan?" for example (step S74). If the user utters a word "Scan" (step S75), audio data of the utterance is converted into text data and transmitted to the AI assistant server 4 (steps S76 to S78). Scanning is thus specified, but the necessary parameters are unspecified. Therefore, the interpretation unit 72 of the AI assistant server 4 transmits to the mobile terminal 2 an interpretation result including an action "SCAN_PARAMETER_SETTING" and a response "Input setting values" (steps S79 and S80). Thereby, the audio feedback unit 55 of the mobile terminal 2 outputs the input lack feedback with the response "Input setting values" (step S81).

If the user responds to the input lack feedback with an utterance "To Mr. Tanaka at 1000 dpi," audio data of the utterance is converted into text data and transmitted to the AI assistant server 4 (steps S82 to S85). The interpretation unit 72 of the AI assistant server 4 transmits to the mobile terminal 2 an interpretation result including an action "SCAN_CONFIRM" and parameters "RESOLUTION=1000 dpi, ADDRESS=TANAKA" (steps S86 and S87). Based on the parameters included in the interpretation result, the execution determination unit 57 of the mobile terminal 2 determines whether the job specified by the user is executable with the MFP 1 (step S88).

If the MFP 1 is capable of executing image processing with the resolution of 1000 dpi, the audio feedback unit 55 of the mobile terminal 2 outputs the input confirmation feedback with a message "Do you confirm to scan image at 1000 dpi and transmit scanned image to Mr. Tanaka?" (step S89 in FIG. 18).

If the user responds to the input confirmation feedback with an utterance "Yes" (step S91), audio data of the utterance is converted into text data and transmitted to the AI assistant server 4 (steps S92 to S94). The AI assistant server 4 transmits to the mobile terminal 2 an interpretation result including an action "SCAN_EXECUTE" and the parameters "RESOLUTION=1000 dpi, ADDRESS=TANAKA" (steps S95 and S96).

In the mobile terminal 2, the interpretation result conversion unit 53 converts the interpretation result into a job execution command (step S97), and the communication control unit 52 transmits the job execution command to the MFP 1 (step S98).

If the maximum processing capability of the MFP 1 is 600 dpi, on the other hand, it is difficult to execute image processing in the MFP 1 at the user-specified resolution of 1000 dpi. In this case, the mobile terminal 2 outputs confirmation feedback with a message "1000 dpi is unspecifiable. Do you confirm to scan image at 600 dpi and transmit scanned image to Mr. Tanaka?" (step S90).

The execution determination unit 57 is capable of selecting the function or value closest to the function or processing capability value specified by the user within the processing capability of the MFP 1. For example, if the range of processable resolution of the MFP 1 is 200 dpi to 600 dpi, 600 dpi closest to 1000 dpi specified by the user is selected. Then, the audio feedback unit 55 outputs the capability or value selected by the execution determination unit 57 as the confirmation feedback.

If the user responds to the confirmation feedback with an utterance "Yes" (step S91), audio data of the utterance is converted into text data and transmitted to the AI assistant server 4 (steps S92 to S94). The AI assistant server 4 transmits to the mobile terminal 2 an interpretation result including the action "SCAN_EXECUTE" and parameters "RESOLUTION=600 dpi, ADDRESS=TANAKA" (steps S95 and S96).

In the mobile terminal 2, the interpretation result conversion unit 53 converts the interpretation result into a job execution command (step S97), and the communication control unit 52 transmits the job execution command to the MFP 1 (step S98). With the voice input operation, therefore, the MFP 1 is operated to execute the job within the processing capability thereof.

An operation of transmitting the scanned image to the transmission destination retrieved from the address book in the mobile terminal 2 will be described.

Figure 19:
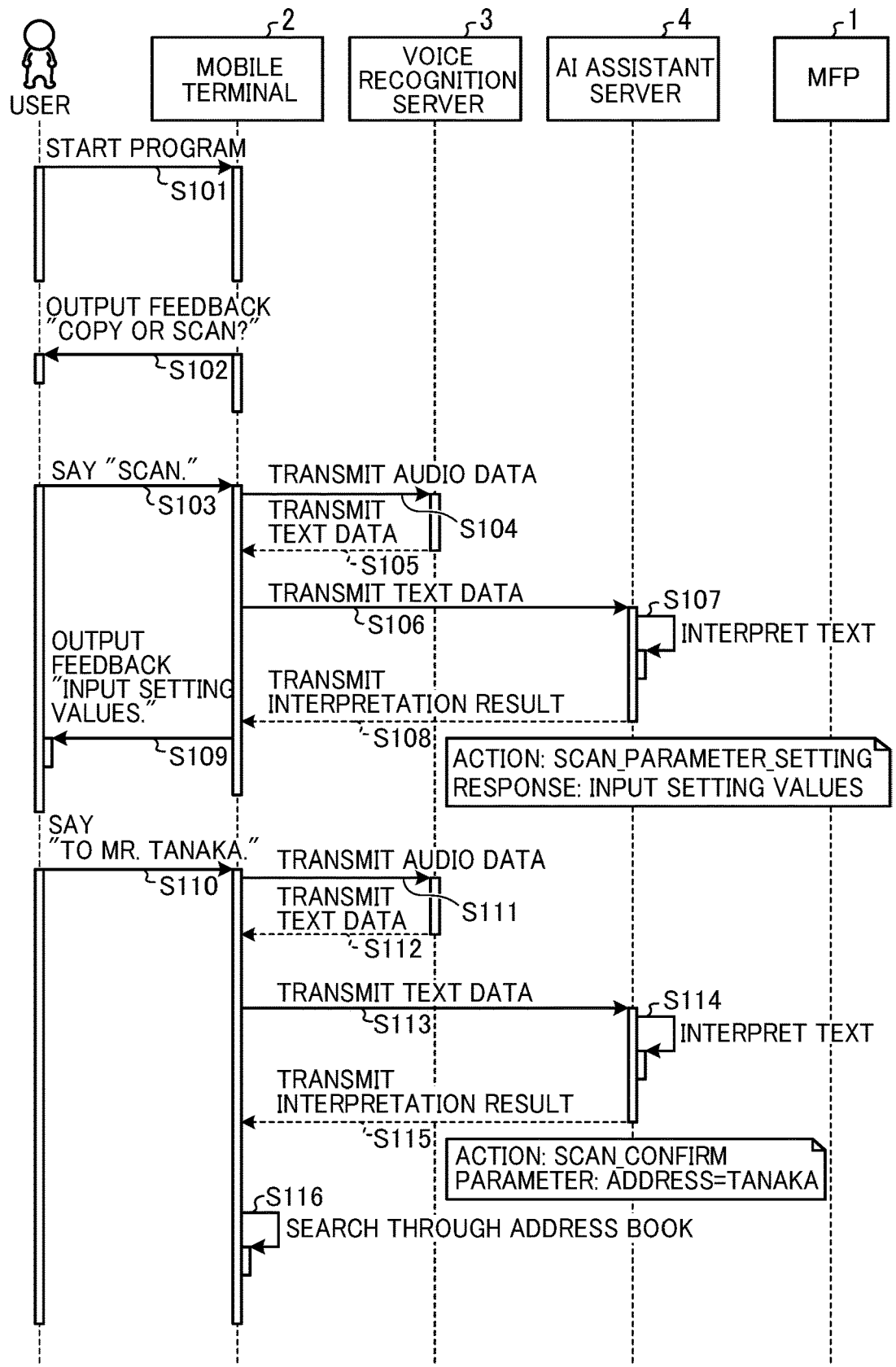
FIG. 19 is a sequence diagram illustrating a first part of a procedure of an operation performed in the voice operation system of the first embodiment to transmit a scanned image to a user specified from an address book through the interactive input operation.
Figure 20:
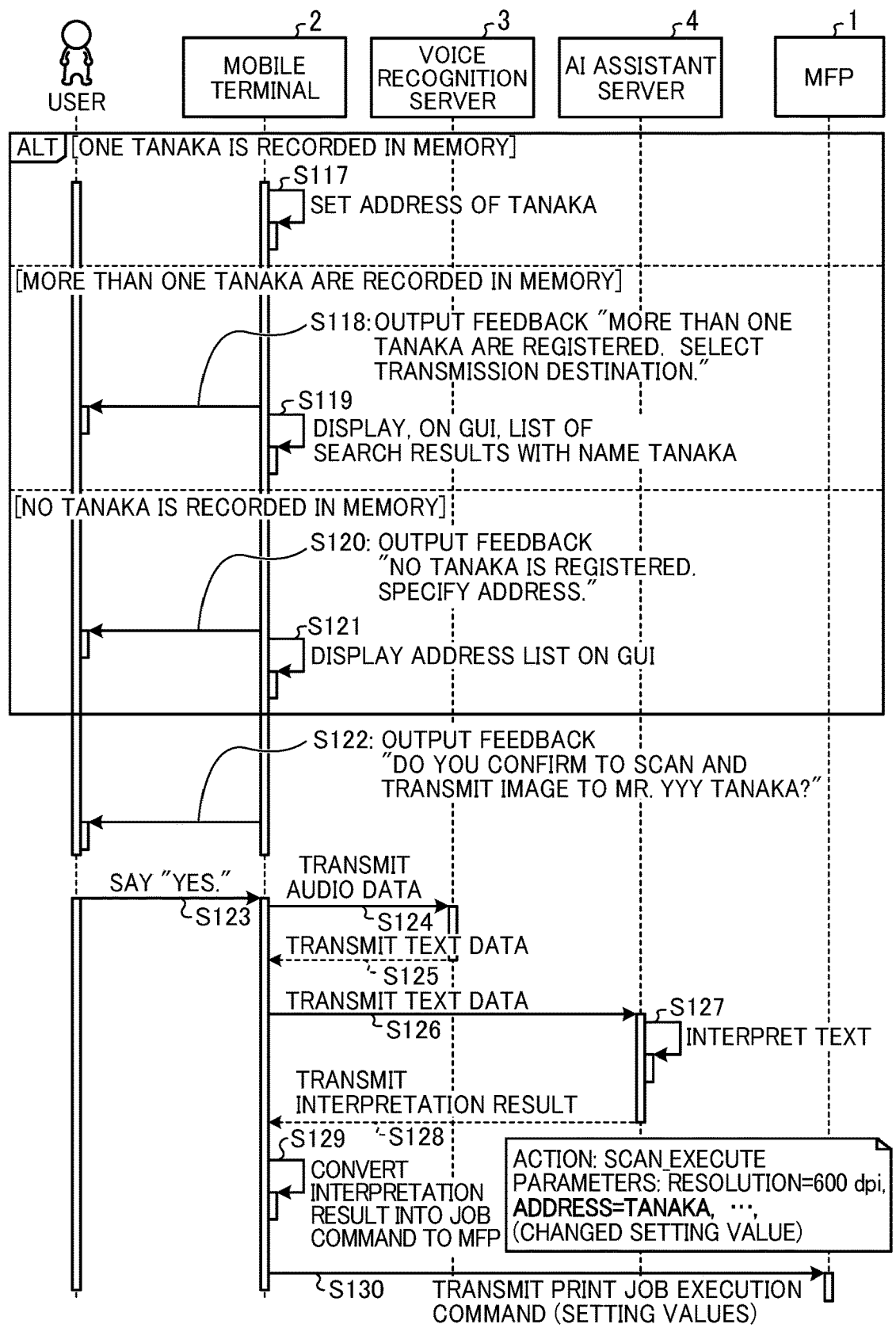
FIG. 20 is a sequence diagram illustrating a latter part of the procedure of the operation performed in the voice operation system of the first embodiment to transmit a scanned image to a user specified from an address book through the interactive input operation.

The sequence diagram of FIG. 19 illustrates a first part of a procedure this operation, and the sequence diagram of FIG. 20 illustrates a latter part of the procedure the operation.

In the sequence diagram of FIG. 19, the user first starts the operation voice processing program 200 of the mobile terminal 2 (step S101), and the audio feedback unit 55 of the mobile terminal 2 outputs audio feedback for prompting the user to specify the job, such as "Copy or scan?" for example (step S102). If the user responds with an utterance "Scan"

(step S103), audio data of the utterance is converted into text data and transmitted to the AI assistant server 4 (steps S104 to S106). Scanning is thus specified, but the necessary parameters are unspecified. Therefore, the interpretation unit 72 of the AI assistant server 4 transmits to the mobile terminal 2 an interpretation result including an action "SCAN_PARAMETER_SETTING" and a response "Input setting values" (steps S107 and S108). Thereby, the audio feedback unit 55 of the mobile terminal 2 outputs the input lack feedback with the response "Input setting values" (step S109).

If the user responds to the input lack feedback with an utterance "To Mr. Tanaka" (step S110), audio data of the utterance is converted into text data and transmitted to the AI assistant server 4 (steps S111 to S113). The interpretation unit 72 of the AI assistant server 4 transmits to the mobile terminal 2 an interpretation result including an action "SCAN_CONFIRM" and a parameter "ADDRESS=TANAKA" (steps S114 and S115). Based on the parameter included in the interpretation result, the retrieval unit 58 of the mobile terminal 2 retrieves the electronic mail address of Mr. Tanaka from a storage area of the address book stored in the RAM 22 (step S116).

The search target is not limited to the RAM 22, and may be a server connected to the mobile terminal 2 via a network. Further, the retrieval unit 58 may inquire of the MFP 1 whether the corresponding electronic mail address is stored in the MFP 1.

If one Tanaka is recorded in the storage area of the address book, the communication control unit 52 of the mobile terminal 2 creates an electronic mail with the transmission destination set to the electronic mail address of the Tanaka stored in the storage area of the address book (step S117 in FIG. 20). The electronic mail is transmitted with the scanned image attached thereto. Thereby, the scanned image is transmitted to the address of the Tanaka.

If more than one Tanaka are recorded in the storage area of the address book, i.e., if the storage area stores a plurality of addresses each including "Tanaka" as address identifying information, the audio feedback unit 55 of the mobile terminal 2 outputs the input lack feedback with a message "More than one Tanaka are registered. Select transmission destination" (step S118). Then, the retrieval unit 58 of the mobile terminal 2 displays on the touch panel 27 a list of names and electronic mail addresses of the plurality of Tanakas retrieved from the storage area of the address book (step S119).

The user selects the intended Tanaka from the list, and the communication control unit 52 of the mobile terminal 2 creates an electronic mail with the transmission destination set to the electronic mail address of the Tanaka selected by the user. The electronic mail is transmitted with the scanned image attached thereto. Thereby, the scanned image is transmitted to Tanaka, i.e., the address intended by the user.

If no Tanaka is recorded in the storage area of the address book, the audio feedback unit 55 of the mobile terminal 2 outputs the input lack feedback with a message "No Tanaka is registered. Specify address" (step S120). Then, the retrieval unit 58 of the mobile terminal 2 displays, on the touch panel 27 and in alphabetical order, for example, a list of names and electronic mail addresses of users with the name Tanaka retrieved from the storage area of the address book (step S121).

The touch panel 27 may further display a keyboard to prompt the user to manually input the electronic mail address as the transmission destination to acquire the intended name and electronic mail address. The acquired name and electronic mail address may be registered in the address book.

The user selects the intended address from the list, and the communication control unit 52 of the mobile terminal 2 creates the electronic mail address of the transmission destination selected by the user. The electronic mail is transmitted with the scanned image attached thereto. Thereby, the scanned image is transmitted to the address intended by the user.

That is, when the user selects Mr. Tanaka or another user as the transmission destination of the scanned image, the audio feedback unit 55 of the mobile terminal 2 outputs confirmation feedback with a message "Do you confirm to scan image and transmit scanned image to Mr. YYY Tanaka?" for example (step S122).

If the user responds to the confirmation feedback with an utterance "Yes" (step S123), audio data of the utterance is converted into text data and transmitted to the AI assistant server 4 (steps S124 to S126). The AI assistant server 4 transmits to the mobile terminal 2 an interpretation result including the action "SCAN_EXECUTE" and the parameters "RESOLUTION=600 dpi, ADDRESS=TANAKA" (steps S127 and S128).

In the mobile terminal 2, the interpretation result conversion unit 53 converts the interpretation result into a job execution command (step S129), and the communication control unit 52 transmits the job execution command to the MFP 1 together with address information of the transmission destination, such as the name and the electronic mail address of the transmission destination (step S130). Thereby, the electronic mail with the scanned image attached thereto is transmitted to the address intended by the user.

A description will be given of an operation of retrieving a print target (e.g., a file) from a memory of the mobile terminal 2 such as the RAM 22 and printing the print target.

Figure 21:
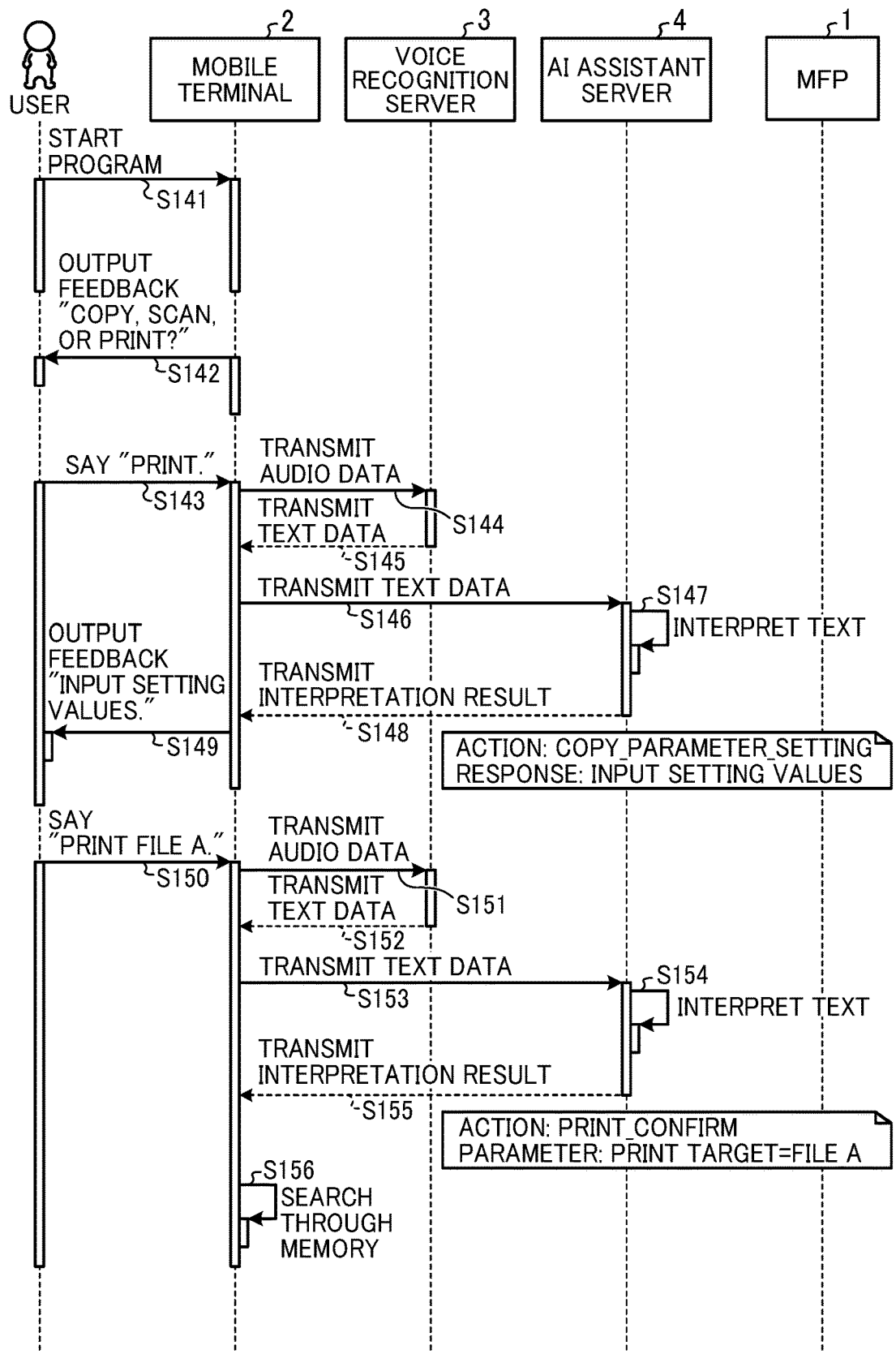
FIG. 21 is a sequence diagram illustrating a first part of a procedure of an operation performed in the voice operation system of the first embodiment to print a file specified from a memory through the interactive input operation.
Figure 22:
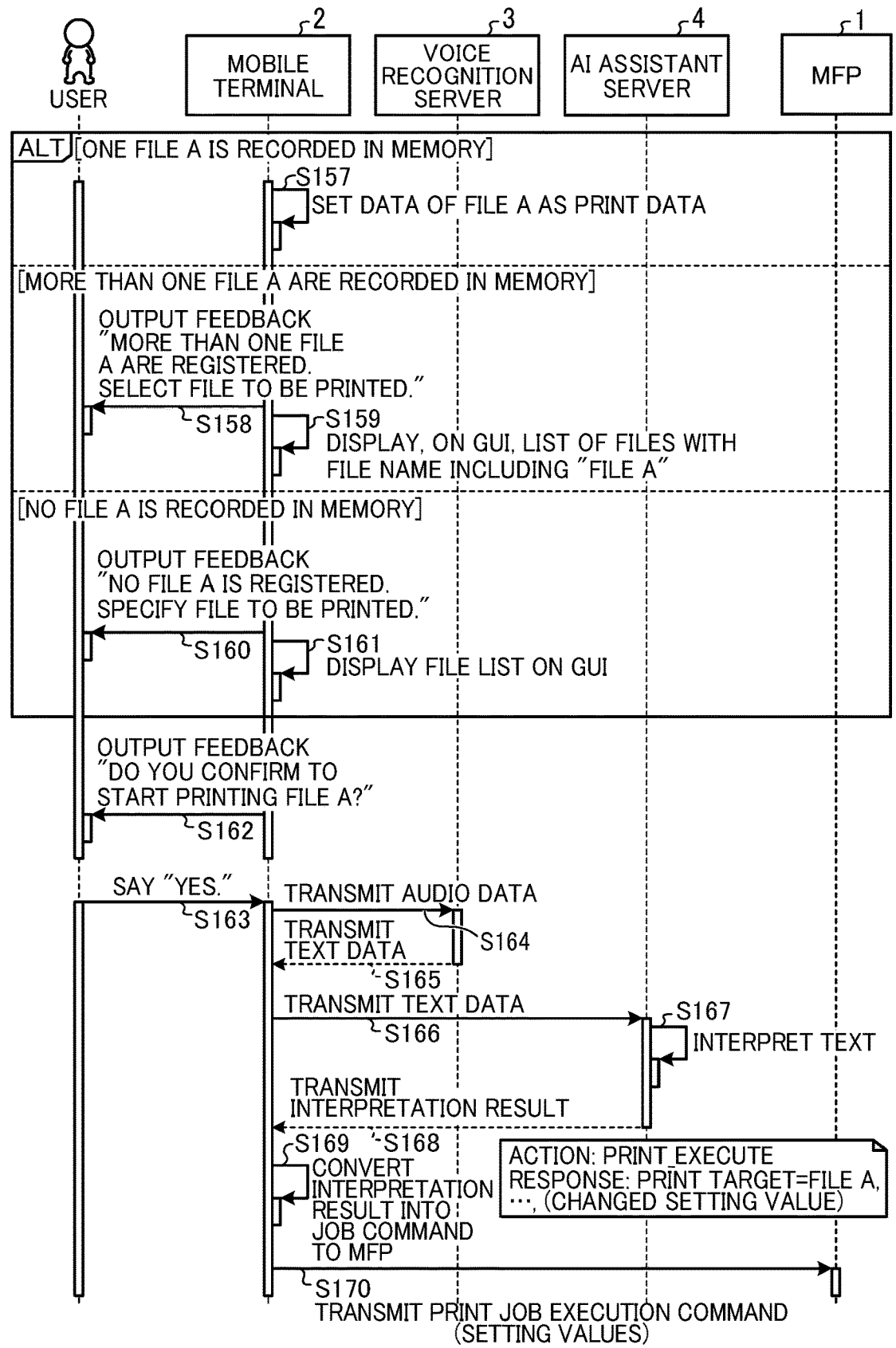
FIG. 22 is a sequence diagram illustrating a latter part of the procedure of the operation performed in the voice operation system of the first embodiment to print a file specified from a memory through the interactive input operation.

The sequence diagram of FIG. 21 illustrates a first part of a procedure this operation, and the sequence diagram of FIG. 22 illustrates a latter part of the procedure the operation.

In the sequence diagram of FIG. 21, the user first starts the operation voice processing program 200 of the mobile terminal 2 (step S141), and the audio feedback unit 55 of the mobile terminal 2 outputs audio feedback for prompting the user to specify the job, such as "Copy, scan, or print?" for example (step S142). If the user responds with an utterance "Print" (step S143), audio data of the utterance is converted into text data and transmitted to the AI assistant server 4 (steps S144 to S146). Printing is thus specified, but the necessary parameters are unspecified. Therefore, the interpretation unit 72 of the AI assistant server 4 transmits to the mobile terminal 2 an interpretation result including an action "PRINT_PARAMETER_SETTING" and a response "Input setting values" (steps S147 and S148). Thereby, the audio feedback unit 55 of the mobile terminal 2 outputs the input lack feedback with the response "Input setting values" (step S149).

If the user responds to the input lack feedback with an utterance "Print file A" (step S150), audio data of the utterance is converted into text data and transmitted to the AI assistant server 4 (steps S151 to S153). The interpretation unit 72 of the AI assistant server 4 transmits to the mobile terminal 2 an interpretation result including an action "PRINT_CONFIRM" and a parameter "PRINT TARGET=FILE A" (steps S154 and S155). Based on the parameter included in the interpretation result, the retrieval unit 58 of the mobile terminal 2 retrieves file A from a memory such as the RAM 22 (step S156).

The search target is not limited to the RAM 22, and may be a server connected to the mobile terminal 2 via a network. Further, the retrieval unit 58 may inquire of the MFP 1 whether the corresponding file is stored in the MFP 1.

If one file A is recorded in the memory, the communication control unit 52 of the mobile terminal 2 sets the data of the file A as the print data (step S157 in FIG. 22). The print data of the file A is transmitted to and printed by the MFP 1.

If the memory stores more than one file A, the audio feedback unit 55 of the mobile terminal 2 outputs the input lack feedback with a message "More than one file A are registered. Select file to be printed" (step S158). Then, the retrieval unit 58 of the mobile terminal 2 displays on the touch panel 27 a list of files retrieved from the memory, i.e., files each including "File A" in the file name thereof (step S159). The user selects the intended file A from the list, and the communication control unit 52 of the mobile terminal 2 transmits the file A selected by the user to the MFP 1, to thereby request the MFP 1 to print the file A, as described later.

If no file A is recorded in the memory, the audio feedback unit 55 of the mobile terminal 2 outputs input lack feedback with a message "No file A is registered in the memory. Specify file to be printed" (step S160). Then, the retrieval unit 58 of the mobile terminal 2 displays a list of files retrieved from the memory on the touch panel 27 (step S161). The user selects the intended file from the list, and the communication control unit 52 of the mobile terminal 2 transmits the file selected by the user to the MFP 1, to thereby request the MFP 1 to print the file.

That is, when the user selects the file A or another file desired be printed, the audio feedback unit 55 of the mobile terminal 2 outputs confirmation feedback with a message "Do you confirm to start printing file A?" for example (step S162).

If the user responds to the confirmation feedback with an utterance "Yes" (step S163), audio data of the utterance is converted into text data and transmitted to the AI assistant server 4 (steps S164 to S166). The AI assistant server 4 transmits to the mobile terminal 2 an interpretation result including an action "PRINT_EXECUTE" and the parameter "PRINT TARGET=FILE A" (steps S167 and S168).

In the mobile terminal 2, the interpretation result conversion unit 53 converts the interpretation result into a job execution command (step S169), and the communication control unit 52 transmits the job execution command to the MFP 1 together with the file selected by the user (step S170). Thereby, the MFP 1 prints the file intended by the user.

As understood from the foregoing description, in the voice operation system 1000 of the first embodiment, the mobile terminal 2 is installed with the operation voice processing program 200 as a platform application program, which relays the communication between the voice recognition server 3 and the AI assistant server 4. When the user speaks to the microphone 29 of the mobile terminal 2, the voice operation system 1000 analyzes the contents of the user utterance, and operates the MFP 1 to perform the operation specified by the user. That is, the voice input operation is performed.

Thereby, a command for a complicated operation is issued in voice, obviating the need for an operation with a graphical user interface (GUI) on the touch panel 27, for example. This configuration therefore makes the input operation faster and easier even for a user experienced with the operation.

Further, the interactive operation support enables a senior or inexperienced user to perform a desired operation faster and with more ease when performing complicated network setting or advanced job setting or when installing a new application program, for example.

Further, since the intention of the user is analyzed based on the text of the user utterance, the process based on the user utterance is determined by the AI assistant server 4 and executed.

A voice operation system 1000B of a second embodiment of the present invention will be described.

A system configuration of the voice operation system 1000B of the second embodiment will first be described.

Figure 23:
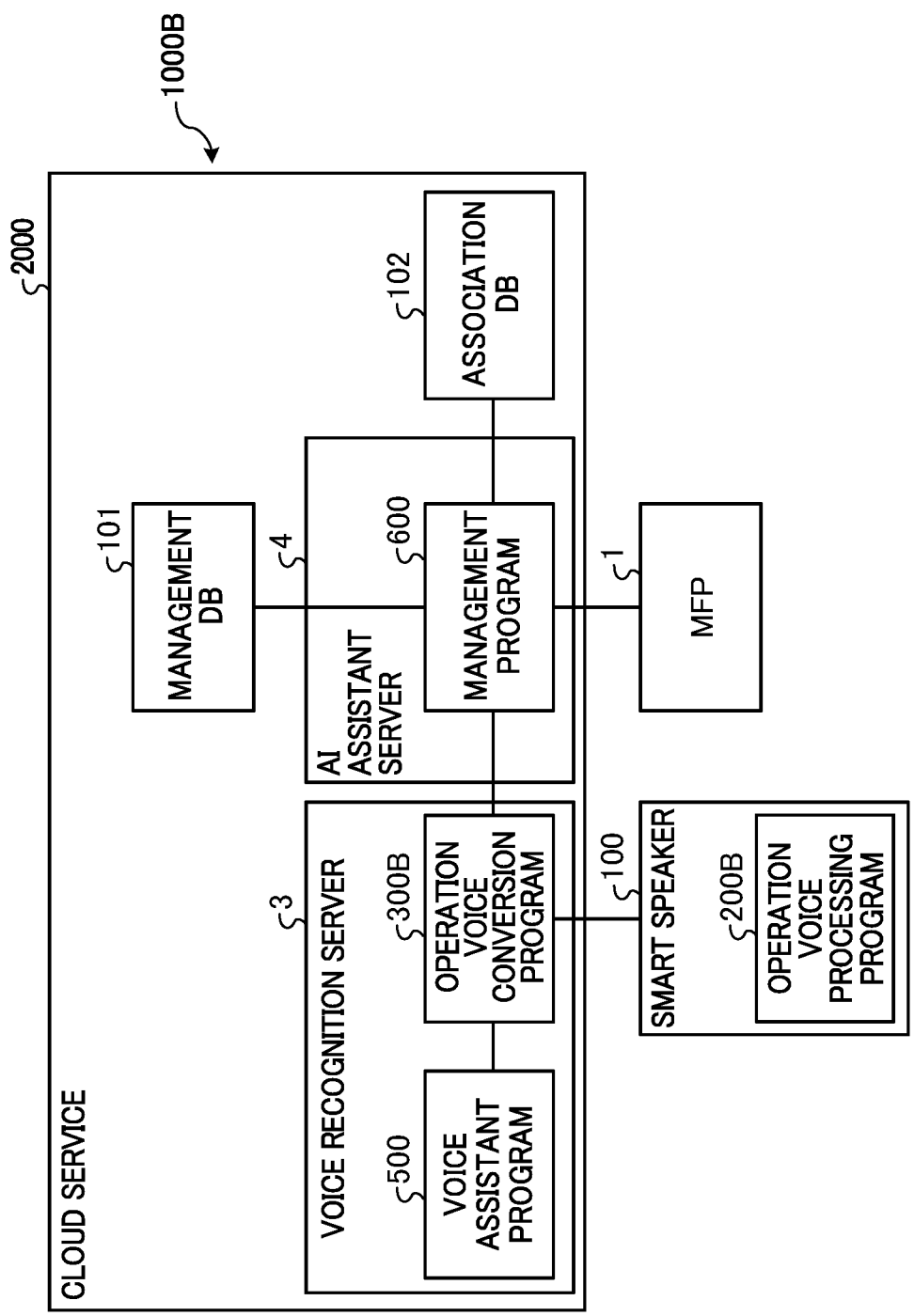
FIG. 23 is a system configuration diagram of a voice operation system of a second embodiment of the present invention.

FIG. 23 is a system configuration diagram of the voice operation system 1000B of the second embodiment. As illustrated in FIG. 23, the voice operation system 1000B of the second embodiment includes one or more MFPs 1, one or more smart speakers 100, one or more voice recognition servers 3, and one or more AI assistant servers 4, which are connected to each other via the network 5 such as a LAN, for example. With this configuration, the one or more voice recognition servers 3 and the one or more AI assistant servers 4 provide a cloud service 2000. For convenience of illustration, FIG. 23 illustrates one of the one or more MFPs 1, one of the one or more smart speakers 100, one of the one or more voice recognition servers 3, and one of the one or more AI assistant servers 4.

The MFP 1 is an example of an information processing apparatus. The smart speaker 100 is a smart phone or a tablet terminal, for example. The information processing apparatus is not limited to the MFP, and may be a different type of electronic apparatus such as an electronic whiteboard or a projector.

The AI assistant server 4 has a management database (DB) 101 and an association DB 102. The management DB 101 stores content (i.e., data), such as text data, image data, and audio data, provided by the AI assistant server 4 as the cloud service 2000. The association DB 102 stores, for example, a device identification (ID) of each of the one or more smart speakers 100 and an apparatus ID of each of the one or more MFPs 1 such that the device ID of the smart speaker 100 is associated with the apparatus ID of the corresponding MFP 1 to make it possible to identify the MFP 1 operable in voice with the smart speaker 100.

The management DB 101 and the association DB 102 may be included in a memory of the cloud service 2000 on the network 5 such as an HDD. Alternatively, one or both of the management DB 101 and the association DB 102 may be stored in another server accessible by the cloud service 2000 via the network 5.

The smart speaker 100 receives voice input from the user for the voice operation of the MFP 1. The smart speaker 100 outputs audio feedback to the user in response to the operation received from the user. That is, the smart speaker 100 functions as a voice input device, and/or a voice output device. The smart speaker 100 further communicates data, such as audio data, text data, or image data, for example, between the voice recognition server 3 and the AI assistant server 4, which provide the cloud service 2000. The voice recognition server 3 analyzes audio data received from the smart speaker 100, and converts the audio data into text data. The voice recognition server 3 further interprets the intention of the user based on the text data and previously registered dictionary information, and transmits the result of interpretation to the AI assistant server 4.

The AI assistant server 4 converts the interpretation result received from the voice recognition server 3 into a job execution command in a format interpretable by the MFP 1, and transmits the job execution command to the MFP 1. The MFP 1 executes a job in accordance with the job execution command transmitted from the thus-configured cloud service 2000.

A hardware configuration of the MFP 1 of the second embodiment will be described.

The MFP 1 of the second embodiment has a plurality of image processing functions such as the printer function and the scanner function, for example. As described above with FIG. 2, the MFP 1 of the second embodiment includes the controller 7, the communication device 15, the operation device 16, the scanner engine 17, and the printer engine 18.

The controller 7 includes the CPU 10, the ASIC 11, the memory 12, the HDD 13, and the timer 14, which are communicably connected to each other via a bus line.

The communication device 15 is connected to the network 5, and acquires the job execution command, such as the scan instruction or the print instruction, for example, which is input in voice via the smart speaker 100, as described later.

The operation device 16 is implemented as a touch panel integrating an LCD and a touch sensor. When issuing a command for executing a desired operation with the operation device 16, the user specifies the desired operation by touching and operating an operation button (i.e., a software key) displayed on the operation device 16.

The scanner engine 17 controls the scanner to optically read a document. The printer engine 18 controls the image writing device to print an image on a transfer sheet, for example. The CPU 10 performs overall control of the MFP 1, which functions as an image forming apparatus. The ASIC 11 is an LSI circuit that performs various image processing for images to be processed by the scanner engine 17 and the printer engine 18. Each of the scanner engine 17 and the printer engine 18 is a functional unit that executes the job in accordance with the job execution command acquired from the smart speaker 100.

The memory 12 stores various applications to be executed by the CPU 10 and various data for use in the execution of the applications. The HDD 13 stores image data, various programs, font data, and various files, for example. The controller 7 may include an SSD in place of or in addition to the HDD 13.

A hardware configuration of the smart speaker 100 of the second embodiment will be described.

Similarly to the mobile terminal 2 illustrated in FIG. 3, the smart speaker 100 includes the CPU 21, the RAM 22, the ROM 23, the IF 24, and the communication device 25, which are connected to each other via the bus line 26.

The ROM 23 stores an operation voice processing program 200B. The CPU 21 executes the operation voice processing program 200B to acquire audio information from the microphone 29 (an example of voice input device) and transmit the audio information to the cloud service 2000. The CPU 21 further controls the touch panel 27 to display data acquired from the cloud service 2000 (e.g., audio data, text data, or image data), or controls the speaker 28 to output sound.

The I/F 24 is connected to the touch panel 27, the speaker 28, and the microphone 29. The microphone 29 collects (i.e., acquires) voice in telephone conversation and voice of the user input to issue the job execution command to the MFP 1. The input voice is transmitted to the cloud service 2000 via the communication device 25.

A hardware configuration of the cloud service 2000 of the second embodiment will be described.

The voice recognition server 3 and the AI assistant server 4, which provide the cloud service 2000, includes the CPU 31, the RAM 32, the ROM 33, the HDD 34, the I/F 35, and the communication device 36, which are connected to each other via the bus line 37, similarly as in the configuration illustrated in FIG. 4.

The I/F 35 is connected to the display 38 and the operation device 39. The HDD 34 stores an operation voice conversion program 300B. The operation voice conversion program 300B converts audio data into text data, and determines whether the text data matches previously defined dictionary information. If the text data matches the dictionary information, the operation voice conversion program 300B converts the text data into intent representing the intention of the user and parameters representing variables of job conditions, for example. The HDD 34 further stores a voice assistant program 500 and a management program 600. The voice assistant program 500 holds the dictionary information. The management program 600 converts the intent and the parameters into a job execution command in a format interpretable by the MFP 1, and transmits the job execution command to the registered MFP 1.

The CPU 31 executes the operation voice conversion program 300B, the voice assistant program 500, and the management program 600. The operation voice conversion program 300B, the voice assistant program 500, and the management program 600 may be executed by one server, by a plurality of different servers, or by a plurality of servers cooperating with each other.

A description will be given of functions based on the operation voice processing program 200B, the operation voice conversion program 300B, the voice assistant program 500, and the management program 600 of the second embodiment.

Figure 24:
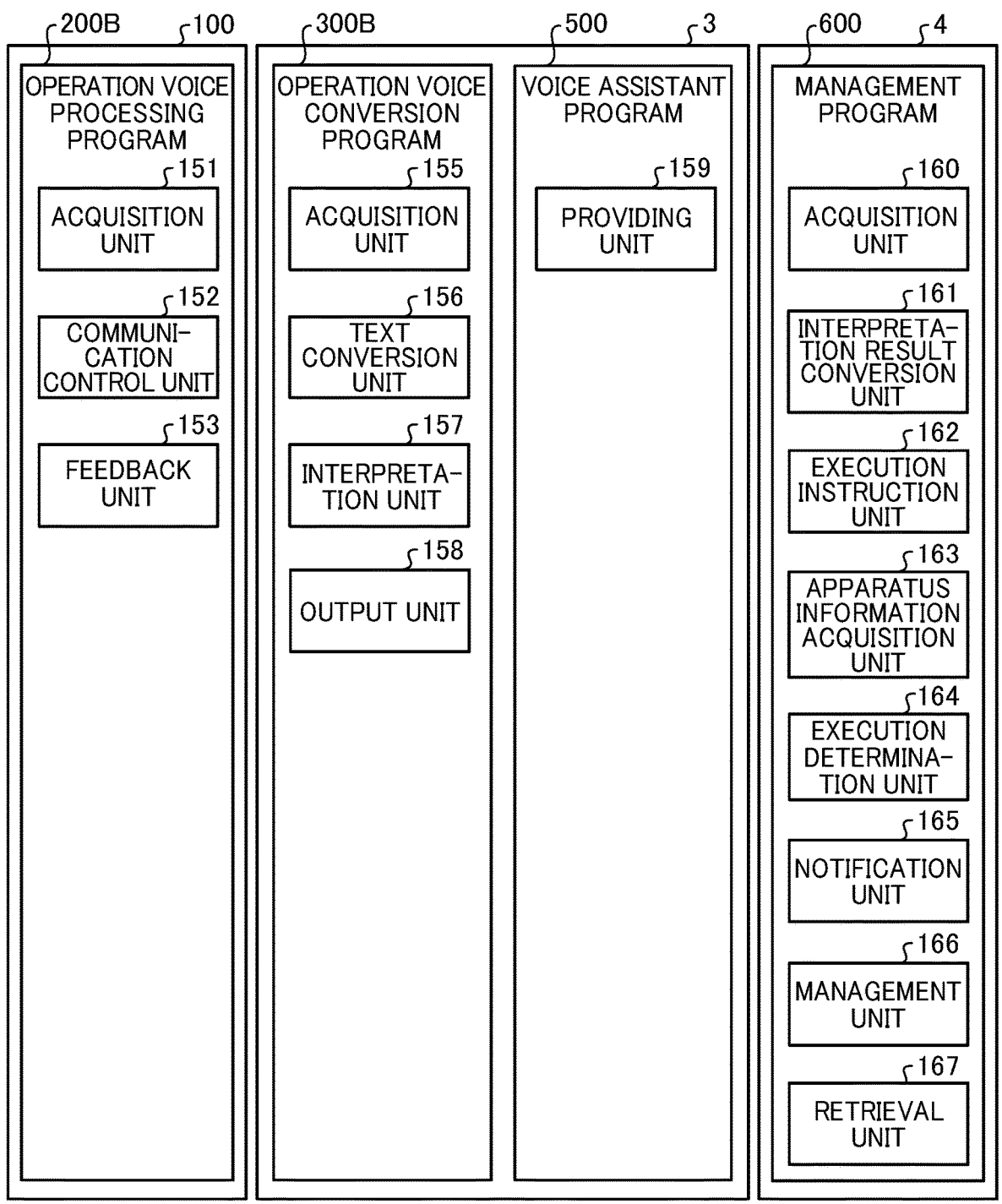
FIG. 24 is a diagram illustrating functions implemented through execution of an operation voice processing program by a central processing unit (CPU) of a smart speaker included in the voice operation system of the second embodiment.

FIG. 24 is a diagram illustrating functions implemented through the execution of the operation voice processing program 200B by the CPU 21 of the smart speaker 100. FIG. 24 further illustrates functions implemented through the execution of the operation voice conversion program 300B and the voice assistant program 500 by the CPU 31 of the voice recognition server 3. FIG. 24 further illustrates functions implemented through the execution of the management program 600 by the CPU 31 of the AI assistant server 4.

The functions implemented by the operation voice processing program 200B of the second embodiment will be described.

The CPU 21 of the smart speaker 100 executes the operation voice processing program 200B stored in a memory such as the ROM 23, to thereby function as an acquisition unit 151, a communication control unit 152, and a feedback unit 153.

The acquisition unit 151 acquires the voice of the user collected via the microphone 29, i.e., the instruction voice of the user for the voice operation of the MFP 1. The acquisition unit 151 may acquire the user operation and instruction via the touch panel 27 or a physical switch, for example. The communication control unit 152 controls the communication between the smart speaker 100 and the cloud service 2000. The communication control unit 152 transmits the information acquired by the acquisition unit 151 to the cloud service 2000, and acquires text data, image data, or audio data from the cloud service 2000. When transmitting the information acquired by the acquisition unit 151 to the cloud service 2000, the communication control unit 152 transmits to the cloud service 2000 the device ID identifying the smart speaker 100.

The feedback unit 153 outputs audio feedback for prompting the user to input missing data or audio feedback for prompting the user to confirm the input operation, for example, to implement an interactive voice input operation. The feedback unit 153 may also provide text or image feedback to the user by displaying an image or text on the touch panel 27.

In the present example, the acquisition unit 151, the communication control unit 152, and the feedback unit 153 are implemented by software. Alternatively, a part or all of these units may be implemented by hardware such as an IC. Further, the functions of these units may be implemented by the single operation voice processing program 200B. Further, a part of the processing of these units may be executed by another program, or may be indirectly executed with another program.

The functions implemented by the operation voice conversion program 300B of the second embodiment will be described.

The CPU 31 of the voice recognition server 3 executes the operation voice conversion program 300B stored in the HDD 34, to thereby function as an acquisition unit 155, a text conversion unit 156, an interpretation unit 157, and an output unit 158. The acquisition unit 155 acquires the audio data of the input voice of the user transmitted from the smart speaker 100. The acquisition unit 155 may further acquire a user operation performed on the touch panel 27, a button, or a switch of the smart speaker 100, for example.

The text conversion unit 156 converts the audio data of the input voice of the user into text data. The interpretation unit 157 interprets the instruction from the user based on the text data. Specifically, based on the dictionary information provided by the voice assistant program 500, the interpretation unit 157 determines whether a word or phrase included in the text data matches the dictionary information. If the word or phrase included in the text data matches the dictionary information, the interpretation unit 157 converts the text data into the intent representing the intention of the user and the parameters representing the variables of the job conditions. The interpretation unit 157 transmits the intent and the parameters to the management program 600 together with the device ID of the smart speaker 100 for identifying the smart speaker 100 that acquires the audio data. The output unit 158 controls the communication of the communication device 36 to transmit data such as text data, audio data, or image data to the smart speaker 100.

In the present example, the acquisition unit 155, the text conversion unit 156, the interpretation unit 157, and the output unit 158 are implemented by software. Alternatively, a part or all of these units may be implemented by hardware such as an IC. Further, the functions of these units may be implemented by the single operation voice conversion program 300B. Further, a part of the processing of these units may be executed by another program, or may be indirectly executed with another program. For example, a part or all of the functions of the interpretation unit 157 based on the operation voice conversion program 300B may be implemented by the voice assistant program 500. In this case, the voice assistant program 500 may determine whether a word or phrase included in the text data matches the dictionary information, for example. Then, if the word or phrase in the text data matches the dictionary information, the voice assistant program 500 may convert the text data into the intent representing the intention of the user and the parameters representing the variables of the job conditions, and the interpretation unit 157 may acquire the intent and the parameters from the voice assistant program 500.

The functions implemented by the voice assistant program 500 of the second embodiment will be described.

The CPU 31 of the voice recognition server 3 executes the voice assistant program 500 stored in the HDD 34, to thereby function as a providing unit 159. The providing unit 159 manages the dictionary information, which is stored in the HDD 34 and previously defines the relationship between the text data, the intent, and the parameters. The providing unit 159 provides the dictionary information to the operation voice conversion program 300B. The providing unit 159 may further interpret an operation instruction from the user based on the text data. Specifically, the providing unit 159 may acquire the text data from the operation voice conversion program 300B, and determine whether a word or phrase included in the text data matches the dictionary information. Then, if the word or phrase in the text data matches the dictionary information, the providing unit 159 may convert the text data into the intent and the parameters, and provide the intent and the parameters to the operation voice conversion program 300B.

In the present example, the providing unit 159 is implemented by software. Alternatively, a part or all of the providing unit 159 may be implemented by hardware such as an IC similarly as in the foregoing programs.

The functions implemented by the management program 600 of the second embodiment will be described.

The CPU 31 of the AI assistant server 4 executes the management program 600 stored in the HDD 34, to thereby function as an acquisition unit 160, an interpretation result conversion unit 161, an execution instruction unit 162, an apparatus information acquisition unit 163, an execution determination unit 164, a notification unit 165, a management unit 166, and a retrieval unit 167.

The acquisition unit 160 acquires the intent, the parameters, and the device ID of the smart speaker 100, which are transmitted from the voice recognition server 3. The interpretation result conversion unit 161 converts an interpretation result, which includes the intent and the parameters converted by the operation voice conversion program 300B, into a job execution command interpretable by the MFP 1. The execution instruction unit 162 transmits the job execution command to the MFP 1 to instruct the MFP 1 to execute the job.

The execution instruction unit 162 refers to the association DB 102, and transmits the job execution command to the MFP 1 associated with the smart speaker 100. That is, the execution instruction unit 162 acquires the intent, the parameters, and the device ID identifying the smart speaker 100 used by the user, detects from the association DB 102 the MFP 1 associated with the acquired device ID, and transmits the job execution command to the detected MFP 1.

The apparatus information acquisition unit 163 acquires, from the MFP 1, apparatus information representing the processing capability of the MFP 1, such as the maximum processsable pixel number of the MFP 1, for example. The apparatus information acquisition unit 163 stores, in a memory such as the HDD 34, apparatus information acquired from a plurality of information processing apparatuses including the MFP 1 in association with identification information of the information processing apparatuses, such as the apparatus IDs identifying the information processing apparatuses, and manages the stored apparatus information.

The apparatus information acquisition unit 163 further acquires information of the apparatus state, which includes information representing the connection state indicating whether communication connection with the MFP 1 is established, the power state of the MFP 1 such as the power-on state, the power-off state, or the sleep-mode state, the occurrence or non-occurrence of an error and the type of the error, the remaining amounts of consumables such as paper and toner, the login state of the user, and authorization information representing functions authorized to be used by a logged-in user.

The execution determination unit 164 compares the processing capability of the MFP 1 represented by the apparatus information with the job specified by the user (i.e., the intent and parameters generated by the operation voice conversion program 300B), to thereby determnnine whether the job specified by the user is executable with the MFP 1. If the execution determination unit 164 determines that the job specified by the user is executable with the MFP 1, the job execution command is transmitted to the MFP 1. If the execution determination unit 164 determines that the job specified by the user is not executable with the MFP 1, response information such as an error message is fed back to the smart speaker 100 via the operation voice conversion program 300B.

The notification unit 165 transmits data such as text data, audio data, or image data to the operation voice conversion program 300B as the response to the job execution instruction from the user. If any of the parameters representing the job conditions for executing the job is unspecified, the notification unit 165 outputs feedback to the smart speaker 100 via the operation voice conversion program 300B, to thereby prompt the user to input the value of the unspecified parameter. In this case, the notification unit 165 may transmit parameter information as information for use in checking with the user about the unspecified parameter. Further, the notification unit 165 may transmit text data, audio data, or image data as information for use in prompting the user to specify the unspecified parameter.

The management unit 166 registers, in the association DB 102, the device ID of the smart speaker 100 and the apparatus ID of the MFP 1 in association with each other based on the information and instruction input to the MFP 1, the smart speaker 100, or a client device connected to the cloud service 2000 via the network 5. In the association DB 102, information associating the device ID of the smart speaker 100 with the apparatus ID of the MFP 1 is held in a management table, for example.

In the present example, the acquisition unit 160, the interpretation result conversion unit 161, the execution instruction unit 162, the apparatus information acquisition unit 163, the execution determination unit 164, the notification unit 165, the management unit 166, and the retrieval unit 167 are implemented by software. Alternatively, a part or all of these units may be implemented by hardware such as an IC similarly as in the foregoing programs.

Each of the operation voice processing program 200B, the operation voice conversion program 300B, the voice assistant program 500, and the management program 600 may be provided as recorded on a computer-readable recording medium, such as a CD-ROM or an FD, in an installable or executable file format. Further, the program may be provided as recorded on a computer-readable recording medium, such as a CD-R, a DVD, a Blu-ray disc, or a semiconductor memory. Further, the program may be provided as installed in the corresponding device or apparatus via a network such as the Internet, or may be previously stored in a ROM or another memory of the device or apparatus.

An overall procedure of the voice input operation of the second embodiment will be described.

Figure 25:
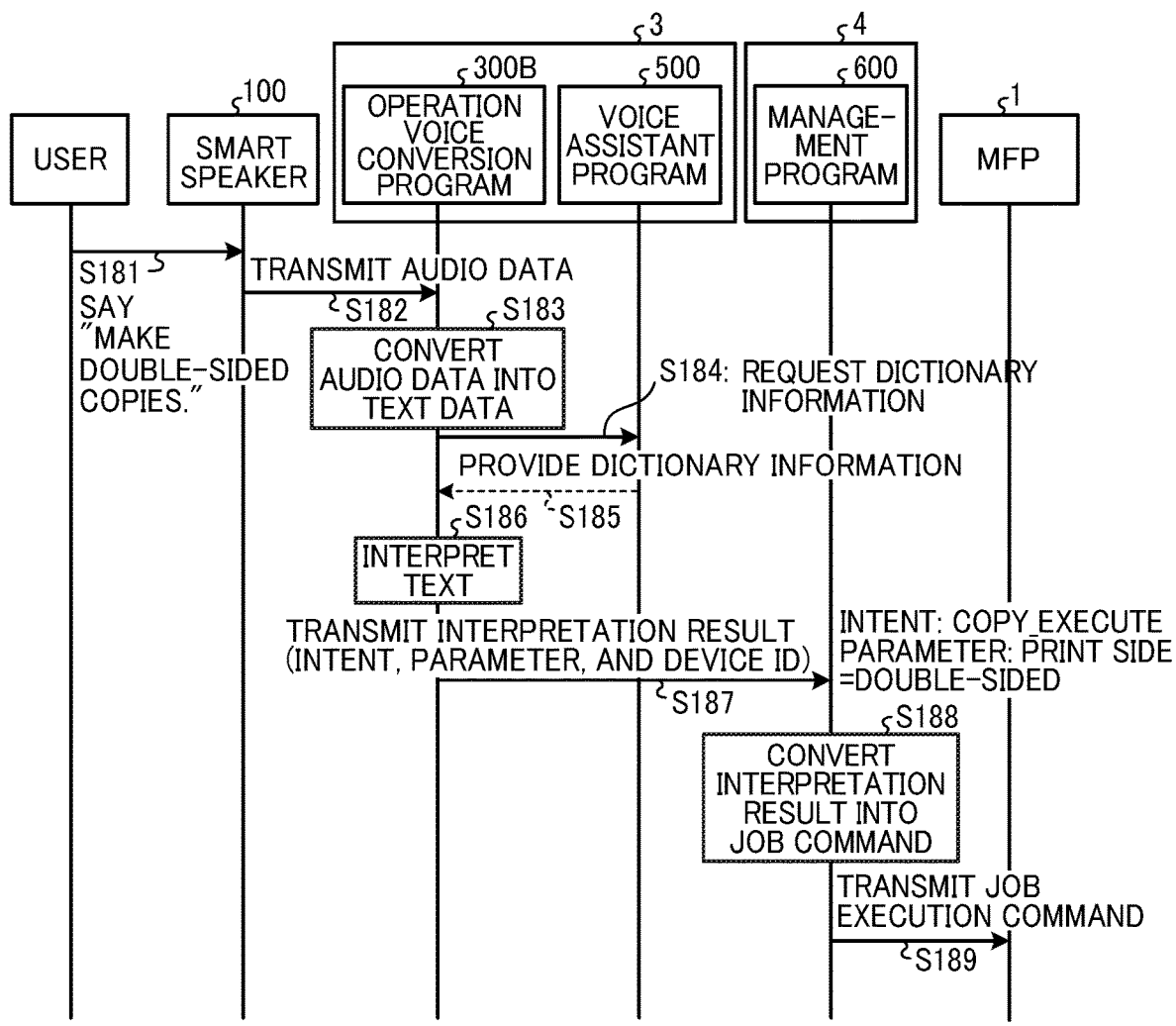
FIG. 25 is a sequence diagram illustrating an overall procedure of a voice input operation performed in the voice operation system of the second embodiment.

FIG. 25 is a sequence diagram illustrating an overall procedure of the voice input operation performed in the voice operation system 1000B of the second embodiment. In the example of FIG. 25, the voice input operation is performed via the smart speaker 100 to implement the duplex copy function of the MFP 1. In this case, the user starts the operation voice processing program 200B of the smart speaker 100, and says "Make double-sided copies," for example (step S181). In the smart speaker 100, the microphone 29 collects the voice of the user, and the acquisition unit 151 acquires the collected voice of the user. The operation voice processing program 200B may be started at the same time as the start-up of the smart speaker 100. Alternatively, the operation voice processing program 200B may be started when a predetermined operation is performed on the smart speaker 100 or when predetermined sound is input to the smart speaker 100.

The communication control unit 152 of the smart speaker 100 transmits audio data of the utterance "Make double-sided copies" to the voice recognition server 3 of the cloud service 2000 (step S182). In this step, the communication control unit 152 also transmits to the voice recognition server 3 the device ID of the smart speaker 100 for identifying the smart speaker 100. The text conversion unit 156 of the voice recognition server 3 based on the operation voice conversion program 300B converts the audio data of the utterance "Make double-sided copies" into text data (step S183).

Based on the dictionary information acquired from the voice assistant program 500 (steps S184 and S185), the interpretation unit 157 determines whether a word or phrase included in the text data matches the dictionary information (step S186). If the word or phrase included in the text data matches the dictionary information, the interpretation unit 157 converts the text data into the intent representing the operation specified by the user and the parameters representing the variables of the job conditions, and transmits the intent and the parameters to the AI assistant server 4 together with the device ID for identifying the smart speaker 100 that acquires the audio data (step S187).

Specifically, in the present example, the interpretation unit 157 interprets that the operation that the MFP 1 is requested to execute is copying (i.e., INTENT: COPY_EXECUTE), and that the print side is double-sided (i.e., PRINT SIDE=DOUBLE-SIDED) (step S186). The interpretation unit 157 thus generates an interpretation result based on the text data. The interpretation result represents the type (i.e., intent) and contents (i.e., parameters) of the job specified by the user. The interpretation result is transmitted to the management program 600 (step S187). In this step, the interpretation unit 157 may transmit to the AI assistant server 4 the device ID, which identifies the smart speaker 100 as the source of the transmitted audio data, in association with the interpretation result.

The interpretation result conversion unit 161 of the AI assistant server 4 based on the management program 600 converts the interpretation result acquired from the voice recognition server 3 into a job execution command to the MFP 1 (step S188). Examples of the interpretation result and the job execution command converted from the interpretation result are similar to those described above with TABLE 1. Information similar to that of TABLE 1 may be stored in a memory such as the HDD 34 of the AI assistant server 4 such that the interpretation result conversion unit 161 refers to the stored information to convert the interpretation result into the job execution command.

In the examples of TABLE 1, "COPY_EXECUTE," "SCAN_EXECUTE," "PRINT_EXECUTE," and "FAX_EXECUTE" are examples of the intent, and "PRINT SIDE" and "QUANTITY" are examples of the parameter. Examples of the parameter include all other parameters specifiable as job setting values.

The interpretation result conversion unit 161 of the AI assistant server 4 converts the interpretation result of the intent "COPY_EXECUTE" into a job execution command to the MFP 1 to execute a copy job. The interpretation result conversion unit 161 similarly converts the interpretation result of the intent "SCAN_EXECUTE" into a job execution command to the MFP 1 to execute a scan job, converts the interpretation result of the intent "PRINT_EXECUTE" into a job execution command to the MFP 1 to execute a print job, and converts the interpretation result of the intent "FAX_EXECUTE" into a job execution command to the MFP 1 to execute a FAX job.

The above-described jobs are examples of basic jobs executed by the MFP 1. However, the jobs interpretable with the cloud service 2000 are not limited to these basic jobs, and may include a job of causing a communication target (e.g., the MFP 1) to collect and transmit the apparatus information to the cloud service 2000 and a job of causing a display of the communication target to display predetermined information stored in a memory of the communication target.

Further, if the interpretation result includes the parameter "print side," the interpretation result conversion unit 161 generates a job execution command to the MFP 1 to change the setting value of the print side. Similarly, if the interpretation result includes the parameter "quantity," the interpretation result conversion unit 161 generates a job execution command to the MFP 1 to change the setting value of the quantity.

That is, the interpretation result conversion unit 161 converts the interpretation result into the job execution command by determining the intention of the user, such as the type of job to be executed by the MFP 1, for example, based on the information included in the intent of the interpretation result, and determining the value included in the parameter of the interpretation result as the job setting value.

The execution instruction unit 162 of the AI assistant server 4 transmits the thus-generated job execution command to the MFP 1 via the communication device 36 (step S189). In the present example, a job execution command "COPY_EXECUTE (PRINT SIDE=DOUBLE-SIDED)" is transmitted to the MFP 1. The execution instruction unit 162 transmits the job execution command to the MFP 1 specified by the management unit 166, i.e., transmits an instruction to execute the job to the MFP 1 identified by the apparatus ID associated with the device ID identifying the smart speaker 100 as the source of the transmitted audio data. Thereby, the MFP 1 executes duplex copying.

Details of the interpretation operation performed in the cloud service 2000 of the second embodiment will be described.

The HDD 34 of the voice recognition server 3 stores the dictionary information. The operation voice conversion program 300B generates the intent and the parameters based on the dictionary information. More specifically, the operation voice conversion program 300B determines whether a word or phrase included in the text data converted from the audio data matches the dictionary information. Then, if the word or phrase in the text data matches the dictionary information, the operation voice conversion program 300B generates the interpretation result including the intent and parameters defined in the dictionary information.

The dictionary information may be in any format as long as it is possible to generate the intent and the parameters based on the dictionary information. For instance, in the present example, the dictionary information includes entity information, intent information, and association information. The entity information associates a parameter of a job with a natural language. It is possible to register a plurality of synonyms for one parameter. The intent information represents the type of the job. The association information associates a phrase uttered by the user in the natural language with the entity information, and associates the phrase uttered by the user in the natural language with the intent information. The association information enables correct interpretation even if the order of utterance of the parameter or the nuance of the parameter is somewhat changed. Further, with the association information, the response text of the interpretation result may be generated based on the input data.

FIG. 10 described above illustrates an example of the entity information, specifically the entity information corresponding to print color. In FIG. 10, a character string "printColor" represents the entity name, and character strings on the left side such as "auto_color," "monochrome," and "color" represent parameter names. Further, in FIG. 10, phrases on the right side such as "auto_color," "monochrome, black and white" and "color, full color" represent synonyms.

As understood from FIG. 10, a parameter and synonyms thereof are stored in association with each other as the entity information. That is, the synonyms are registered as well as the parameter. For example, therefore, when issuing an instruction to make monochrome copies, both utterances "Please make black-and-white copies" and "Please make monochrome copies" enable parameter setting.

In FIG. 11, (a) illustrates exemplary user utterance phrases, (b) illustrates an exemplary intent name, and (c) illustrates exemplary entity information. As illustrated in (a) to (c) of FIG. 11, one of the user utterance phrases is dragged on a screen displayed on the display 38 of the AI assistant server 4, as indicated by the arrow in FIG. 11, through the operation of the operation device 39. Alternatively, one of the user utterance phrases may be dragged on a screen displayed on a screen displayed on a display of an apparatus having accessed the cloud service 2000 via a network through the operation of an operation device of the apparatus.

The entity information to be associated with the corresponding information is thus selected. Further, if the value is set in the selected entity information, the parameter included in the response is changed. For example, if the value is set as "SprintColor" for the utterance "Please make black-and-white copies," "printColor=monochrome" is returned as the return value. If the value is set as "SprintColor.original," "printColor=black and white" is returned as the return value, and the same contents as those of the user utterance are returned as the parameter in the response.

An interactive operation of the second embodiment will be described.

The voice operation system 1000B of the second embodiment implements an interactive system that responds to user input. Specifically, the voice operation system 1000B of the second embodiment implements an interactive MFP operation system by outputting two types of responses: input lack feedback and input confirmation feedback, as well as responses with fixed sentences for interaction, as the responses to the operation of the MFP 1.

The input lack feedback is a response output when the information for use in executing the job is incomplete. The input lack feedback is output when the result of user input is not recognized or when a necessary parameter is missing (i.e., unspecified). That is, it is unnecessary to output the input lack feedback when a parameter other than the necessary parameter is unspecified. The input lack feedback may be applied not only to the process of checking with the user about the parameter but also to the process of checking with the user about the function to be used such as the copy function or the scan function.

For example, the functions and parameters to be checked with the user may be changed depending on the type of the information processing apparatus currently in communication with the cloud service 2000. In this case, the apparatus information acquisition unit 163 may acquire information of the type and functions of the information processing apparatus at a predetermined time after the communication with the information processing apparatus is established, and the audio feedback unit 153 may determine the functions and parameters to be checked with the user based on the acquired information, for example.

If the type of the information processing apparatus is the MFP, for example, the functions of the MFP 1, such as the copy function, the print function, the scan function, and the FAX function, may be checked with the user. Further, which one of the functions of the MFP 1, such as the copy function, the print function, the scan function, and the FAX function, is to be used may be checked with the user. Further, the necessary parameter may be changed depending on the setting condition specified by the user. For example, if the print condition specified by the user is variable magnification printing, the print sheet size is set as the necessary parameter. Further, if the print condition specified by the user is duplex printing, the setting of whether to print one side or two sides of the document is set as the necessary parameter. Further, if the print condition specified by the user is bookbind printing, settings such as the finished size and the number of pages to be included in one page are set as the necessary parameters.

The input confirmation feedback is a response output when the information for use in executing the job is complete. That is, the input confirmation feedback is output when all necessary parameters are specified. Further, the input confirmation feedback is output to prompt the user to select between executing the job with the current setting values and changing the setting values. To check with the user whether to execute the job with the current setting values, each of the parameters specified by the user may be output as sound regardless of whether the parameter is a necessary parameter or not.

A description will be given of an example of the interactive operation of the MFP 1 of the second embodiment to make two double-sided copies.

FIGS. 26 to 34 are sequence diagrams illustrating a procedure of the above-described interactive operation of the second embodiment.

Figure 26:
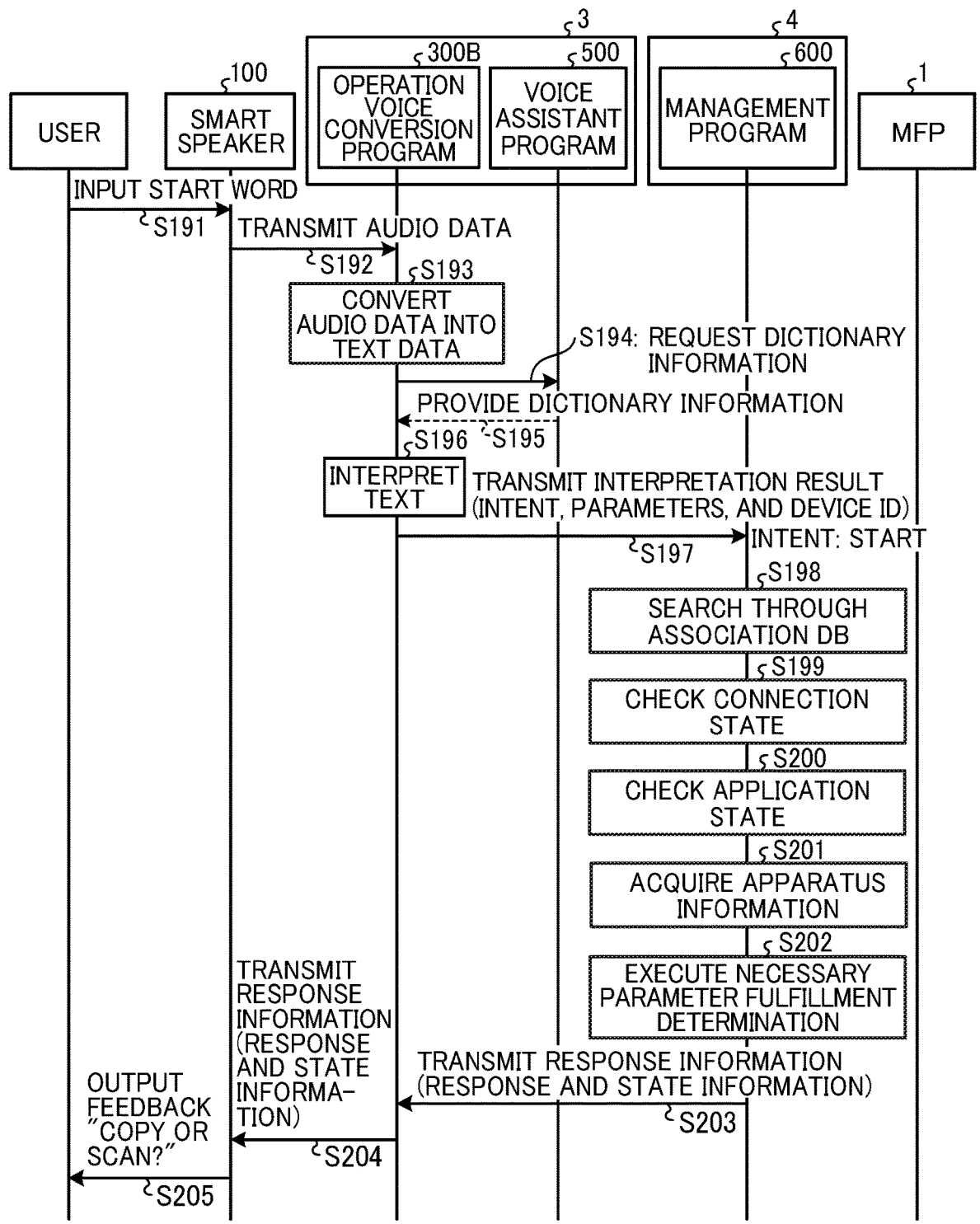
FIG. 26 is a sequence diagram illustrating a procedure of an operation performed in the voice operation system of the second embodiment to start a voice assistant program.

The sequence diagram of FIG. 26 illustrates a procedure of an operation of starting the voice assistant program 500. In FIG. 26, the user first performs an operation of starting the operation voice processing program 200B of the smart speaker 100, and issues an instruction to start the voice assistant program 500 through voice input, for example. For instance, the user utters a start word for starting the voice assistant program 500, to thereby start the voice assistant program 500 of the voice recognition server 3 (step S191).

The communication control unit 152 of the smart speaker 100 transmits audio data of the start word to the voice recognition server 3 (step S192). The text conversion unit 156 of the voice recognition server 3 converts the audio data of the start word into text data (step S193). Based on the dictionary information stored in the HDD 34 and provided by the voice assistant program 500 (steps S194 and S195), the interpretation unit 157 of the voice recognition server 3 interprets the text data, i.e., converts the text data of the start word into the intent and the parameters (step S196), and transmits the intent and the parameters to the AI assistant server 4 together with the device ID of the smart speaker 100 (step S197).

Based on the intent and the parameters, the execution determination unit 164 of the AI assistant server 4 determines whether all conditions for the job execution are met (steps S198 to S202). For example, the execution determination unit 164 determines whether the necessary parameters are met (step S202). Then, if any of the necessary parameters is not met, response information is transmitted to the smart speaker 100 via the operation voice conversion program 300B of the voice recognition server 3 (steps S203 and S204).

The response information includes text data, audio data, and image data, for example. In the present example, text data of a response "Copy or scan?" is transmitted to the smart speaker 100, for instance. The message of the response is not limited thereto, and may be any message prompting the user to input (i.e., specify) the job type or the job setting conditions. Further, if the smart speaker 100 is not capable of converting text data into audio data, the response may be transmitted as audio data. Further, the feedback to the user may be output not only as sound but also as text or an image displayed on the touch panel 27. Thereby, the feedback unit 153 of the smart speaker 100 outputs audio feedback with the response "Copy or scan?" (step S205).

The above-described step may be omitted if the job type and the job setting conditions are specified when the user issues the instruction to start the voice assistant program 500 of the voice recognition server 3. Further, before transmitting the response information, the execution determination unit 164 of the AI assistant server 4 may detect from the association DB 102 the MFP 1 corresponding to the acquired device ID of the smart speaker 100.

In this case, if the MFP 1 associated with the device ID of the smart speaker 100 is not recorded in the association DB 102, the execution determination unit 164 notifies the user that the smart speaker 100 is not associated with the MFP 1 (i.e., the communication target). For example, the execution determination unit 164 generates response information including a response "This device is not associated with the apparatus." In this case, the execution determination unit 164 may include, in the response, guidance on how to associate the device with the communication target. The detection of the MFP 1 from the association DB 102 and the generation of the response information may be executed at another time when the device ID of the smart speaker 100 is acquired.

Further, before transmitting the response information, the execution determination unit 164 may check the apparatus state of the MFP 1 (i.e., the communication target). In this case, the execution determination unit 164 acquires the apparatus information via the apparatus information acquisition unit 163 or refers to the apparatus information previously acquired by the apparatus information acquisition unit 163, and thereby determines whether it is possible to communicate with the communication target and whether the communication target is available. If the connection with the MFP 1 associated with the device ID of the smart speaker 100 is not established, or if the MFP 1 is being started up and thus is unavailable, for example, the execution determination unit 164 notifies the user of unavailability of the MFP 1.

For example, the execution determination unit 164 generates response information including a response "Apparatus is off-line" or "Apparatus is setting up." In this case, the execution determination unit 164 may include, in the response, guidance on how to respond to the situation. The check of the apparatus state may be executed at another time when the intent, the parameters, and the device ID are acquired from the operation voice conversion program 300B of the voice recognition server 3.

Further, before transmitting the response information, the execution determination unit 164 may check with the MFP 1 (i.e., the communication target) about the state of the application that executes the function specified by the user. In this case, the execution determination unit 164 acquires the apparatus information via the apparatus information acquisition unit 163 or refers to the apparatus information previously acquired by the apparatus information acquisition unit 163, and thereby determines whether the application is installed in the MFP 1 and whether the application is executable.

For example, if the user specifies the execution of the copy function, and if the application of the copy function is not installed in the MFP 1 associated with the device ID of the smart speaker 100 or is being started up and thus is unavailable, for example, the execution determination unit 164 notifies the user of unavailability of the application. For example, the execution determination unit 164 generates response information including a response "Application is not installed" or "Application is unavailable now." In this case, the execution determination unit 164 may include, in the response, guidance on how to respond to the situation.

The check of the application state may be executed at another time when the intent, the parameters, and the device ID are acquired from the operation voice conversion program 300B. Further, before transmitting the response information, the execution determination unit 164 may acquire the apparatus information via the apparatus information acquisition unit 163 or may read the apparatus information previously acquired by the apparatus information acquisition unit 163. The acquired apparatus information is used to determine whether the MFP 1 is capable of executing the job with the job type and the job conditions specified by the user, for example.

Figure 27:
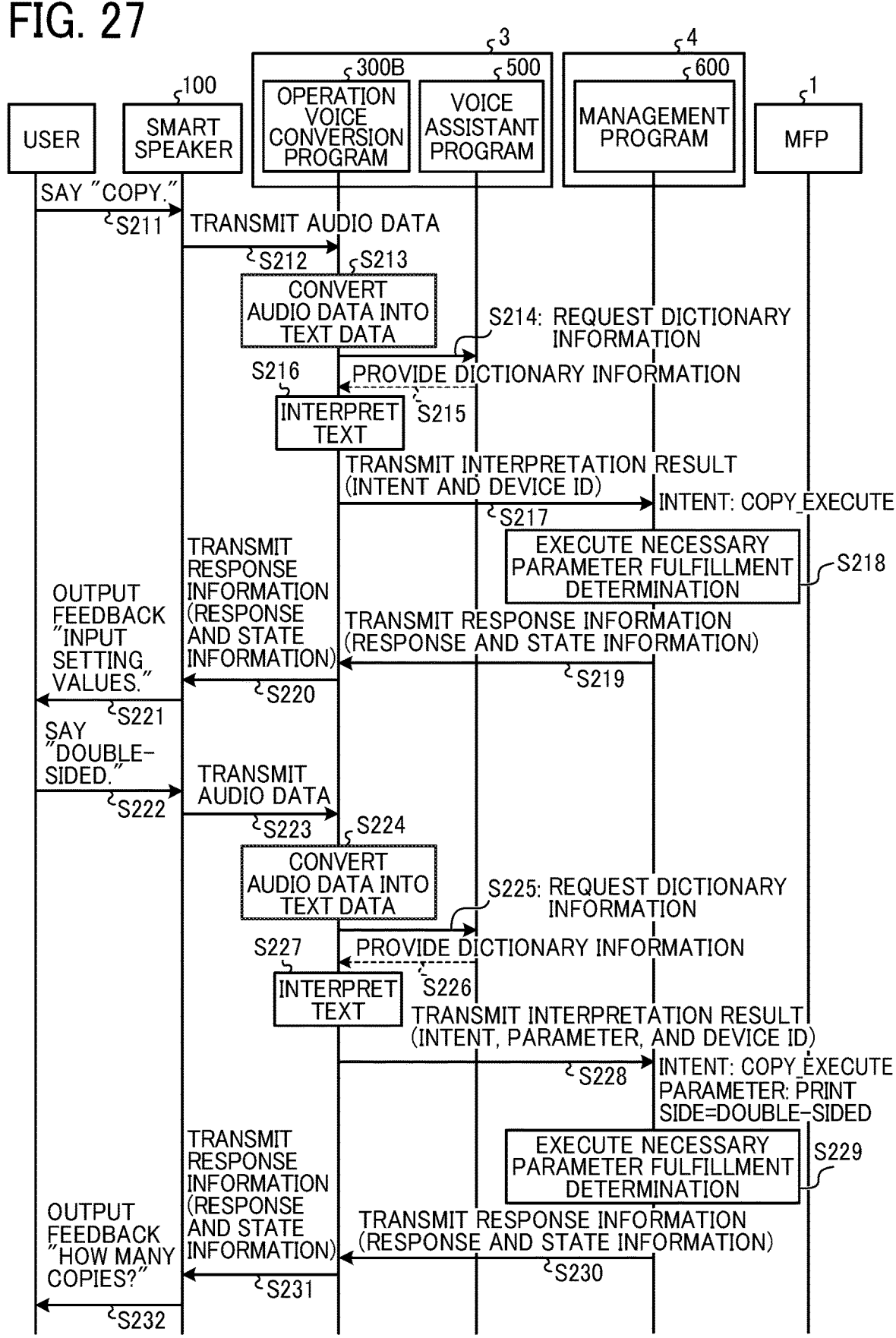
FIG. 27 is a sequence diagram illustrating a procedure of an operation performed in the voice operation system of the second embodiment in response to an instruction to execute a copy function.

FIG. 27 is a sequence diagram illustrating a procedure of an operation performed in response to the instruction to execute the copy function. If the user utters a word "Copy" in response to the audio feedback "Copy or scan?" at step S205 in FIG. 26 or when issuing the instruction to start the voice assistant program 500 (step S211), the communication control unit 152 of the smart speaker 100 transmits audio data of the utterance "Copy" to the voice recognition server 3 (step S212). The text conversion unit 156 of the voice recognition server 3 based on the operation voice conversion program 300B converts the audio data of the utterance "Copy" into text data (step S213).

As described above with FIGS. 10 and 11, the interpretation unit 157 of the voice recognition server 3 interprets the user utterance phrase represented by the text data (steps S214 to S216), and transmits the intent and the parameters as the interpretation result to the AI assistant server 4 together with the device ID of the smart speaker 100. In the present example, the interpretation unit 157 generates an interpretation result including an intent "COPY_EXECUTE," and transmits the interpretation result to the management program 600 (step S217).

In the present example, the user has uttered the word "Copy," but copy conditions such as the number of copies and the print side (i.e., single-sided or double-sided) are unknown (i.e., not input). Therefore, the execution determination unit 164 of the AI assistant server 4 based on the management program 600 determines that the necessary parameters are not met (step S218). The AI assistant server 4 therefore inquires of the smart speaker 100 about the unspecified parameters (steps S219 and S220).

Specifically, the execution determination unit 164 of the AI assistant server 4 generates response information including a response "Input setting values," for example. The notification unit 165 of the AI assistant server 4 based on the management program 600 transmits the response information to the smart speaker 100 via the operation voice conversion program 300B of the voice recognition server 3 (step S220). The feedback unit 153 of the smart speaker 100 outputs the input lack feedback by outputting sound "Input setting values" via the smart speaker 100 and displaying text "Input setting values" on the touch panel 27 (step S221). One of the audio output via the smart speaker 100 and the text display on the touch panel 27 may be omitted.

When transmitting the response information to the operation voice conversion program 300B, the notification unit 165 of the AI assistant server 4 based on the management program 600 may also transmit state information indicating that the session is ongoing. The state information represents the state of the session. For example, if the job execution command to the information processing apparatus such as the MFP 1 is not transmitted yet and the user is performing the job setting process, state information indicating the continuation of the session is transmitted. If the transmission of the job execution command to the information processing apparatus is completed, state information indicating the completion of the session is transmitted.

However, the state information is not limited thereto, and may be more detailed information of the session state. The interpretation unit 157 of the voice recognition server 3 based on the operation voice conversion program 300B determines whether to continue or complete the session in accordance with the state information. That is, if the user specifies the job setting conditions with a plurality of utterances, and if the state information indicates that the session is ongoing, the interpretation unit 157 based on the operation voice conversion program 300B determines that the job setting conditions belong to one job. If the state information indicates that the session is completed, the interpretation unit 157 determines that the job setting condition included in the next utterance of the user belongs to a new job. Even if the instruction concerning the job type and the job setting conditions is issued with a plurality of utterances, therefore, the operation voice conversion program 300B of the voice recognition server 3 is capable of determining whether the job type and the job setting conditions belong to the same one job or different jobs.

If no signal is received from the smart speaker 100 for at least a predetermined time, the operation voice conversion program 300B of the voice recognition server 3 may determine that the session is completed. Even if the voice recognition server 3 manages the session, the communication target (i.e., the MFP 1) may execute the job regardless of the continuation or discontinuation of the session. In this case, the MFP 1 as the communication target acquires the job execution command, and overwrites the job conditions currently held in the MFP 1 with the job conditions included in the acquired job execution command. In this process, all job conditions held in the communication target may be deleted or reset to the default conditions to set the job conditions included in the job execution command.

Alternatively, if any of the job conditions held in the communication target is inconsistent with the corresponding one of the job conditions included in the job execution command, the job condition held in the communication target may be overwritten with the corresponding job condition in the job execution command, which is given priority. If any of the job conditions held in the communication target is consistent with the corresponding one of the job conditions included in the job execution command, the job condition held in the communication target may be maintained. After the job is executed, the communication target may delete the job conditions included in the job execution command and reset the job conditions of the communication target back to the default conditions previously registered in the communication target.

In response to the input lack feedback, the user utters a phrase "Double-sided," for example, to specify a copy condition (step S222). The communication control unit 152 of the smart speaker 100 transmits audio data of the utterance "Double-sided" to the voice recognition server 3, to thereby request the voice recognition server 3 to convert the audio data into text data (step S223). The text conversion unit 156 of the voice recognition server 3 based on the operation voice conversion program 300B converts the audio data of the utterance "Double-sided" into text data (step S224).

The interpretation unit 157 of the voice recognition server 3 interprets the user utterance phrase represented by the text data (steps S225 to S227), and transmits the intent and the parameter as the interpretation result to the AI assistant server 4 together with the device ID of the smart speaker 100 (step S228).

In the present example, the interpretation unit 157 generates an interpretation result including the parameter "PRINT SIDE=DOUBLE-SIDED." Thereby, the interpretation unit 157 transmits to the AI assistant server 4 an interpretation result including the intent "COPY_EXECUTE" and the parameter "PRINT SIDE=DOUBLE-SIDED" by combining the parameter with the intent included in the last utterance.

In the present example, the user has uttered the phrases "Copy" and "Double-sided," but the number of copies is unknown. That is, the lack of a necessary parameter occurs again. In the above description, the operation voice conversion program 300B of the voice recognition server 3 generates the intent and the parameter by integrating the interpretation result of the last utterance and the interpretation result of the present utterance. However, the generation of the intent and the parameter is not limited thereto. For example, the management program 600 of the AI assistant server 4 may store the interpretation result of the last utterance and generate the intent and the parameter by integrating the stored interpretation result of the last utterance and the interpretation result of the present utterance. In this case, the interpretation unit 157 of the voice recognition server 3 may transmit, to the management program 600 of the AI assistant server 4, the parameter "PRINT SIDE=DOUBLE-SIDED" newly acquired in the present utterance but not the intent "COPY_EXECUTE" included in the last utterance.

Information about which one of the parameters is a necessary parameter may be previously stored in a memory of the AI assistant server 4 such as the HDD 34. In this case, based on the information of the necessary parameters stored in the memory, the execution determination unit 164 of the AI assistant server 4 may determine whether all necessary parameters are set with the parameters acquired from the smart speaker 100. If any of the necessary parameters is not set, the AI assistant server 4 may prompt the user to set the necessary parameter via the smart speaker 100.

Therefore, the execution determination unit 164 of the AI assistant server 4 based on the management program 600 generates response information including a response "How many copies?" (step S229). Then, the notification unit 165 of the AI assistant server 4 transmits the response information to the smart speaker 100 via the operation voice conversion program 300B of the voice recognition server 3 (steps S230 and S231). The feedback unit 153 of the smart speaker 100 outputs the input lack feedback by outputting sound "How many copies?" via the speaker 28 and displaying text "How many copies?" on the touch panel 27 (step S232).

A quantity setting operation of the second embodiment will be described.

Figure 28A:
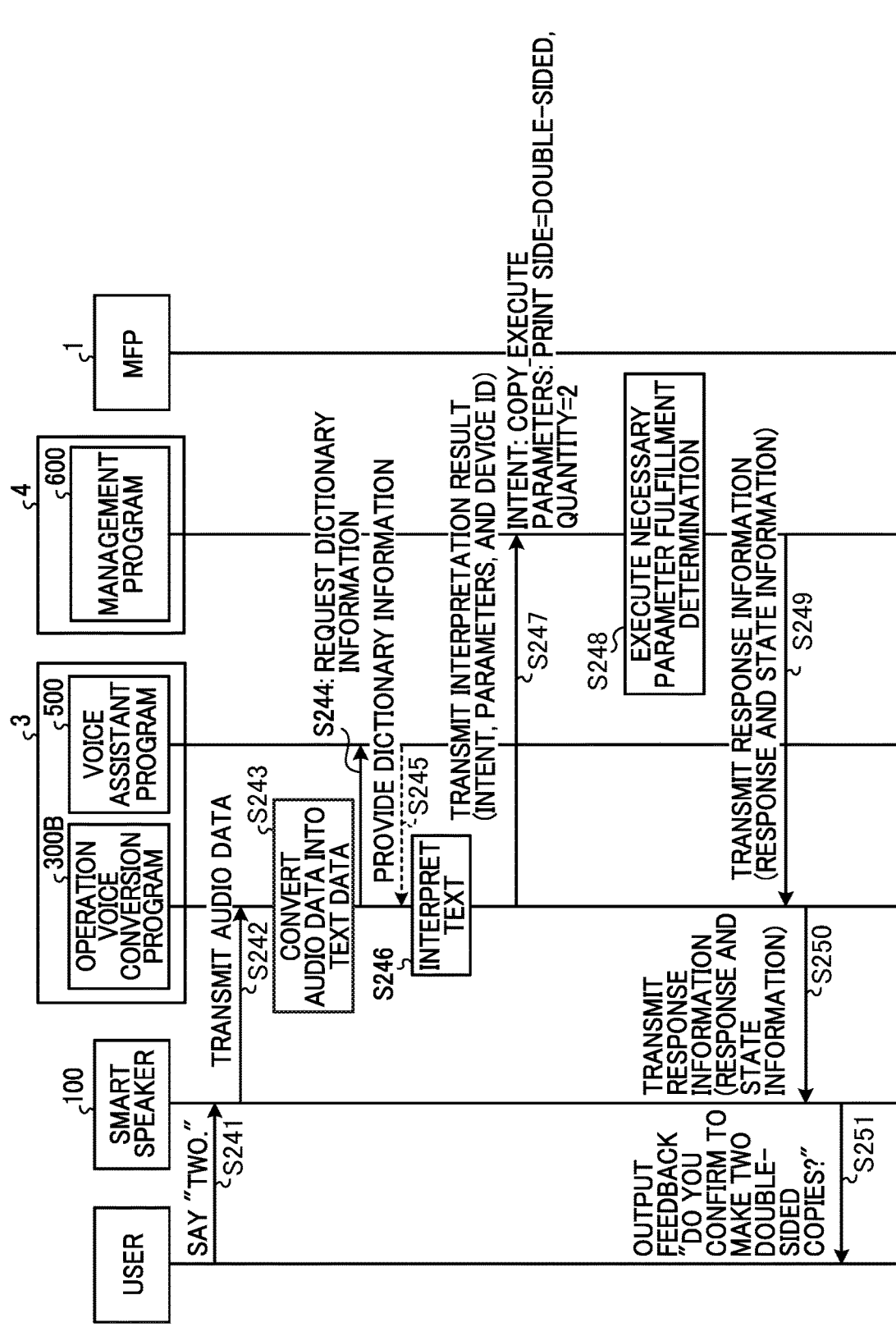

FIGS. 28A and 28B are sequence diagrams illustrating a procedure of the quantity setting operation. In response to another input lack feedback "How many copies?" output via the smart speaker 100 at step S232 in the sequence diagram of FIG. 27, the user utters a word "Two," for example (step S241). The communication control unit 152 of the smart speaker 100 transmits audio data of the utterance "Two" to the voice recognition server 3, to thereby request the voice recognition server 3 to convert the audio data into text data (step S242). The text conversion unit 156 of the voice recognition server 3 based on the operation voice conversion program 300B converts the audio data of the utterance "Two" into text data (step S243).

The interpretation unit 157 based on the operation voice conversion program 300B interprets the user utterance phrase represented by the text data based on the dictionary information (steps S244 to S246). In the present example, the interpretation unit 157 generates an interpretation result including the parameter "QUANTITY=2." The interpretation unit 157 then generates an interpretation result including the intent "COPY_EXECUTE" and the parameters "PRINT SIDE=DOUBLE-SIDED, QUANTITY=2" by combining the parameter acquired this time with the intent and parameter included in the previous utterances, and transmits the interpretation result to the AI assistant server 4 (step S247).

The execution determination unit 164 of the AI assistant server 4 receives the parameters "PRINT SIDE=DOUBLE-SIDED, QUANTITY=2," and executes necessary parameter fulfillment determination, thereby determining that the necessary parameters for the copy job are specified (step S248). Therefore, the execution determination unit 164 generates response information including a response "Do you confirm to make two double-sided copies?" The response information is transmitted to the smart speaker 100 via the notification unit 165 and the voice recognition server 3 (steps S249 and S250).

Based on the response included in the response information, the feedback unit 153 of the smart speaker 100 outputs, in sound and text, the input confirmation feedback with the response "Do you confirm to make two double-sided copies?" for example, to notify that the copy job is ready to start with the necessary parameters specified (step S251).

In this step, the output of the text data and the audio data included in the response information may be replaced by audio output or display of text data generated based on the text data stored in a memory of the smart speaker 100 in accordance with information included in the response information. The user issues an instruction to change any of the setting values or start copying in response to the input confirmation feedback.

An operation of the second embodiment to change the setting value will be described.

To issue the instruction to change the setting value, the user performs voice input to the smart speaker 100 to input a change in the setting value (step S252). To change the number of copies from two to three, for example, the user performs voice input with an utterance "Three." Further, to change the print side from double-sided to single-sided, the user performs voice input with an utterance "Single-sided." Based on the voice input, the AI assistant server 4 executes the necessary parameter fulfillment determination. Then, based on the response information, the smart speaker 100 outputs the input confirmation feedback with a response "Do you confirm to make copies with setting XXX (i.e., with the changed setting)?" for example (steps S253 to S262).

The above-described operation of changing the setting value (steps S252 to S262) is repeated until the user performs voice input for accepting the setting value included in the input confirmation feedback, i.e., voice input with an utterance "Yes." The voice input may be replaced by text input or input with a button, for example.

An operation of the second embodiment to instruct the MFP 1 to execute the job will be described.

Figure 29:
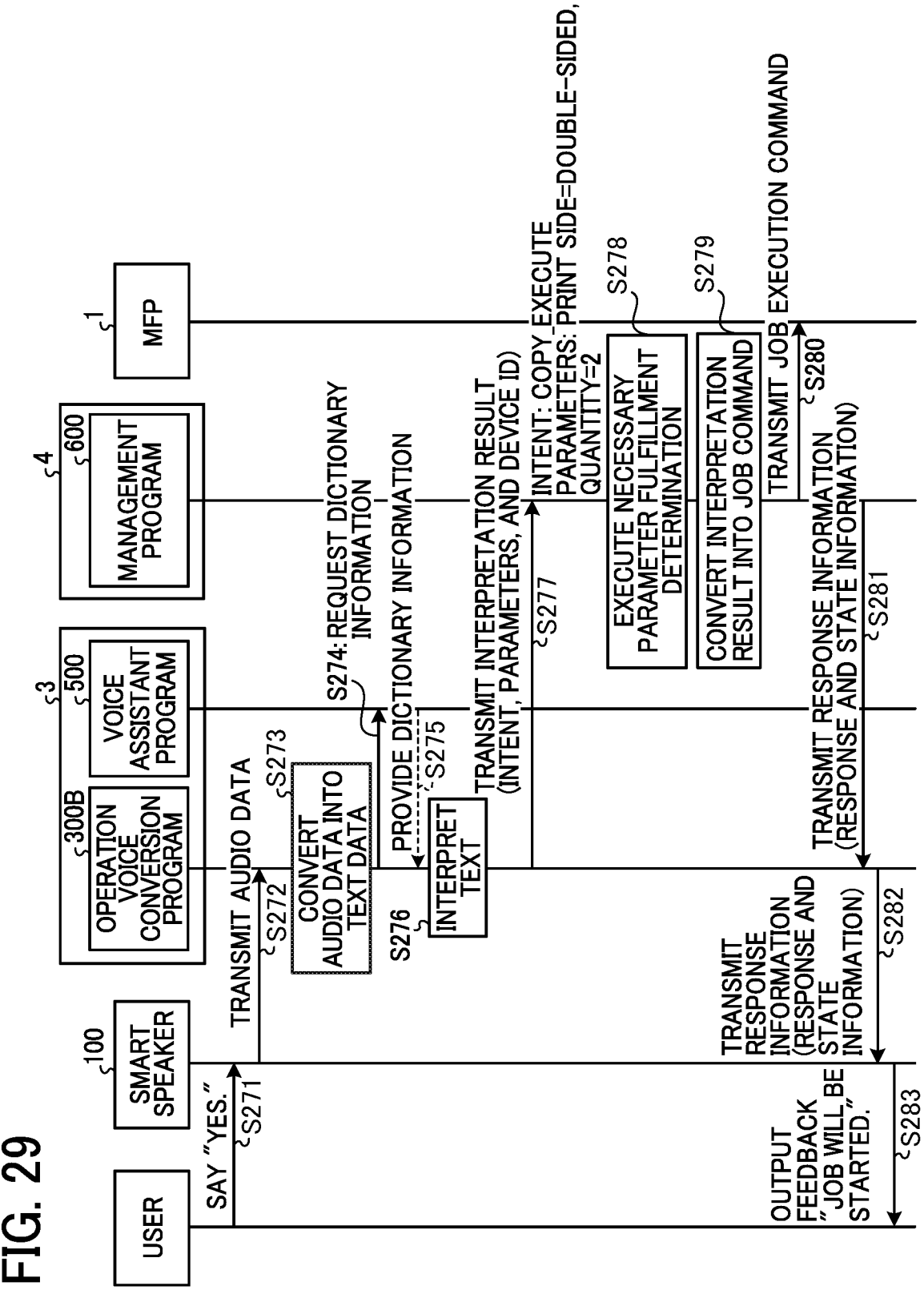
FIG. 29 is a sequence diagram illustrating a procedure of an operation performed in the voice operation system of the second embodiment to instruct an MFP to execute a job.

FIG. 29 is a sequence diagram illustrating a procedure of the operation of instructing the MFP 1 to execute the job. If the user performs voice input with an utterance "Yes" in response to the above-described input confirmation feedback (step S271), the operation voice conversion program 300B of the voice recognition server 3 converts audio data of the utterance "Yes" into text data (steps S272 and S273). The interpretation unit 157 of the voice recognition server 3 based on the operation voice conversion program 300B recognizes the copy start instruction based on the text data, generates an interpretation result including the intent "COPY_EXECUTE" and the parameters "PRINT SIDE=DOUBLE-SIDED, QUANTITY=2," and transmits the interpretation result to the management program 600 (steps S274 to S277).

If the execution determination unit 164 of the AI assistant server 4 based on the management program 600 determines that the interpretation result meets the necessary parameters (step S278), the interpretation result conversion unit 161 converts the interpretation result into a job execution command to the MFP 1 (step S279). Then, the execution instruction unit 162 transmits the job execution command obtained through the conversion to the MFP 1 (step S280). Thereby, the operation of the MFP 1 is controlled with settings such as the function of the MFP 1 (e.g., copy or scan), the quantity in the execution (e.g., one copy or two copies), and the print side (e.g., single-sided or double-sided) set through the voice input.

After the transmission of the job execution command the MFP 1, the execution instruction unit 162 of the AI assistant server 4 generates response information including a notice that the job execution command has been transmitted to the MFP 1 and the current job execution state (i.e., the current state of the MFP 1). The notification unit 165 of the AI assistant server 4 transmits the response information to the smart speaker 100 via the voice recognition server 3 (steps S281 and S282). The feedback unit 153 of the smart speaker 100 detects from the response information the notice that the job execution command has been transmitted to the MFP 1. Then, the feedback unit 153 outputs audio feedback and text feedback with a message "(The specified) job will be started," for example (step S283).

Thereby, the user recognizes that the MFP 1 has started executing the specified job.

After the execution determination unit 164 of the AI assistant server 4 based on the management program 600 determines that the interpretation result meets the necessary parameters (step S278), the above-described feedback operation to the smart speaker 100 may be omitted.

A description will be given of an example of information fed back from the AI assistant server 4 in the second embodiment.

In the above-described example, the feedback unit 153 of the smart speaker 100 outputs the text data and the audio data included in the response information. Alternatively, the feedback unit 153 may generate text data corresponding to the response information based on the text data stored in a memory of the smart speaker 100, and may output audio feedback and text feedback.

Specifically, as described above with TABLE 2, an intent such as "COPY_PARAMETER_SETTING" for prompting the user to input the job setting value or "COPY_CONFIRM" for prompting the user to confirm the job setting values, for example, is included in the response information and fed back to the smart speaker 100 from the AI assistant server 4.

The feedback unit 153 determines the feedback to be output to the user in accordance with the intent, parameters, and response included in the response information. Information similar to that of TABLE 2 may be stored in a memory of the smart speaker 100 such that the feedback unit 153 refers to the stored information to determine the contents of the feedback.

Although TABLE 2 illustrates examples of the response information of the copy job, "PARAMETER_SETTING" for prompting the user to input the job setting value and "CONFIRM" for prompting the user to confirm the job setting value may also be used as the intent in the response information of the print, scan, or FAX job similarly as in TABLE 2. The response information may include at least one of the intent and parameter and the response.

Further, for example, the setting value of the print side such as single-sided or double-sided or a parameter such as the number of copies is included in the response information and transmitted to the smart speaker 100. Further, if any of the necessary parameters is unspecified, a message for prompting the user to input (i.e., specify) the unspecified parameter is included in the response information as the response and fed back to the smart speaker 100.

A description will be given of an operation performed in the second embodiment when a job is executed in the MFP 1 or when an error occurs in the MFP 1.

If the job is executed by the MFP 1 and is successfully completed, a completion message such as "Job completed. Make sure to remove document," for example, is output in sound and text via the smart speaker 100.

In the event of an error such as paper shortage, for example, the AI assistant server 4 outputs, via the smart speaker 100, job confirmation feedback with a message such as "No paper fed. Reload paper and continue job or cancel job," for example. If the user reloads paper in the MFP 1 and utters a word "Continue" in response to the job confirmation feedback, the execution instruction unit 162 of the AI assistant server 4 instructs the MFP 1 to continue the job, and the MFP 1 resumes the job.

If the user utters a word "Cancel" to issue an instruction to cancel the job in response to the job confirmation feedback, the execution instruction unit 162 of the AI assistant server 4 instructs the MFP 1 to cancel the job, and a part of the job unfinished at the time of occurrence of the error is cancelled in the MFP 1. In this case, confirmation feedback with a message such as "Job cancelled," for example, is output in sound and text via the smart speaker 100.

Figure 30:
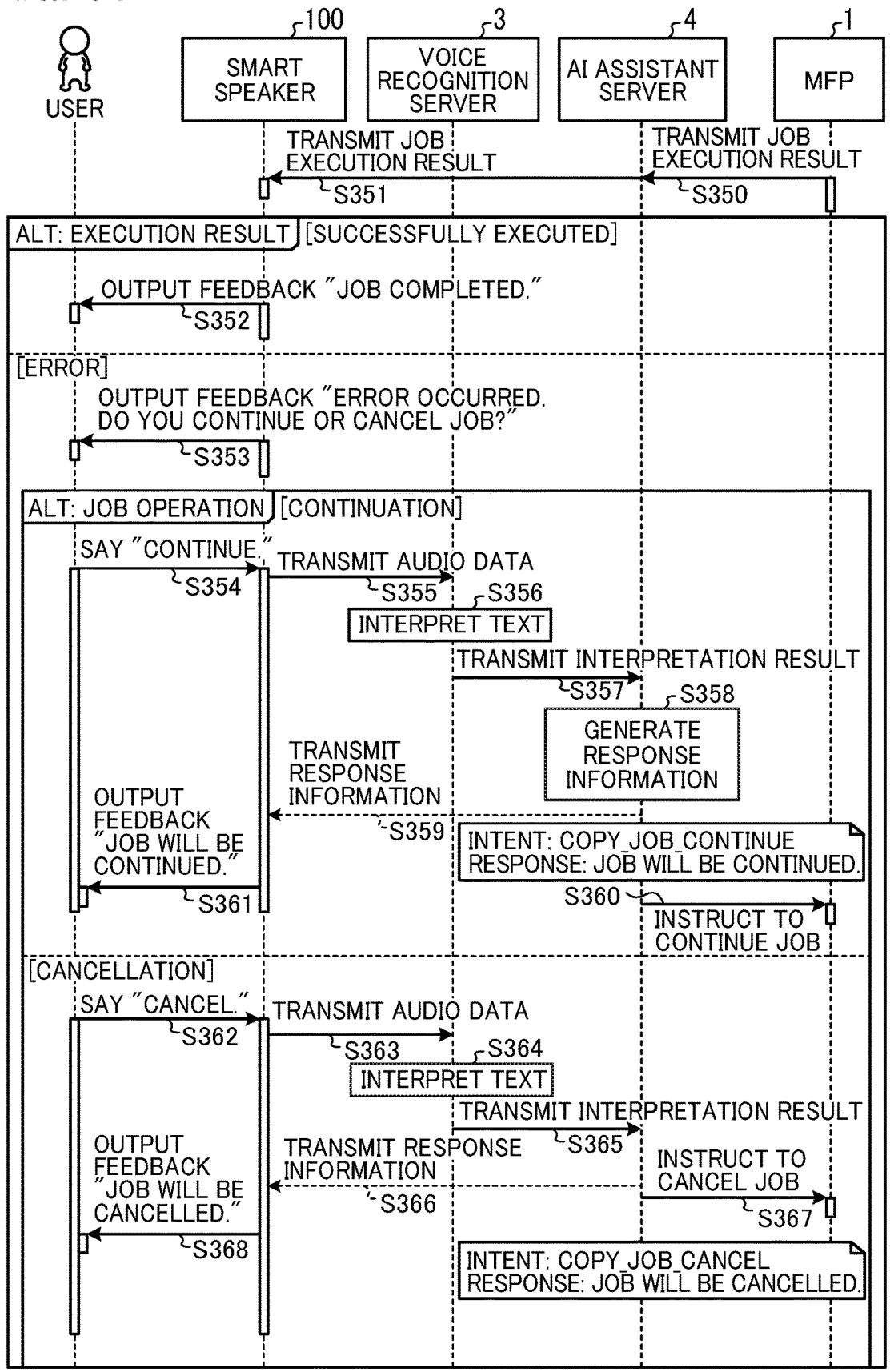
FIG. 30 is a sequence diagram illustrating a procedure of an interactive operation performed in a job executing operation and in the event of an error in the voice operation system of the second embodiment.

FIG. 30 is a sequence diagram illustrating a procedure of the interactive operation performed in the above-described job execution or in the event of an error. The MFP 1 transmits a job execution result to the AI assistant server 4 (step S350), and the smart speaker 100 acquires the job execution result via the AI assistant server 4 (step S351). Then, the smart speaker 100 outputs feedback for notifying the user of the successful completion of the job (step S352), or outputs feedback for notifying the user of the occurrence of an error (step S353).

In response to receipt of the job execution result notifying the successful completion of the job, the feedback unit 153 of the smart speaker 100 outputs an audio message such as "Job completed," for example (step S352). In response to receipt of the job execution result notifying the occurrence of an error, on the other hand, the feedback unit 153 of the smart speaker 100 outputs an audio message asking the user whether to continue the job, such as "Error occurred. Do you continue or cancel job?" for example (step S353).

Specifically, when the job is completed, the MFP 1 transmits a completion notice to the management program 600 of the AI assistant server 4. If an error occurs, the MFP 1 transmits to the AI assistant server 4 error information of the error including details of the error. In response to the information acquired from the MFP 1, the management program 600 of the AI assistant server 4 generates response information including a response such as "Job completed" or "Error occurred. Do you continue or cancel job?" for example, and transmits the response information to the smart speaker 100 via the voice recognition server 3.

Steps S354 to S361 in FIG. 30 correspond to a procedure of an operation performed by related units when the user specifies the continuation of the job. In response to the inquiry "Error occurred. Do you continue or cancel job?" the user eliminates the cause of the error and responds with an utterance "Continue" (step S354). In this case, audio data of the utterance "Continue" is converted into text data and interpreted by the operation voice conversion program 300B of the voice recognition server 3 (steps S355 and S356).

The operation voice conversion program 300B of the voice recognition server 3 generates an interpretation result including an intent "COPY_JOB_CONTINUE," and transmits the interpretation result to the management program 600 of the AI assistant server 4 (step S357). The execution determination unit 164 of the AI assistant server 4 based on the management program 600 generates response information including a response "Job will be continued" (step S358), and the notification unit 165 of the AI assistant server 4 transmits the response information to the smart speaker 100 via the voice recognition server 3 (step S359). Further, the execution instruction unit 162 of the AI assistant server 4 based on the management program 600 instructs the MFP 1 to continue the job (step S360). Further, the feedback unit 153 of the smart speaker 100 outputs the input confirmation feedback with the response "Job will be continued" (step S361).

Steps S362 to S368 in FIG. 30, on the other hand, correspond to a procedure of an operation performed by related units when the user specifies the cancellation of the job. In response to the inquiry "Error occurred. Do you continue or cancel job?" the user responds with an utterance "Cancel" (step S362). In this case, audio data of the utterance "Cancel" is transmitted to the voice recognition server 3 (step S363). The interpretation unit 157 of the voice recognition server 3 based on the operation voice conversion program 300B converts the audio data into text data, and interprets the text data (step S364).

The interpretation unit 157 generates an interpretation result including an intent "COPY_JOB_CANCEL," and transmits the interpretation result to the management program 600 of the AI assistant server 4 (step S365). The execution determination unit 164 of the AI assistant server 4 based on the management program 600 generates response information including a response "Job will be cancelled," and the notification unit 165 transmits the response information to the smart speaker 100 (step S366). The execution instruction unit 162 of the AI assistant server 4 based on the management program 600 instructs the MFP 1 to cancel the job (step S367). Further, the feedback unit 153 of the smart speaker 100 outputs the input confirmation feedback with the response "Job will be cancelled" (step S368).

A description will be given of a parameter adjustment operation based on the apparatus capability of the MFP 1 performed in the second embodiment.

With the sequence diagrams of FIGS. 31 and 32, a description will be given of an example of job execution according to the apparatus capability of the MFP 1 through the interactive operation.

Figure 31:
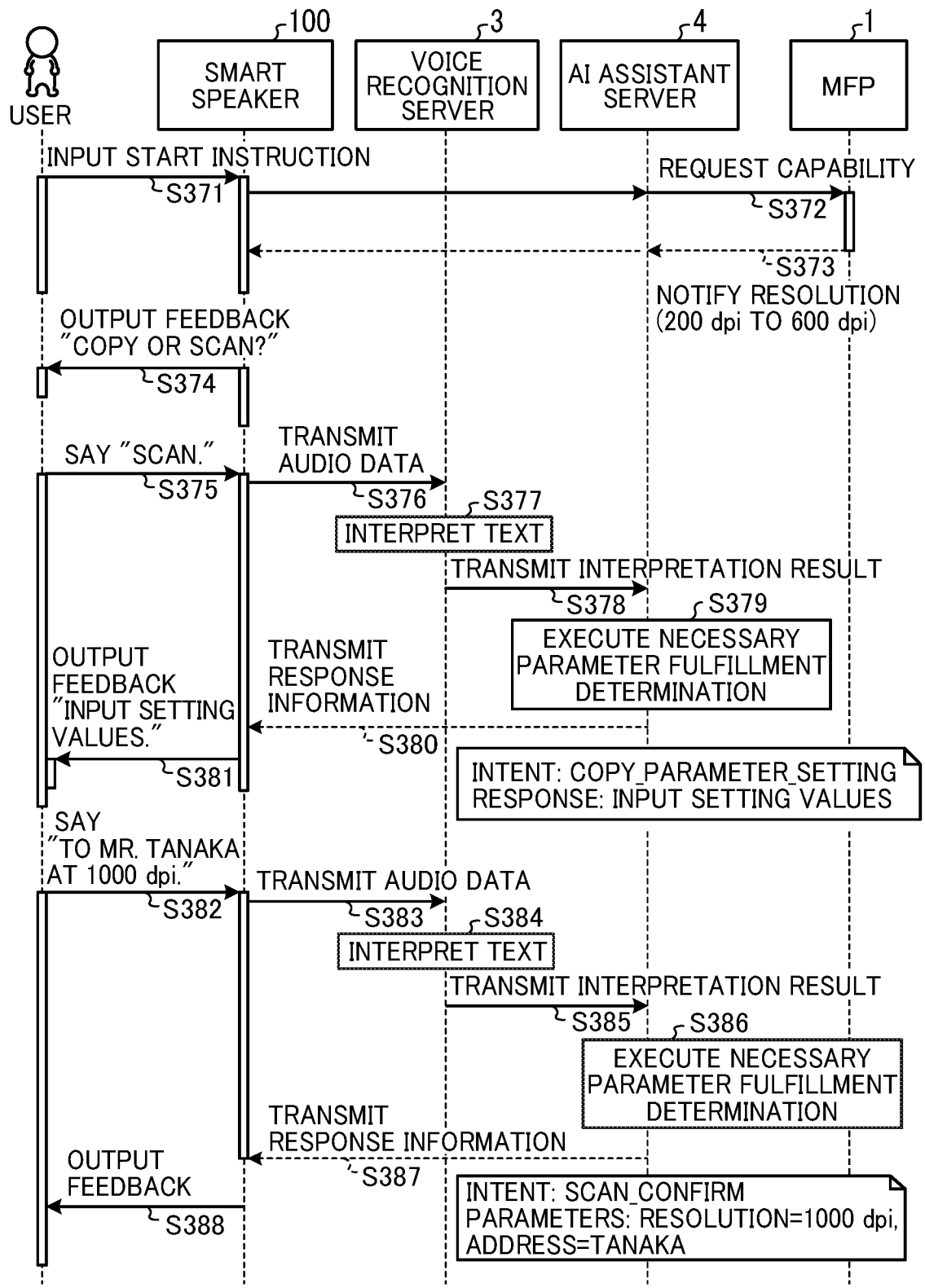
FIG. 31 is a sequence diagram illustrating a procedure of an operation performed in the voice operation system of the second embodiment to determine whether the MFP has sufficient apparatus capability for executing a job specified by a user.

FIG. 31 is a sequence diagram illustrating a procedure of an operation of determining whether the MFP 1 has sufficient apparatus capability for executing the job specified by the user. FIG. 32 is a sequence diagram illustrating a procedure of an operation performed when the job is executable with the apparatus capability of the MFP 1 and an operation performed when it is difficult to execute the job with the apparatus capability of the MFP 1.

In the sequence diagram of FIG. 31, the user first issues a start instruction (step S371), and the apparatus information acquisition unit 163 of the AI assistant server 4 based on the management program 600 inquires of the MFP 1 about the processable resolution thereof, for example, to acquire the capability of the MFP 1 (step S372). In response to the inquiry, the MFP 1 replies to the AI assistant server 4 with information of the processable resolution, such as "200 dpi to 600 dpi," for example (step S373). Then, the AI assistant server 4 transmits the information of the processable resolution of the MFP 1 to the smart speaker 100. Thereby, the smart speaker 100 recognizes the processable resolution of the MFP 1.

The apparatus information acquisition unit 163 of the AI assistant server 4 may acquire the information of the processing capability from the MFP 1 at a predetermined time after the communication with the MFP 1 is established. Alternatively, the apparatus information acquisition unit 163 may acquire the information of the processing capability of the MFP 1 when the smart speaker 100 and the MFP 1 are registered in association with each other in the management table in the association DB 102. Further, the apparatus information acquisition unit 163 may periodically acquire the information of the processing capability from the MFP 1. Further, the apparatus information acquisition unit 163 may acquire the information of the processing capability from the MFP 1 when the voice recognition server 3 receives the instruction to start the voice assistant program 500 or the job execution instruction from the smart speaker 100.

The acquired information of the processing capability may be stored in a memory of the AI assistant server 4 such as the HDD 34, or may be stored in association with the MFP 1 in the management table in the association DB 102. Alternatively, the information of the processing capability may be acquired by of another program, and the apparatus information acquisition unit 163 may acquire the information thus acquired by the another program, to thereby indirectly acquire the information stored in the MFP 1. Further, the information acquired from the MFP 1 by the apparatus information acquisition unit 163 is not limited to the information of the processing capability. For example, the apparatus information acquisition unit 163 may acquire information related to the job types and job setting conditions of the jobs executable with the MFP 1, such as the type and version of the application installed in the MFP 1, the printing speed, the processable file formats, the connection state of an optional device such as a finisher, for example.

Then, the user performs an operation of starting the operation voice processing program 200B of the smart speaker 100, and issues a start instruction through voice input, for example. Then, the communication control unit 152 of the smart speaker 100 transmits audio data of the start instruction to the voice recognition server 3. Thereby, the audio data of the start instruction is converted into text data and interpreted, and the interpretation result is transmitted to the AI assistant server 4. The execution determination unit 164 of the AI assistant server 4 determines whether the interpretation result meets the necessary parameters.

At this stage, the job type is not specified, and the interpretation result does not meet the necessary parameters. Therefore, the AI assistant server 4 transmits to the smart speaker 100 response information including a response for prompting the user to input (i.e., specify) the job type, such as "Copy or scan?" Thereby, the feedback unit 153 of the smart speaker 100 outputs audio feedback for prompting the user to specify the job, such as "Copy or scan?" for example (step S374).

Then, if the user utters a word "Scan" (step S375), audio data of the utterance is converted into text data and interpreted by the operation voice conversion program 300B of the voice recognition server 3 (steps S376 and S377). Further, the interpretation unit 157 of the voice recognition server 3 generates an interpretation result including an intent "SCAN_EXECUTE," and transmits the interpretation result to the management program 600 of the AI assistant server 4 (step S378).

The execution determination unit 164 of the AI assistant server 4 executes the necessary parameter fulfillment determination based on the received interpretation result (step S379). At this stage, scanning is specified, but the necessary parameters are unspecified. The execution determination unit 164 therefore generates response information including a response "Input setting values," and transmits the response information to the smart speaker 100 (step S380). The feedback unit 153 of the smart speaker 100 outputs the input lack feedback with the response "Input setting values" based on the response information (step S381).

If the user responds to the input lack feedback with an utterance "To Mr. Tanaka at 1000 dpi" (step S382), audio data of the utterance is converted into text data and interpreted by the voice recognition server 3 (steps S383 to S384). The interpretation unit 157 of the voice recognition server 3 generates an interpretation result including the intent "SCAN_EXECUTE" and parameters "RESOLUTION=1000 dpi, ADDRESS=TANAKA," and transmits the interpretation result to the management program 600 of the AI assistant server 4 (step S385).

The execution determination unit 164 of the AI assistant server 4 based on the management program 600 refers to the parameters included in the interpretation result and the information of the processing capability of the MFP 1 previously acquired by the apparatus information acquisition unit 163, to thereby determine whether the job is executable with the settings specified for the MFP 1 by the user (step S386). Then, the execution determination unit 164 generates response information corresponding to the result of determination, and the notification unit 165 transmits the response information to the smart speaker 100 (step S387). Thereby, feedback corresponding to the determination result is output via the smart speaker 100 (step S388).

Figure 32:
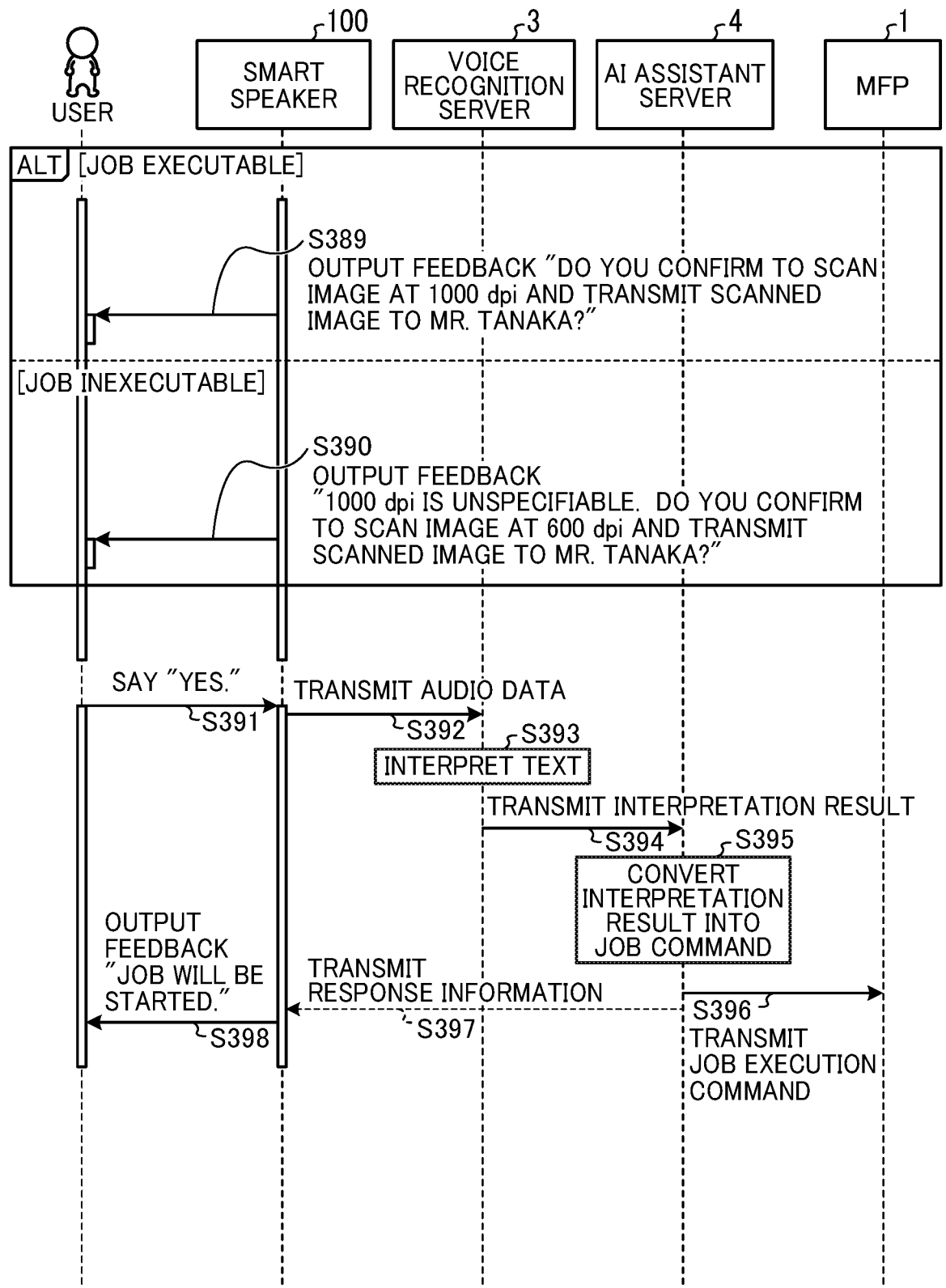
FIG. 32 is a sequence diagram illustrating a procedure of an operation performed in the voice operation system of the second embodiment when the job is executable with the apparatus capability of the MFP or when it is difficult to execute the job with the apparatus capability of the MFP.

Specifically, in the sequence diagram of FIG. 32, if the MFP 1 has the processing capability corresponding to the resolution of 1000 dpi, the execution determination unit 164 generates response information including a response "Do you confirm to scan image at 1000 dpi and transmit scanned image to Mr. Tanaka?" Then, the notification unit 165 transmits the response information to the smart speaker 100. Thereby, the feedback unit 153 of the smart speaker 100 outputs the input confirmation feedback with the response "Do you confirm to scan image at 1000 dpi and transmit scanned image to Mr. Tanaka?" (step S389).

If the user responds to the input confirmation feedback with an utterance "Yes" (step S391), the interpretation unit 157 of the voice recognition server 3 converts audio data of the utterance into text data, and interprets the text data (steps S392 and S393). The interpretation unit 157 then generates an interpretation result including the intent "SCAN_EXECUTE" and the parameters "RESOLUTION=1000 dpi, ADDRESS=TANAKA," and transmits the interpretation result to the management program 600 of the AI assistant server 4 (step S394).

The interpretation result conversion unit 161 of the AI assistant server 4 based on the management program 600 converts the interpretation result into a job execution command to scan the image at 1000 dpi and transmit the scanned image to Mr. Tanaka (step S395). Then, the execution instruction unit 162 of the AI assistant server 4 based on the management program 600 transmits the job execution command to the MFP 1 (step S396). Thereby, the specified job is executed in the MFP 1. The execution determination unit 164 of the AI assistant server 4 generates response information including a response "Job will be started," which indicates that the execution of the specified job has started, and the notification unit 165 transmits the response information to the smart speaker 100 (step S397). The feedback unit 153 of the smart speaker 100 then outputs to the user the input confirmation feedback with the response "Job will be started" (step S398).

If the maximum processing capability of the MFP 1 is 600 dpi, on the other hand, it is difficult to execute image processing in the MFP 1 at the user-specified resolution of 1000 dpi. Based on the information of the processing capability of the MFP 1 previously acquired by the apparatus information acquisition unit 163, the execution determination unit 164 of the AI assistant server 4 determines that it is difficult for the MFP 1 to execute image processing specified by the user. In this case, the execution determination unit 164 generates response information including a response "1000 dpi is unspecifiable. Do you confirm to scan image at 600 dpi and transmit scanned image to Mr. Tanaka?" The notification unit 165 transmits the response information to the smart speaker 100. Thereby, the smart speaker 100 outputs to the user the confirmation feedback with the response "1000 dpi is unspecifiable. Do you confirm to scan image at 600 dpi and transmit scanned image to Mr. Tanaka?" (step S390).

More specifically, the execution determination unit 164 of the AI assistant server 4 selects the function or value closest to the function or processing capability value specified by the user within the processing capability of the MFP 1. For example, if the processable resolution range of the MFP 1 is 200 dpi to 600 dpi, the execution determination unit 164 selects 600 dpi closest to 1000 dpi specified by the user. Then, the feedback unit 153 of the smart speaker 100 outputs the capability or value selected by the execution determination unit 164 as the confirmation feedback.

That is, if the execution determination unit 164 determines that it is difficult to execute the job represented by the intent and parameters included in the interpretation result of the user instruction, the execution determination unit 164 selects the setting conditions usable in the MFP 1 based on the information of the processing capability of the MFP 1, and generates the response information based on the selected setting conditions.

The management program 600 of the AI assistant server 4 acquires the device ID of the smart speaker 100 as a voice input source (i.e., a voice input source device ID), in addition to the interpretation result transmitted from the interpretation unit 157 of the voice recognition server 3 based on the operation voice conversion program 300B. Therefore, the execution determination unit 164 may identify the MFP 1 associated with the voice input source device ID by referring to the association DB 102, and may determine whether the job is executable by referring to the processing capability of the identified MFP 1. Further, if the user specifies the execution of a function not included in the MFP 1, the execution determination unit 164 may transmit to the smart speaker 100 response information for notifying that the job is not executable. The execution determination unit 164 may transmit information of the selected setting conditions to the operation voice conversion program 300B of the voice recognition server 3.

If the user responds to the confirmation feedback with an utterance "Yes" (step S391), the text conversion unit 156 of the voice recognition server 3 converts audio data of the utterance into text data, and interprets the text data (steps S392 and S393). Then, the interpretation unit 157 of the voice recognition server 3 generates an interpretation result including the intent "SCAN_EXECUTE" and parameters "RESOLUTION=600 dpi, ADDRESS=Tanaka" based on the text data, and transmits the interpretation result to the management program 600 of the AI assistant server 4 (step S394).

The interpretation result conversion unit 161 of the AI assistant server 4 based on the management program 600 converts the interpretation result into a job execution command to the MFP 1 (step S395). The execution instruction unit 162 of the AI assistant server 4 based on the management program 600 transmits the job execution command to the MFP 1, and the execution determination unit 164 of the AI assistant server 4 generates response information including a response "Job will be started." The notification unit 165 of the AI assistant server 4 then transmits the response information to the smart speaker 100, which outputs the input confirmation feedback with the response "Job will be started" (steps S396 to S398). Even if the job specified by the user exceeds the processing capability of the MFP 1 and thus is difficult to execute, therefore, it is possible to execute the job specified by the user by automatically changing the user instruction into an instruction executable with the processing capability of the MFP 1.

The MFP 1 retrieves the address information corresponding to "Tanaka" by referring to the address book stored in a memory of the MFP 1 such as the HDD 13. Herein, the address information is information such as the electronic mail address or the FAX number, for example. If the address book includes the address information corresponding to "Tanaka," image data obtained through scanning by the MFP 1 is transmitted to the address of the address information.

The operation device 16 of the MFP 1 may display the address information to prompt the user to confirm that the displayed address is correct, and the image data obtained through scanning may be transmitted to the address after the user operates a confirm button. If the address book includes a plurality of addresses corresponding to "Tanaka," the address information of all addresses corresponding to "Tanaka" may be displayed on the operation device 16 of the MFP 1 to prompt the user to select the intended address from the plurality of addresses.

An operation of the second embodiment to retrieve and print the print target will be described.

An operation of printing the file specified by the user will be described with the sequence diagrams of FIGS. 33 and 34.

Figure 33:
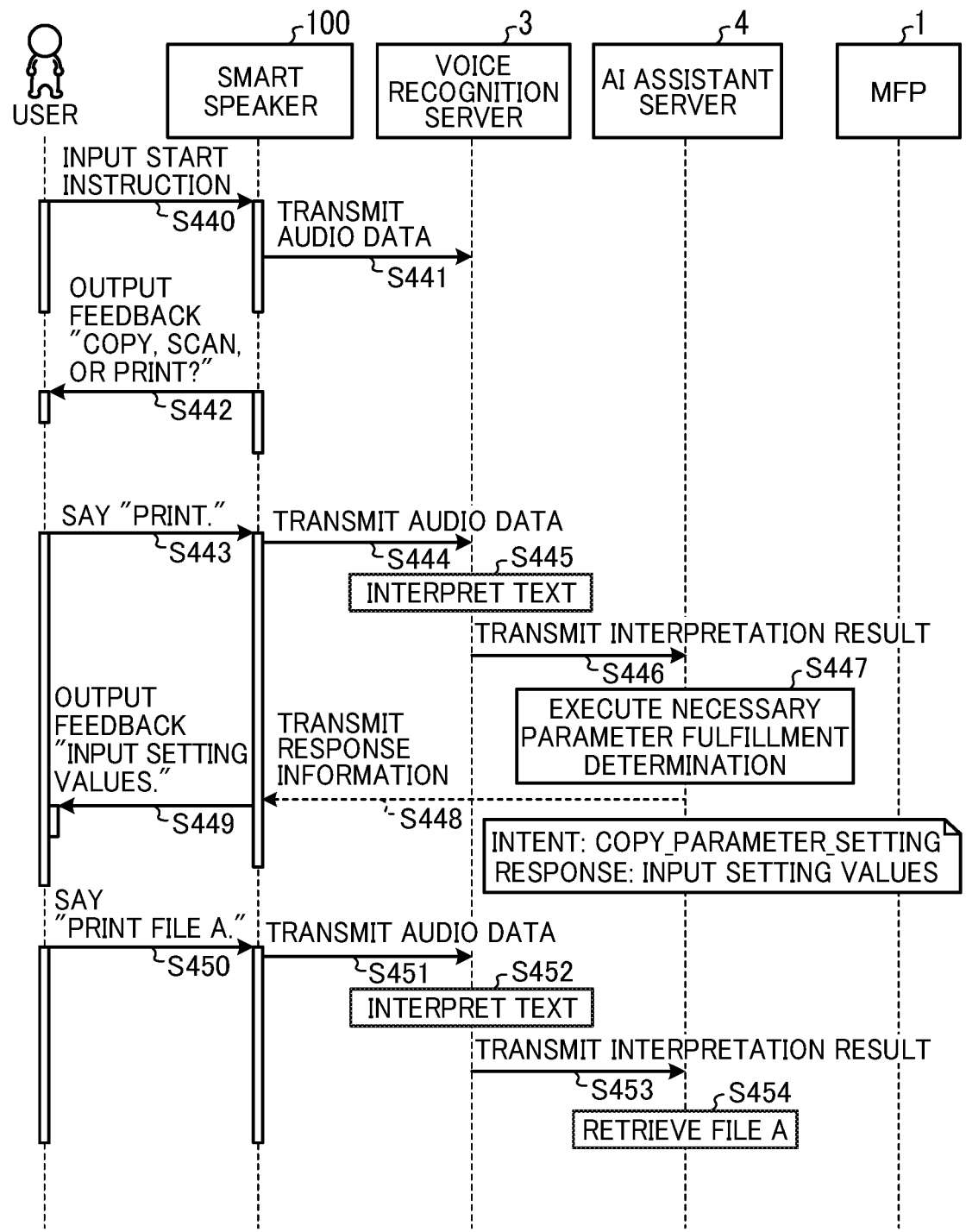
FIG. 33 is a sequence diagram illustrating an operation performed in the voice operation system of the second embodiment to retrieve a file specified by the user.
Figure 34A:
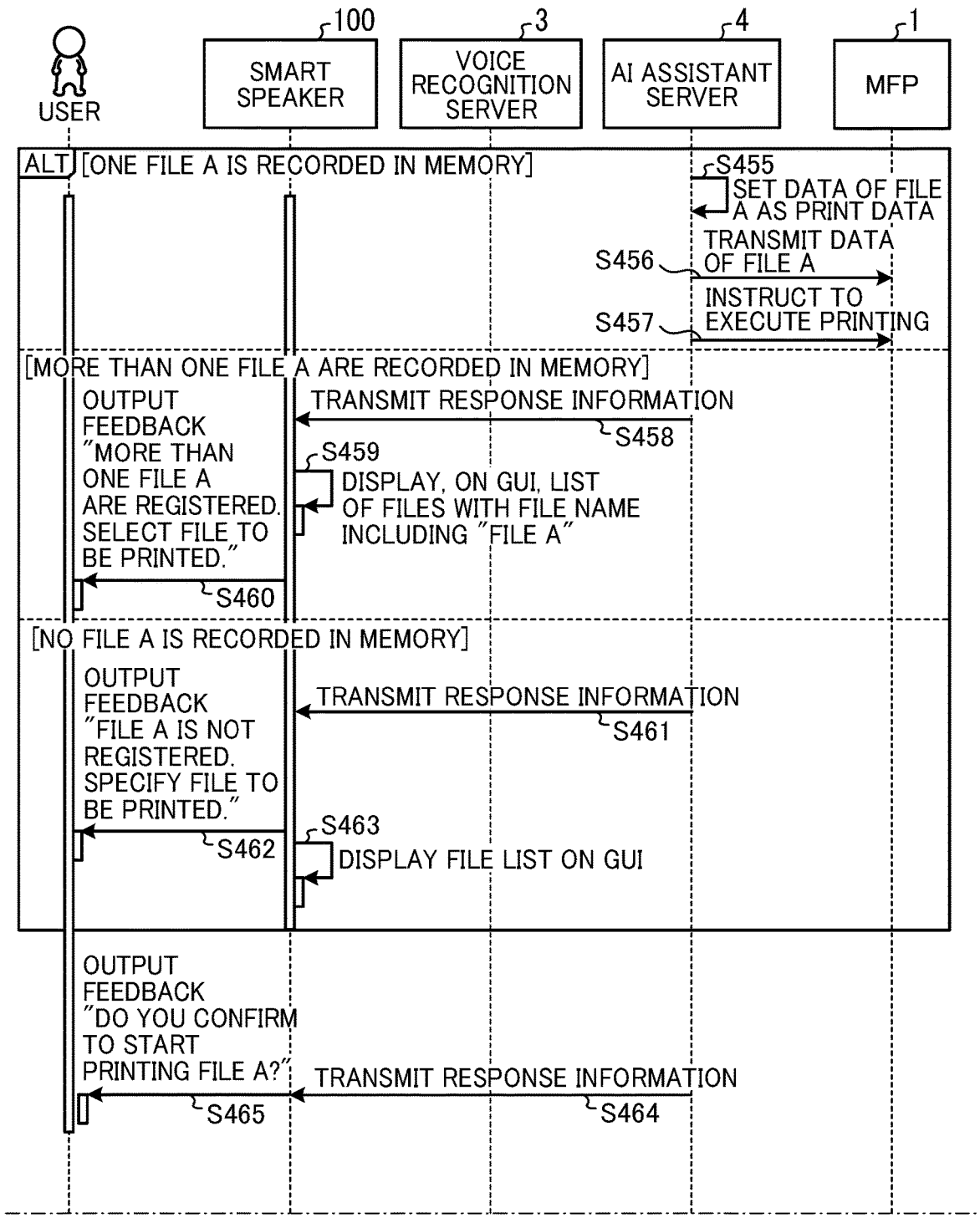
FIGS. 34A and 34B are sequence diagrams illustrating an operation performed in the voice operation system of the second embodiment to print the file specified by the user.
Figure 34B:
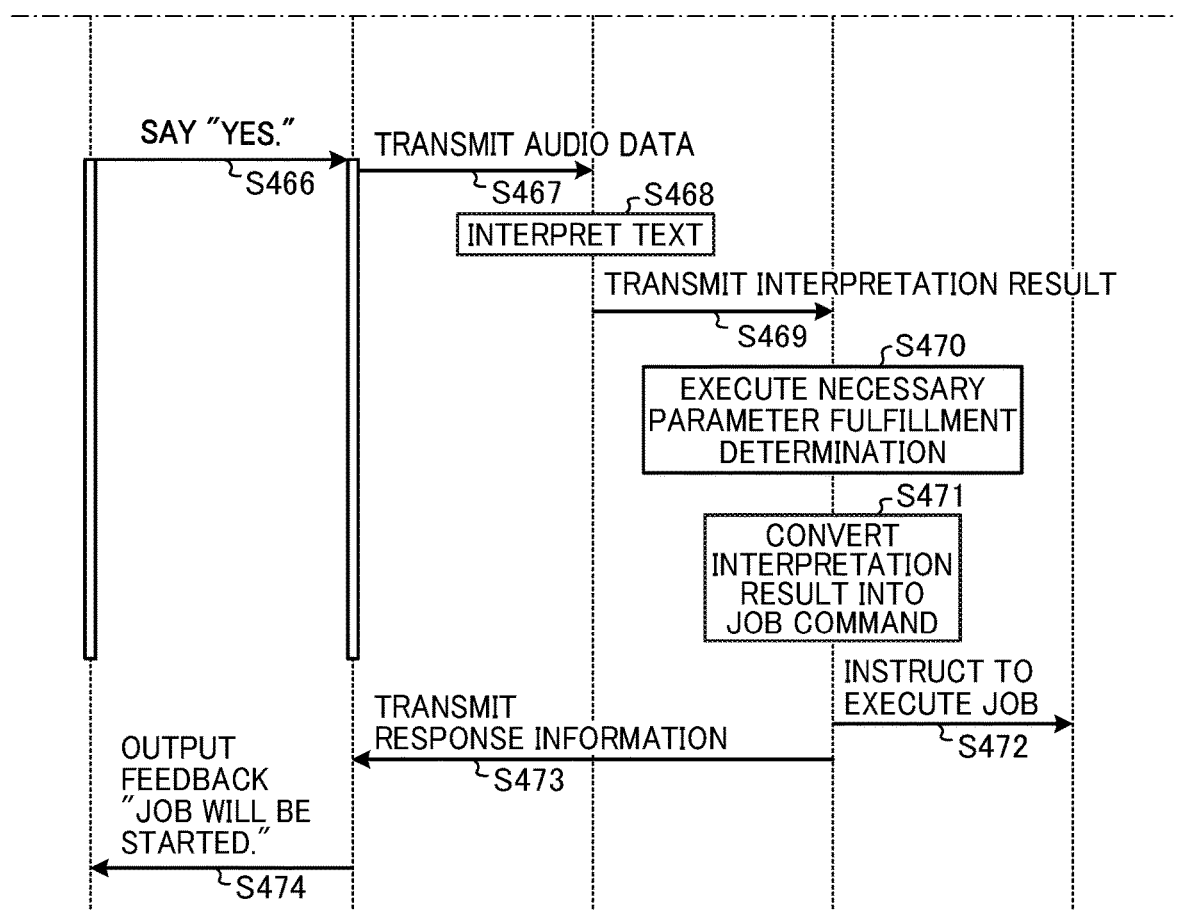

FIG. 33 is a sequence diagram illustrating an operation of retrieving the file specified by the user, and FIGS. 34A and 34B are sequence diagrams illustrating an operation of printing the file specified by the user.

In FIG. 33, the user first performs an operation of starting the operation voice processing program 200B of the smart speaker 100, and issues an instruction to start the voice assistant program 500 through voice input, for example (step S440). Thereby, the communication control unit 152 of the smart speaker 100 transmits audio data of the start instruction to the voice recognition server 3 (step S441). The text conversion unit 156 of the voice recognition server 3 converts the audio data of the start instruction into text data and then into an interpretation result including an intent and parameters, and transmits the interpretation result to the management program 600 of the AI assistant server 4.

The execution determination unit 164 of the AI assistant server 4 based on the management program 600 determines whether the interpretation result meets the necessary parameters. When the audio data of the start instruction is input, the necessary parameters such as the job type, for example, are unspecified. Therefore, the execution determination unit 164 generates response information including a response "Copy, scan, or print?" to prompt the user to specify the job. The notification unit 165 transmits the response information to the smart speaker 100. Thereby, the feedback unit 153 of the smart speaker 100 outputs audio feedback with the response "Copy, scan, or print?" to prompt the user to specify the job (step S442).

Then, if the user utters a word "Print" (step S443), the text conversion unit 156 of the voice recognition server 3 based on the operation voice conversion program 300B converts audio data of the utterance into text data, and the interpretation unit 157 interprets the text data (steps S444 and S445). In this case, the interpretation unit 157 generates an interpretation result including an intent "PRINT_EXECUTE"

and transmits the interpretation result to the management program 600 of the AI assistant server 4 (step S446).

The execution determination unit 164 of the AI assistant server 4 based on the management program 600 executes the necessary parameter fulfillment determination based on the received interpretation result (step S447). In this case, printing is specified, but the necessary parameters are unspecified. The execution determination unit 164 therefore generates response information including a response "Input setting values," and transmits the response information to the smart speaker 100 via the notification unit 165 (step S448). The feedback unit 153 of the smart speaker 100 outputs the input lack feedback with the response "Input setting values" based on the response information (step S449).

If the user responds to the input lack feedback with an utterance "Print file A" (step S450), audio data of the utterance is transmitted to the voice recognition server 3 (step S451). The voice recognition server 3 converts the audio data into text data, and interprets the text data (step S452). The voice recognition server 3 further generates an interpretation result including the intent "PRINT_EX-ECUTE" and a parameter "PRINT TARGET=FILE A," and transmits the interpretation result to the AI assistant server 4 (step S453).

The retrieval unit 167 of the AI assistant server 4 based on the management program 600 retrieves file A from the management DB 101 based on the parameter included in the interpretation result (step S454).

The search target is not limited to the management DB 101, and may be a database connected, via a network, to the cloud service 2000 provided by the voice recognition server 3 and the AI assistant server 4. Further, the retrieval unit 167 may search not only for file names having a character string included in the parameter but also for files with data having a character string included in the parameter. Further, the retrieval unit 167 may execute the search based on file attributes such as the file creation date and the file creator.

In the sequence diagram of FIGS. 34A and 34B, if it is found from the above-described search that one file A is recorded in the management DB 101, the retrieval unit 167 of the AI assistant server 4 sets the data of the file A as the print data (step S455). Then, the execution instruction unit 162 of the AI assistant server 4 transmits the print data of the file A to the MFP 1 (step S456), to thereby instruct the MFP 1 to print the print data of the file A (step S457). Thereby, the MFP 1 prints the print data of the file A.

If more than one file A are retrieved from the management DB 101, i.e., if a plurality of files are retrieved as a result of search by the retrieval unit 167, the execution determination unit 164 of the AI assistant server 4 generates response information including a response "More than one file A are registered. Select file to be printed." Then, the notification unit 165 transmits the response information to the smart speaker 100 (step S458). In this case, file creation dates, file creators, and thumbnail images of the files, for example, may be included in the response information as information for identifying the files.

Based on the response information, the feedback unit 153 of the smart speaker 100 displays a list of retrieved files on the touch panel 27 (step S459). The feedback unit 153 further outputs the input lack feedback with the response "More than one file A are registered. Select file to be printed" (step S460).

When the list of files is displayed, the file creation dates and the file creators may be output as audio feedback or displayed on the touch panel 27 to make it easy for the user to select the intended file from the retrieved files. Alternatively, the thumbnail images may be displayed as the list of files to prompt the user to select the intended file.

The user may select the intended file by uttering information related to the file, such as the file creation date or the file creator of the file, or by selecting and touching the intended file from the file list displayed on the touch panel 27.

If file A specified by the user is not recorded in the management DB 101, i.e., if the retrieval unit 167 fails to retrieve file A, the execution determination unit 164 of the AI assistant server 4 generates response information including a response "File A is not registered." The execution determination unit 164 further acquires from the management DB 101 the information of the list of files stored in the management DB 101, and includes the acquired information in the response information. The notification unit 165 transmits the thus-generated response information to the smart speaker 100 (step S461).

Based on the response information, the feedback unit 153 of the smart speaker 100 outputs feedback with the response "File A is not registered. Specify file to be printed" (step S462). Further, based on the information of the list of files added to the response information, the feedback unit 153 displays the list of files stored in the management DB 101 on the touch panel 27 (step S463). Based on the displayed list of files, the user selects the file to be printed, i.e., re-specifies the file to be printed.

If the management DB 101 stores one file A, and if the instruction to print file A is issued by the user, the execution determination unit 164 generates response information including a response "Do you confirm to start printing file A?" and transmits the response information to the smart speaker 100 (step S464). The feedback unit 153 of the smart speaker 100 outputs confirmation feedback with the response "Do you confirm to start printing file A?" for example (step S465).

If the user responds to the confirmation feedback with an utterance "Yes" (step S466), audio data of the utterance is transmitted to the voice recognition server 3 from the smart speaker 100 (step S467). The text conversion unit 156 of the voice recognition server 3 converts the audio data into text data, and the interpretation unit 157 interprets the audio data converted into the text data (step S468). The interpretation unit 157 generates an interpretation result including the intent "PRINT_EXECUTE" and parameters "PRINT TARGET=FILE A, FILE IDENTIFICATION INFORMATION X," and transmits the interpretation result to the management program 600 of the AI assistant server 4 (step S469). The file identification information X is information added to the interpretation result to identify the file A selected by the user when the management DB 101 stores more than one file A. The file identification information X is information such as the file creation date or the file creator, for example.

The execution determination unit 164 of the AI assistant server 4 based on the management program 600 executes the necessary parameter fulfillment determination based on the interpretation result (step S470). In this case, the necessary parameters are specified. The interpretation result conversion unit 161 therefore converts the interpretation result into a job execution command to the MFP 1 (step S471). The execution instruction unit 162 transmits the file A selected by the user to the MFP 1, to thereby instruct the MFP 1 to print the data of the file A (step S472). Thereby, the MFP 1 prints the data of the file A intended by the user. After the transmission of the print execution command to the MFP 1, the notification unit 165 of the AI assistant server 4 transmits to the smart speaker 100 response information including a response "Job will be started," which indicates that the printing has started (step S473). Thereby, the feedback unit 153 of the smart speaker 100 outputs feedback with the response "Job will be started," notifying the user of the start of printing (step S474).

In the above-described example, the retrieval unit 167 of the AI assistant server 4 retrieves and transmits the file (i.e., the print target) to the MFP 1. Alternatively, for example, a job execution command with the parameter "PRINT TARGET=FILE A" may be transmitted to the MFP 1, and the MFP 1 may execute printing by retrieving the file A from the HDD 13 or the management DB 101, for example. Further, if more than one file A are retrieved, a list of retrieved files may be displayed on a display of the MFP 1 to prompt the user to select the intended file from the list.

As understood from the foregoing description, in the voice operation system 1000B of the second embodiment, the smart speaker 100 is installed with the operation voice processing program 200B as a platform application program, which communicates with the cloud service 2000. When the user speaks to the microphone 29 of the smart speaker 100, the cloud service 2000 analyzes the contents of the user utterance, and operates the MFP 1 to perform the operation specified by the user. That is, the voice input operation is performed.

Thereby, a command for a complicated operation is issued in voice, obviating the need for an operation with a GUI on the touch panel 27, for example. This configuration therefore makes the input operation faster and easier even for a user experienced with the operation. Further, the interactive operation support enables a senior or inexperienced user to perform a desired operation faster and with more ease when performing complicated network setting or advanced job setting or when installing a new application program, for example.

Further, since the intention of the user is analyzed based on the text of the user utterance, the process based on the user utterance is determined by the AI assistant server 4 and executed.

A voice operation system of a third embodiment of the present invention will be described with comparison to the above-described voice operation.

Figure 35:
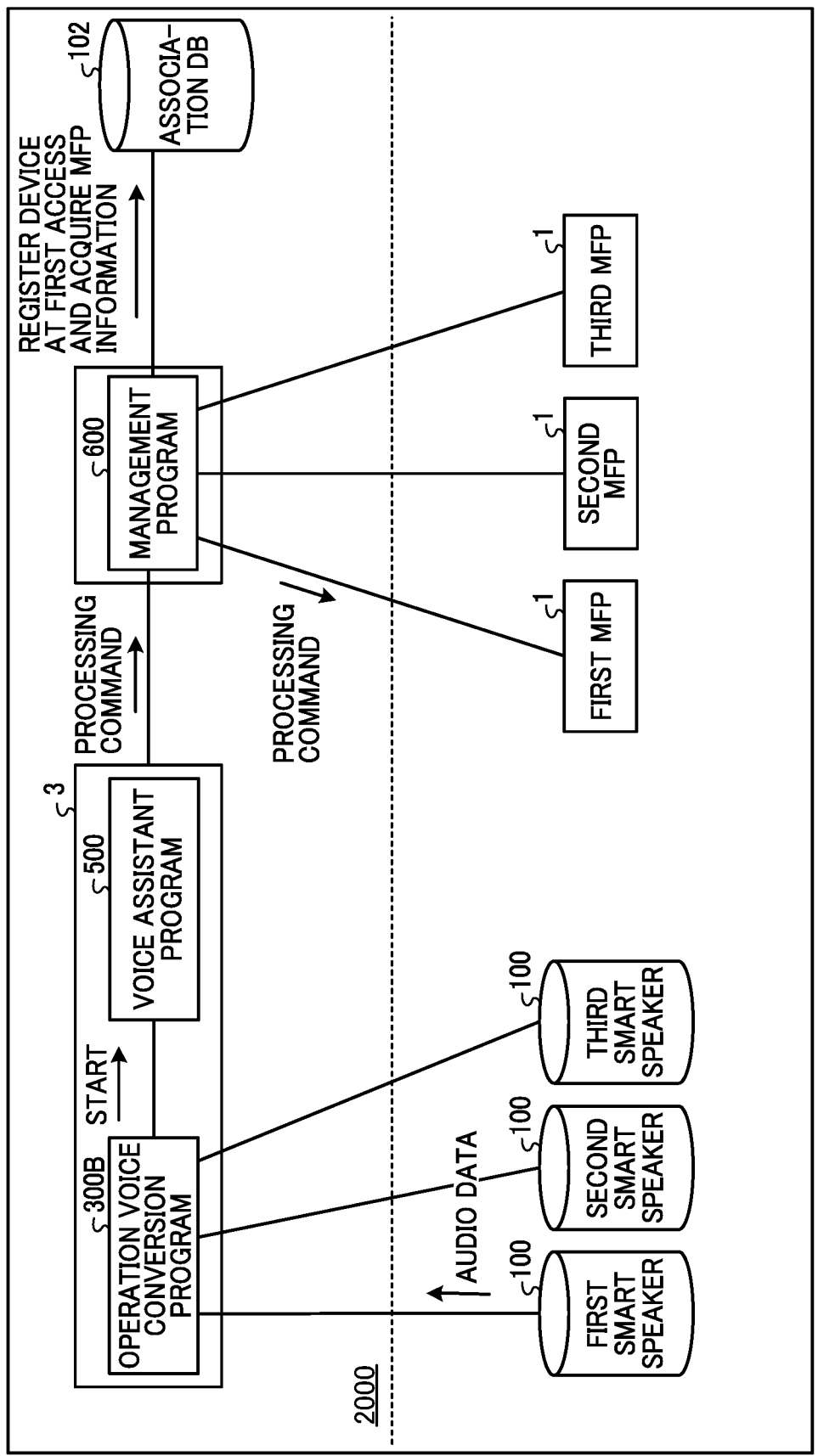
FIG. 35 is a diagram schematically illustrating the procedure of the voice operation in the second embodiment.

FIG. 35 is a diagram schematically illustrating a procedure of the foregoing voice operation of the second embodiment. In FIG. 35, the association DB 102 stores the device ID of each of the smart speakers 100 and the apparatus ID of each of the MFPs 1 such that the device ID of the smart speaker 100 is associated with the apparatus ID of the MFP 1 operable with the smart speaker 100. In this configuration, if the voice input is performed via the smart speaker 100, the audio data of the input voice is transmitted to the voice recognition server 3 to be converted into text data and interpreted. The interpretation result is transmitted to the AI assistant server 4 together with the device ID of the smart speaker 100.

The AI assistant server 4 refers to the association DB 102 based on the device ID, and thereby detects the apparatus ID of the MFP 1 associated with the device ID. The AI assistant server 4 converts the interpretation result into data in a format processable by the MFP 1, and transmits the data to the MFP 1 corresponding to the detected apparatus ID. Through the voice input to the smart speaker 100, therefore, the operation of the MFP 1 is controlled.

A voice operation application provided by a third vendor may be installed in the AI assistant server 4 to enable the voice operation of the MFP 1. In this case, allowing the voice operation application of the third vendor to refer to the association DB 102 is not desirable in terms of security. Without allowing the voice operation application of the third vendor to refer to the association DB 102, however, it is difficult to perform the voice operation of the MFP 1, presenting an obstacle to the development of the voice operation application of the third vendor.

An overview of the third embodiment will be described.

Figure 36:
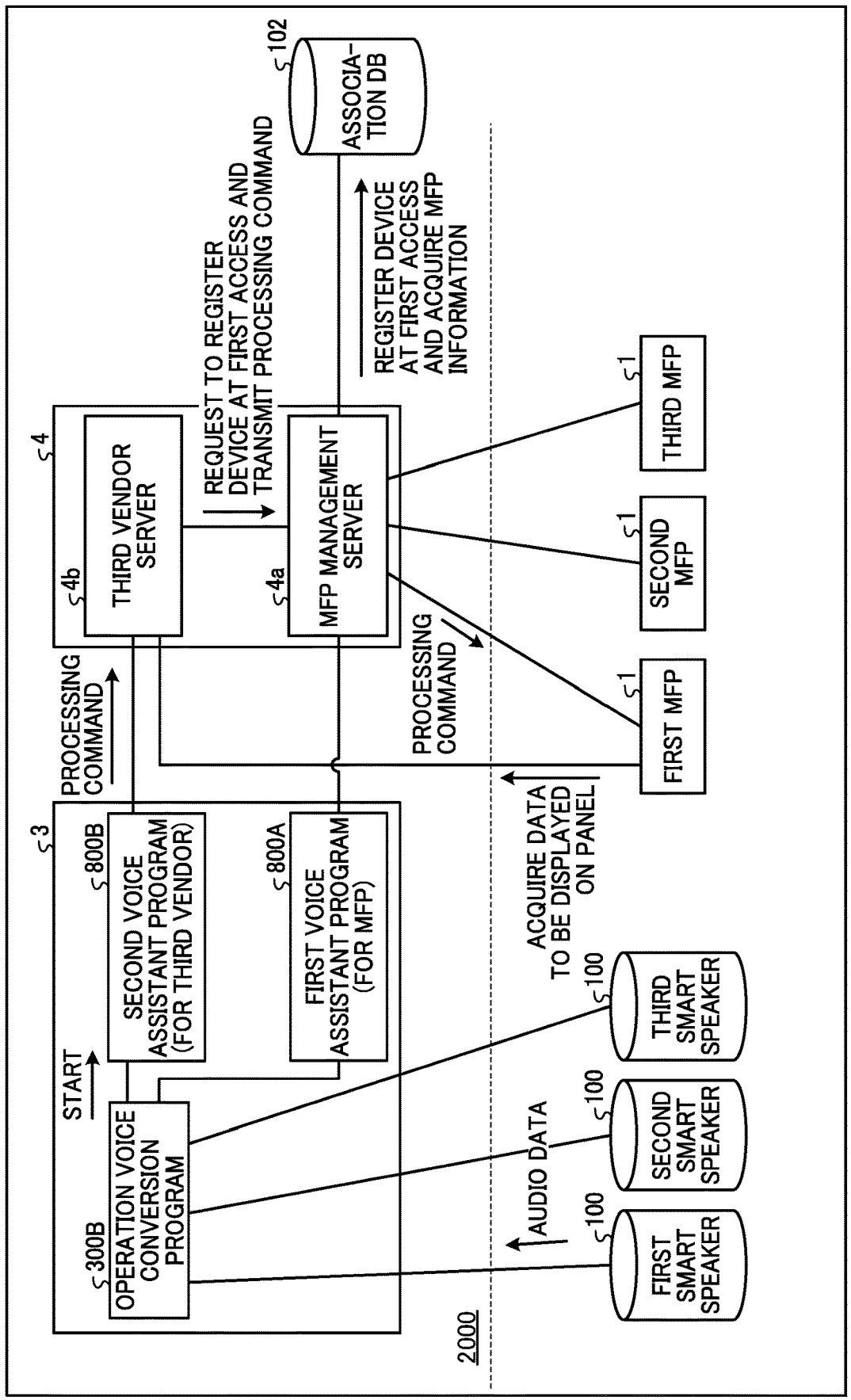
FIG. 36 is a diagram illustrating an overview of a voice operation of a third embodiment of the present invention.
Figure 37:
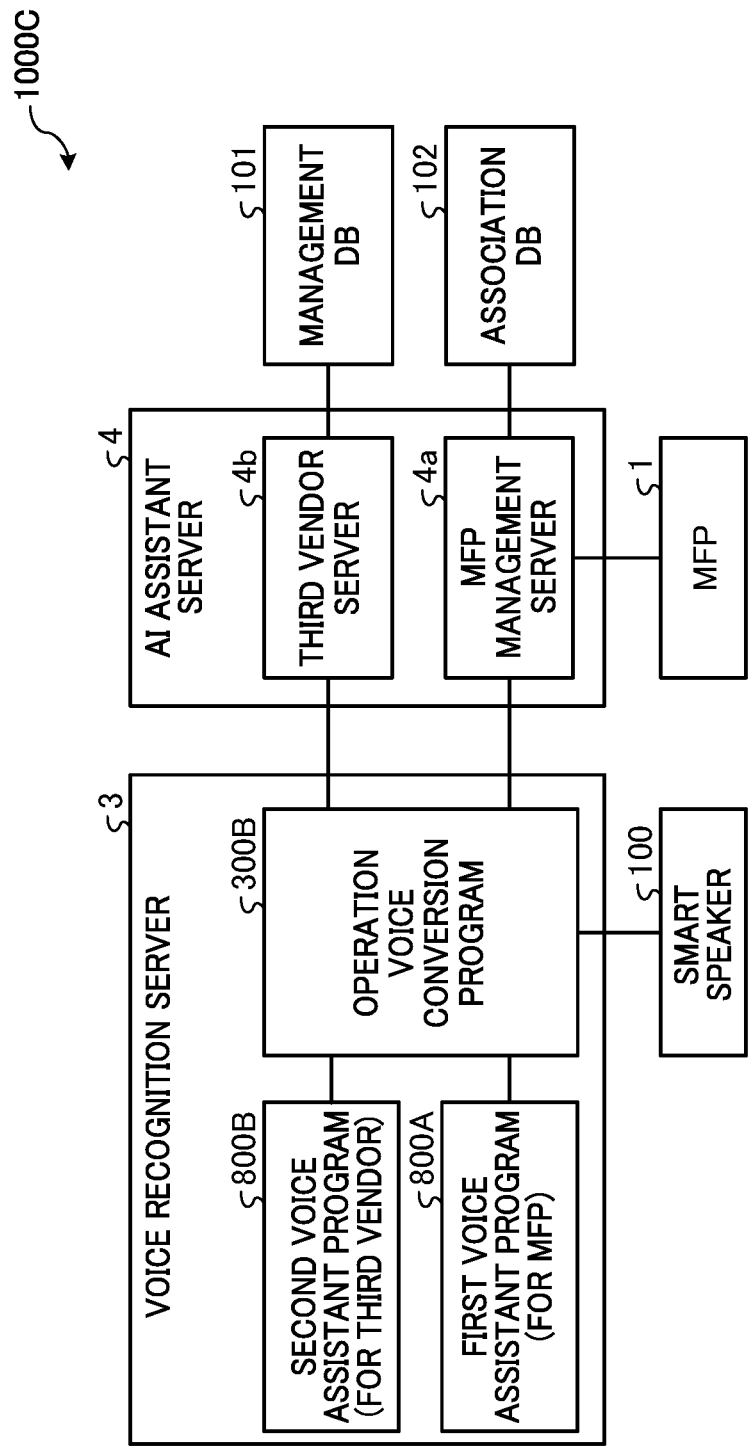
FIG. 37 is a system configuration diagram of a voice operation system of the third embodiment.

FIG. 36 is a diagram illustrating an overview of the voice operation of the third embodiment. FIG. 37 is a diagram illustrating a system configuration of a voice operation system 1000C of the third embodiment. As illustrated in FIG. 37, in the third embodiment, the voice recognition server 3 is installed with a first voice assistant program 800A for the MFP 1 (i.e., for general purposes). The third vendor installs, in the voice recognition server 3, a second voice assistant program 800B for the third vendor, which is developed by the third vendor. Further, in the third embodiment, the AI assistant server 4 includes an MFP management server 4a (i.e., a management server for general purposes, an example of second circuitry) and a third vendor server 4b (an example of first circuitry).

In the thus-configured voice operation system 1000C of the third embodiment, when the voice input is performed with the smart speaker 100 provided by the third vendor (e.g., the first smart speaker 100 in FIG. 36), audio data of the input voice is transmitted to the voice recognition server 3. The voice recognition server 3 starts the second voice assistant program 800B installed by the third vendor. Based on the second voice assistant program 800B for the third vendor, the CPU 31 of the voice recognition server 3 converts the audio data received from the smart speaker 100 of the third vendor into text data, and interprets the text data. Then, the CPU 31 of the voice recognition server 3 transmits the interpretation result to the AI assistant server 4 together with the device ID of the smart speaker 100 of the third vendor.

When the third vendor server 4b of the AI assistant server 4 accesses the MFP management server 4a for the first time, the third vendor server 4b requests the MFP management server 4a to register the device ID of the smart speaker 100 used by the third vendor. The MFP management server 4a registers, in the association DB 102, the device ID of the smart speaker 100 of the third vendor and the apparatus ID of the MFP 1 allowed to be used by the third vendor (e.g., the first MFP 1 in FIG. 36) such that the device ID and the apparatus ID are associated with each other. Therefore, the third vendor is capable of executing the voice operation of the MFP 1 with the second voice assistant program 800B developed by the third vendor.

That is, when the third vendor executes the voice input via the smart speaker 100, the audio data of the input voice is transmitted to the voice recognition server 3. Based on the second voice assistant program 800B installed by the third vendor, the CPU 31 of the voice recognition server 3 converts the audio data received from the smart speaker 100 of the third vendor into text data, and interprets the text data. Then, the CPU 31 of the voice recognition server 3 transmits the interpretation result to the AI assistant server 4 together with the device ID of the smart speaker 100 of the third vendor.

The third vendor server 4b of the AI assistant server 4 transfers the interpretation result to the MFP management server 4a together with the device ID of the smart speaker 100 of the third vendor. The MFP management server 4a refers to the association DB 102 based on the device ID of the smart speaker 100 of the third vendor, and thereby detects the MFP 1 allowed to be used by the third vendor. The MFP management server 4*a* then converts the interpretation result of the audio data from the smart speaker 100 of the third vendor into information in a format processable by the MFP 1, and transmits the information to the MFP 1 detected from the association DB 102, to thereby request the MFP 1 to execute a job.

Thereby, the voice operation of the MFP 1 is executed with the second voice assistant program 800B for the third vendor developed by the third vendor. Consequently, the third vendor is able to develop the second voice assistant program 800B as a part of the voice operation system 1000C. Further, data from the third vendor is transmitted to the MFP management server 4*a* via the third vendor server 4*b* of the AI assistant server 4, and the MFP management server 4*a* controls the MFP 1 based on the data from the third vendor. Accordingly, the third vendor indirectly executes the voice operation of the MFP 1, thereby maintaining the security of the voice operation system 1000C.

Modified examples of the third embodiment will be described.

In the above-described example, the third vendor server 4*b* of the AI assistant server 4 transmits the data from the third vendor to the MFP 1 via the MFP management server 4*a*. That is, the third vendor performs indirect operation control. Alternatively, the third vendor server 4*b* may transmit to the MFP 1 the uniform resource locator (URL) of a server storing the data of the voice input from the smart speaker 100 of the third vendor, and the MFP 1 may access the server represented by the URL to acquire the data of the voice input from the smart speaker 100 of the third vendor. That is, the third vendor performs URL control. Herein, the URL is an example of the address information.

The indirect operation control and the URL control will be described below with sequence diagrams.

A first method of the indirect operation control will be described.

Figure 38:
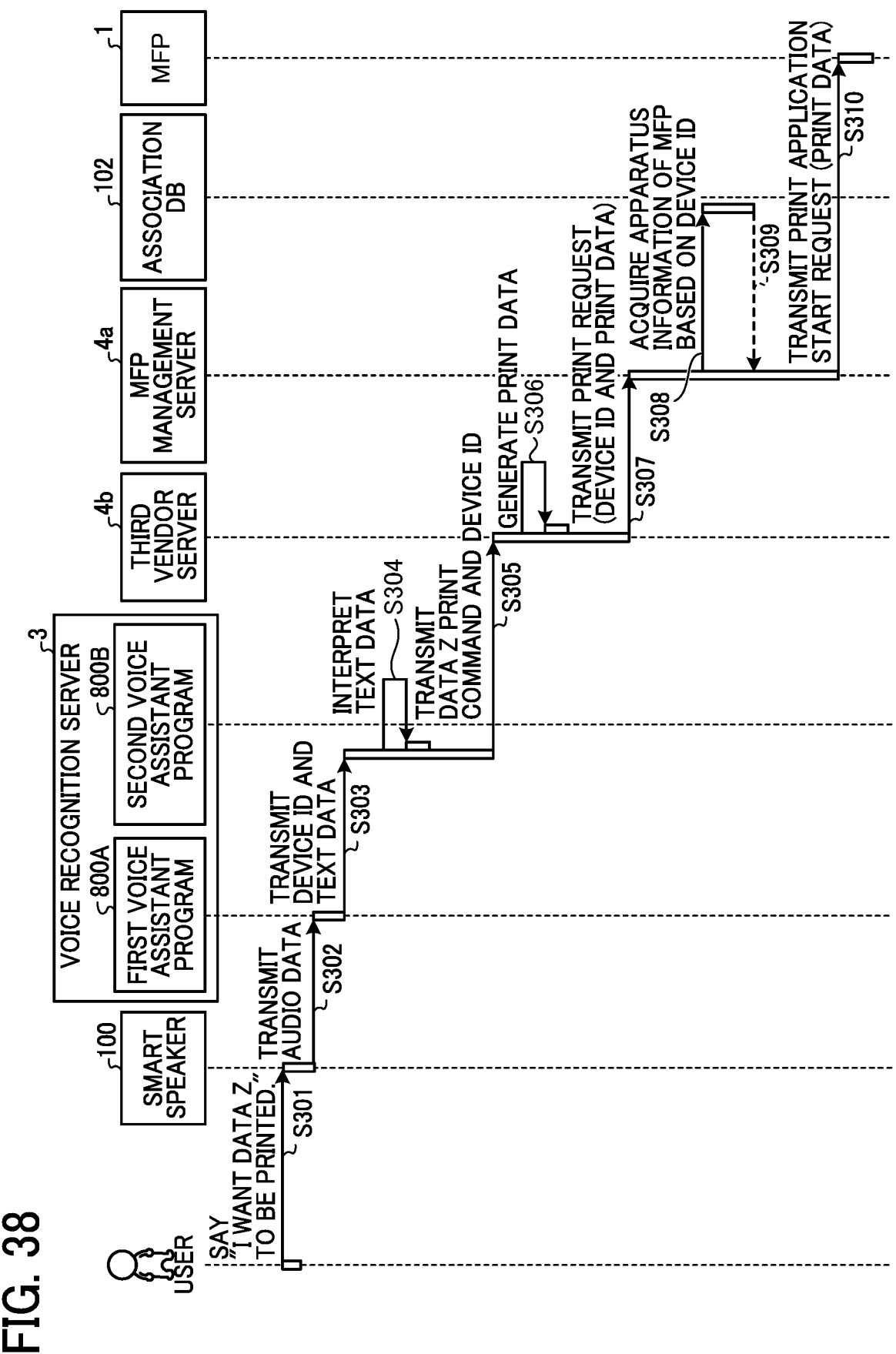
FIG. 38 is a sequence diagram illustrating a procedure of a first method of indirect operation control of the third embodiment.

FIG. 38 is a sequence diagram illustrating a procedure of the first method of the indirect operation control. In FIG. 38, when a user of the third vendor says "I want data Z to be printed" (step S301), audio data of the utterance is transmitted to the voice recognition server 3 from the smart speaker 100 (step S302). Based on the first voice assistant program 800A for the MFP 1, the CPU 31 of the voice recognition server 3 converts the audio data of the utterance from the smart speaker 100 of the third vendor into text data, and transmits the text data to the second voice assistant program 800B for the third vendor together with the device ID of the smart speaker 100 used by the third vendor (step S303).

Based on the second voice assistant program 800B for the third vendor, the CPU 31 of the voice recognition server 3 interprets the transmitted text data (step S304), and transmits to the third vendor server 4*b* of the AI assistant server 4 the result of interpretation, which includes a print command to print data Z and the device ID of the smart speaker 100 used by the third vendor (step S305).

The third vendor server 4*b* converts the print command to print data Z into print data in a data format processable by the MFP 1 (step S306), and transmits the print data to the MFP management server 4*a* together with the device ID of the smart speaker 100 used by the third vendor (step S307).

The MFP management server 4*a* refers to the association DB 102 based on the device ID of the smart speaker 100 used by the third vendor, and thereby detects the MFP 1 associated with the device ID (steps S308 and S309). The MFP management server 4*a* then transmits the print data to the detected MFP 1, and requests the MFP 1 to start a print application program (step S310). Thereby, the voice operation of the MFP 1 is executed with the second voice assistant program 800B for the third vendor developed by the third vendor.

A second method of the indirect operation control will be described.

Figure 39:
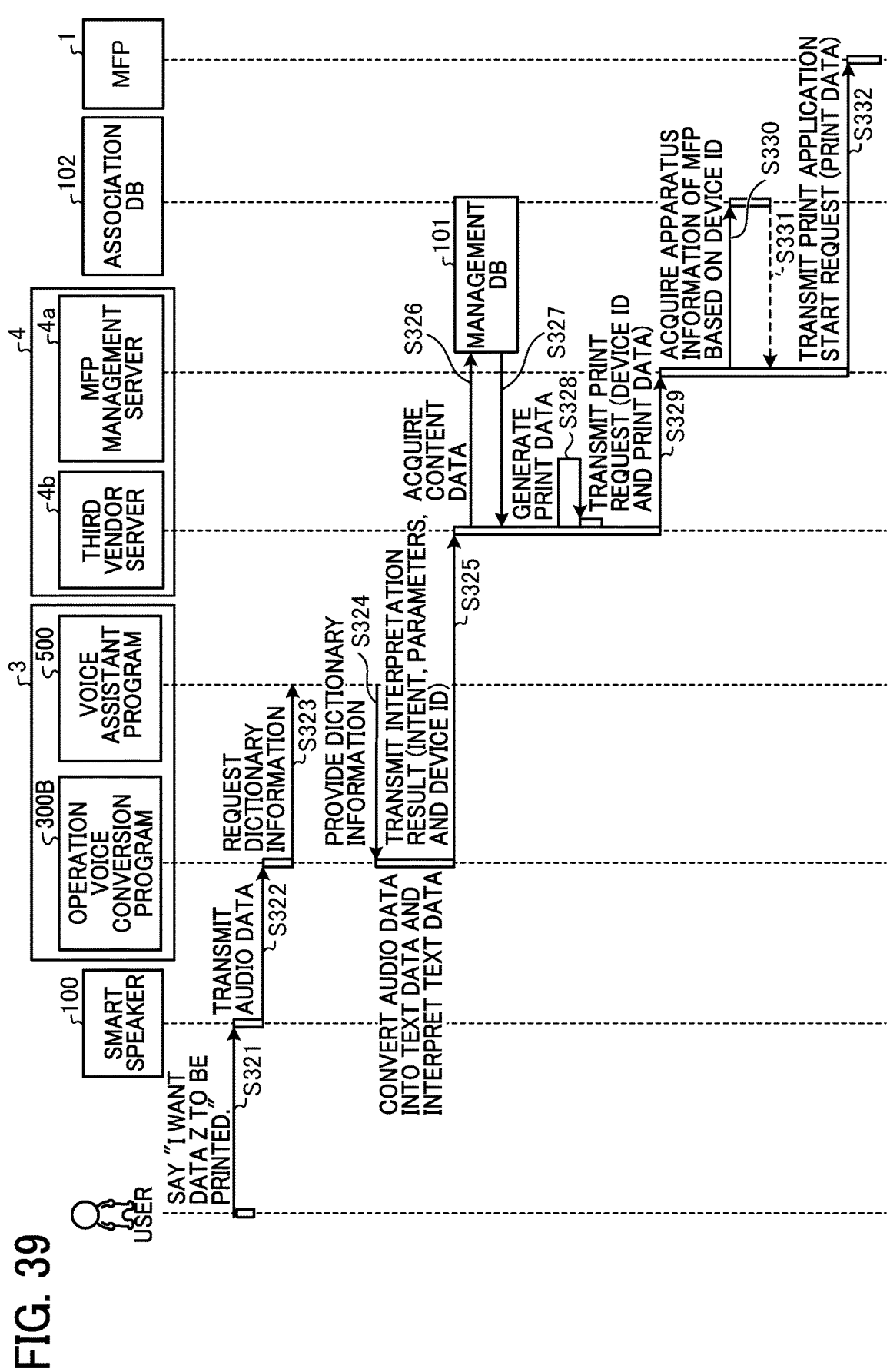
FIG. 39 is a sequence diagram illustrating a procedure of a second method of the indirect operation control of the third embodiment.

FIG. 39 is a sequence diagram illustrating a procedure of the second method of the indirect operation control. In FIG. 39, when the user of the third vendor says "I want data Z to be printed" (step S321), audio data of the utterance is transmitted to the voice recognition server 3 from the smart speaker 100 (step S322). Based on the foregoing operation voice conversion program 300B, the CPU 31 of the voice recognition server 3 converts the audio data from the smart speaker 100 of the third vendor into text data, and interprets the text data with the dictionary information (steps S323 and S324). Then, the CPU 31 of the voice recognition server 3 transmits the interpretation result including the intent and the parameters to the third vendor server 4*b* of the AI assistant server 4 together with the device ID of the smart speaker 100 used by the third vendor (step S325).

Then, the third vendor server 4*b* determines that the interpretation result including the intent and the parameters represents an operation command (e.g., a command to execute printing) to the MFP 1. The third vendor server 4*b* then invokes an application program interface (API) for a print request defined in the MFP management server 4*a* by using the device ID of the smart speaker 100 and the print data as arguments. That is, the third vendor server 4*b* acquires content data to be printed from the management DB 101 (steps S326 and S327), and thereby generates the print data (step S328).

Then, based on the generated print data, the third vendor server 4*b* transmits the print request to the MFP management server 4*a* together with the device ID of the smart speaker 100 used by the third vendor (step S329).

Based on the device ID of the smart speaker 100 used by the third vendor, the MFP management server 4*a* refers to the association DB 102 (step S330), and acquires the apparatus ID of the MFP 1 associated with the device ID (step S331). Then, the MFP management server 4*a* transmits the print data to the MFP 1, and requests the MFP 1 to start the print application program (step S332). Thereby, the voice operation by the third vendor is executed while the security of the voice operation system 1000C of the third embodiment is maintained.

A first method of the URL control will be described.

Figure 40:
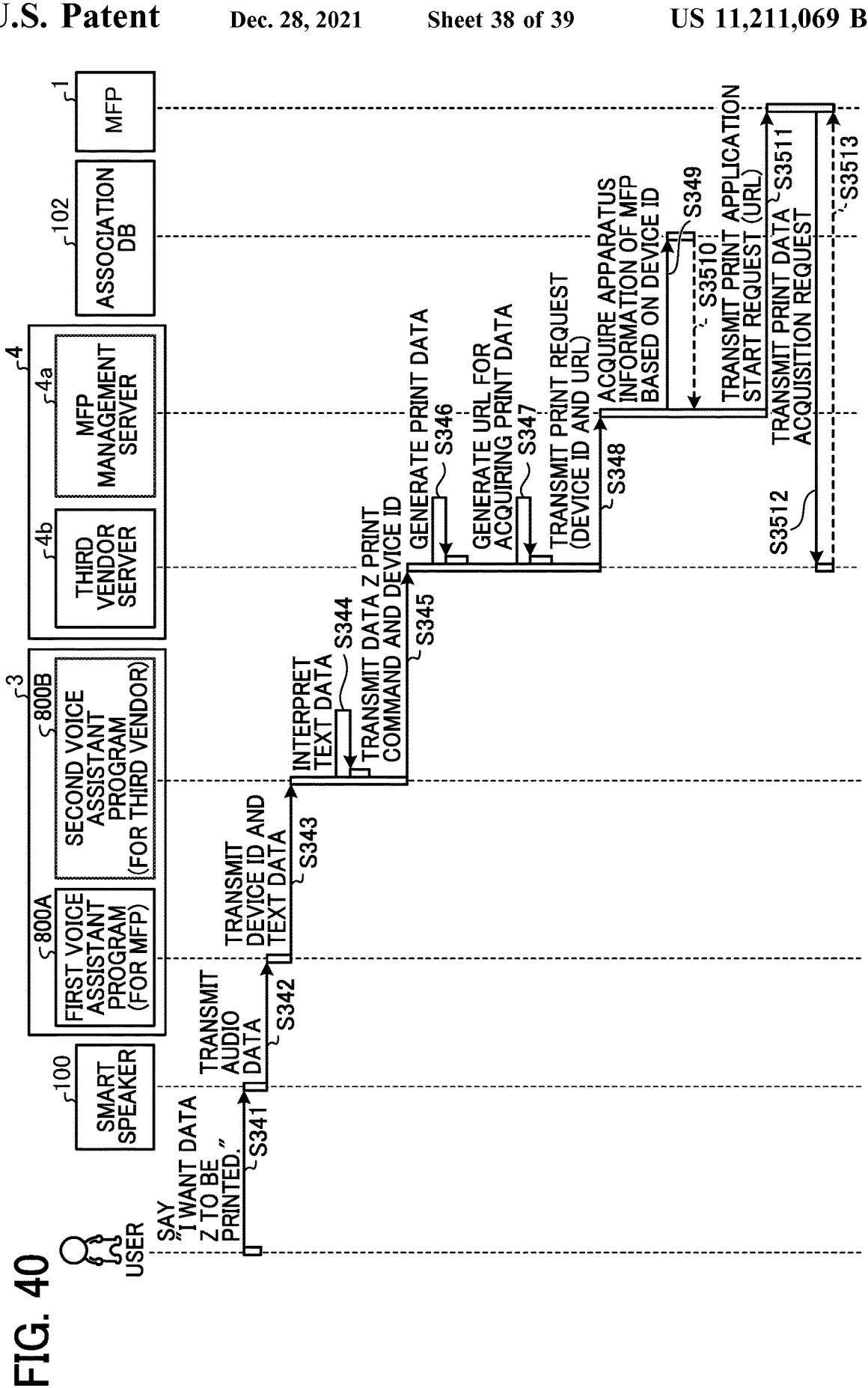
FIG. 40 is a sequence diagram illustrating a procedure of a first method of uniform resource locator (URL) control of the third embodiment.

FIG. 40 is a sequence diagram illustrating a procedure of the first method of the URL control. In FIG. 40, when the user of the third vendor says "I want data Z to be printed" (step S341), audio data of the utterance is transmitted to the voice recognition server 3 from the smart speaker 100 (step S342). Based on the first voice assistant program 800A for the MFP 1, the CPU 31 of the voice recognition server 3 converts the audio data from the smart speaker 100 of the third vendor into text data, and transmits the text data to the second voice assistant program 800B for the third vendor together with the device ID of the smart speaker 100 used by the third vendor (step S343).

Based on the second voice assistant program 800B for the third vendor, the CPU 31 of the voice recognition server 3 interprets the transmitted text data (step S344), and transmits an interpretation result, which includes the print command to print data Z and the device ID of the smart speaker 100 used by the third vendor, to the third vendor server 4b of the AI assistant server 4 (step S345).

The third vendor server 4b generates print data by converting the print command to print data Z into a data format processable by the MFP 1 (step S346), and generates a URL for acquiring the generated print data (step S347). The third vendor server 4b then transmits the URL to the MFP management server 4a together with the device ID of the smart speaker 100 used by the third vendor (step S348).

The URL for acquiring the print data is the URL of the third vendor server 4b on the network 5. Alternatively, the URL for acquiring the print data may be the URL of the management DB 101 or the URL of another server on the network 5.

Then, the MFP management server 4a refers to the association DB 102 based on the device ID of the smart speaker 100 used by the third vendor, and thereby detects the MFP 1 associated with the device ID (steps S349 and S3510). The MFP management server 4a then transmits to the detected MFP 1 the URL for acquiring the print data received from the third vendor server 4b, and requests the MFP 1 to start the print application program (step S3511).

Based on the transmitted URL, the CPU 10 of the MFP 1 accesses the third vendor server 4b, for example, to acquire the print data specified in the audio data from the smart speaker 100 of the third vendor (steps S3512 and S3513), and executes printing.

Referring back to FIG. 36, the solid line directly extending to the first MFP 1 from the third vendor server 4b indicates that the first MFP 1 accesses the third vendor server 4b based on the URL to acquire the print data therefrom and print the acquired print data. Thereby, the voice operation by the third vendor is executed while the security of the voice operation system 1000C of the third embodiment is maintained.

Although the API for executing printing has been described in the above example, other APIs for controlling the MFP 1 may be defined in the MFP management server 4a and used by the voice operation application of the third vendor. Specifically, for example, the voice operation application of the third vendor may use an API for starting a third vendor application installed in the MFP 1, an API for starting a third vendor application installed in the MFP 1 and changing the settings (e.g., job setting values), and an API for changing the settings of a third vendor application installed in the MFP 1.

A second method of the URL control will be described.

Figure 41:
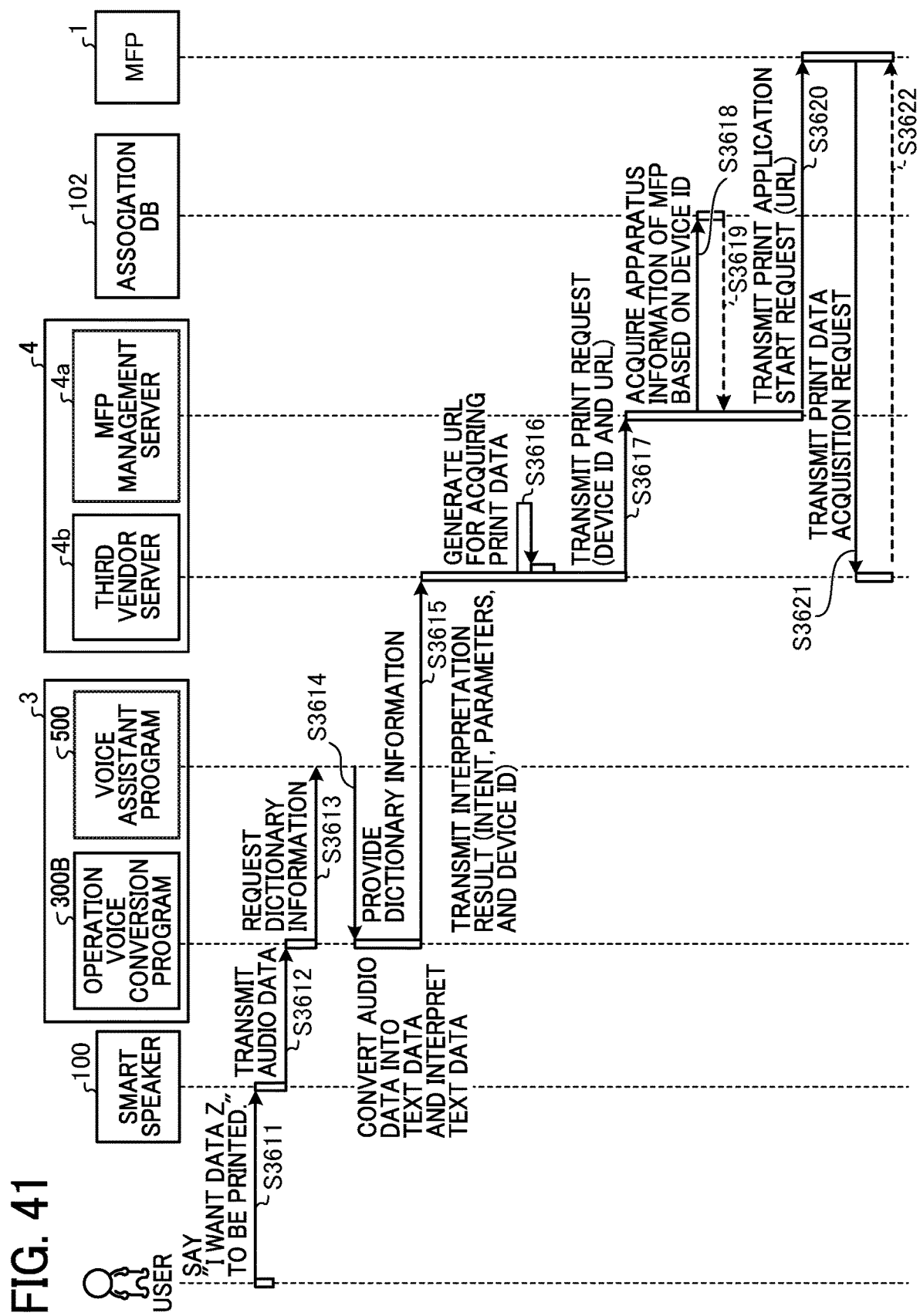
FIG. 41 is a sequence diagram illustrating a procedure of a second method of the URL control of the third embodiment.

FIG. 41 is a sequence diagram illustrating a procedure of the second method of the URL control. In FIG. 41, when the user of the third vendor says "I want data Z to be printed" (step S3611), audio data of the utterance is transmitted to the voice recognition server 3 from the smart speaker 100 (step S3612). Based on the foregoing operation voice conversion program 300B, the CPU 31 of the voice recognition server 3 converts the audio data from the smart speaker 100 of the third vendor into text data, and interprets the text data with the dictionary information (steps S3613 and S3614). Then, the CPU 31 of the voice recognition server 3 transmits the interpretation result including the intent and the parameters to the third vendor server 4b of the AI assistant server 4 together with the device ID of the smart speaker 100 used by the third vendor (step S3615).

Then, the third vendor server 4b converts the received interpretation result into print data in a data format processable by the MFP 1, and generates a URL for acquiring the print data (step S3616). As described above, this URL is the URL of the third vendor server 4b, for example. The third vendor server 4b transmits to the MFP management server 4a the device ID of the smart speaker 100 used by the third vendor together with the generated URL (step S3617).

The MFP management server 4a refers to the association DB 102 based on the device ID of the smart speaker 100 used by the third vendor (step S3618), and acquires the apparatus ID of the MFP 1 associated with the device ID (step S3619). Then, the MFP management server 4a requests the MFP 1 to start the print application program, and transmits to the MFP 1 the URL for acquiring the print data (step S3620).

Based on the transmitted URL, the CPU 10 of the MFP 1 accesses the third vendor sever 4b, for example, to acquire the print data specified in the audio data from the smart speaker 100 of the third vendor (steps S3621 and S3622), and executes printing. Thereby, the voice operation by the third vendor is executed while the security of the voice operation system 1000C of the third embodiment is maintained.

As understood from the foregoing description, in the voice operation system 1000C of the third embodiment, the MFP management server 4a of the AI assistant server 4 provides the function (i.e., API) for the third vendor to issue the MFP control command. This enables the voice operation application of the third vendor to invoke the API by specifying the device ID of the smart speaker 100 used by the third vendor, and thereby to identify the MFP 1 assigned to the smart speaker 100 of the third vendor and transmit the control command to the identified MFP 1.

That is, the voice operation system 1000C of the third embodiment enables the voice operation of the MFP 1 with the second voice assistant program 800B for the third vendor developed by the third vendor. Consequently, the third vendor is able to develop the second voice assistant program 800B as a part of the voice operation system 1000C. Further, data from the third vendor is transmitted to the MFP management server 4a via the third vendor server 4b of the AT assistant server 4. Then, the MFP management server 4a controls the MFP 1 based on the data from the third vendor. Accordingly, the third vendor indirectly executes the voice operation of the MFP 1, thereby maintaining the security of the voice operation system 1000C.

Further, when the third vendor simply specifies the print data, the MFP 1 automatically starts the print application program and acquires the print data. Consequently, the third vendor implements the print function without developing the application of the MFP 1.

Further, the MFP management server 4a notifies the MFP 1 of the URL for acquiring the print data. If the MFP management server 4a and the MFP 1 are connected to each other with a low-speed protocol or a pay-per-use system based on the communication volume, therefore, the print function is provided to the third vendor in an efficient manner in terms of the performance or the print side.

The MFP 1 may be notified of the URL of another memory other than the URL of the third vendor server 4b. It is thereby possible to operate the voice operation application of the third vendor in cooperation with a server of another third vendor or with a commonly-used cloud registration service. The voice operation system 1000C of the third embodiment further provides effects similar to those of the first and second embodiments described above.

In the first embodiment, the voice recognition server 3 generates the text data corresponding to the utterance of the user, and the AI assistant server 4 interprets the operation intended by the user based on the text data. Alternatively, the mobile terminal 2 may be provided with a voice recognition function and an interpretation function such that the mobile terminal 2 interprets the user-intended operation from the user utterance. This configuration obviates the need for the voice recognition server 3 and the AI assistant server 4, providing a simplified system configuration.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more circuits or circuitry. Circuitry includes a programmed processor, as a processor includes circuitry. A circuitry also includes devices such as an application specific integrated circuit (ASIC), digital signal processor (DSP), field programmable gate array (FPGA), and conventional circuit components arranged to perform the recited functions.

Further, the above-described steps are not limited to the order disclosed herein.

The invention claimed is:

1. An information processing system, comprising:
   first circuitry;
   second circuitry; and
   a memory accessible by the second circuitry, the memory storing, for each voice input device of a plurality of voice input devices, information associating identification information identifying the voice input device with identification information identifying an information processing apparatus,
   the first circuitry being configured to
      generate a processing command by analyzing audio data received from a particular voice input device identified by particular identification information, and
      based on the generated processing command, instruct the second circuitry to process process data, and
   the second circuitry being configured to
      generate an execution command in response to the instruction from the first circuitry,
      determine, by accessing the information stored in the memory, a particular information processing apparatus associated with the particular identification information, and
      transmit the execution command to the determined particular information processing apparatus to instruct the particular information processing apparatus to execute processing of the process data.

2. The information processing system of claim 1, wherein the first circuitry is further configured to generate the process data to be processed by the particular information processing apparatus based on the generated processing command, and transmit the generated process data to the second circuitry.

3. The information processing system of claim 2, wherein the first circuitry is further configured to generate address information representing an address on a network for acquiring the generated process data, and transmit the generated address information to the second circuitry, and
   wherein the second circuitry is further configured to transmit the generated address information to the particular information processing apparatus to instruct the particular information processing apparatus to acquire the process data based on the generated address information.

4. The information processing system of claim 1, further comprising:
   the particular voice input device configured to receive voice input; and
   the particular information processing apparatus configured to he operated based on the voice input to the particular voice input device.

5. The information processing system of claim 4, wherein the process data is print data, and
   wherein the particular information processing apparatus is an image forming apparatus.

6. The information processing system of claim 1, wherein the first circuitry and the second circuitry reside on different servers.

7. An information processing method, comprising:
   storing in a memory, for each voice input device of a plurality of voice input devices, information associating identification information identifying the voice input device with identification information identifying an information processing apparatus;
   using first circuitry, generating a processing command by analyzing audio data received from a particular voice input device identified by particular identification information;
   using the first circuitry, instructing second circuitry to process process data based on the generated processing command;
   using the second circuitry, generating an execution command in response to the instruction from the first circuitry;
   determining, by accessing the information stored in the memory, a particular information processing apparatus associated with the particular identification information; and
   using the second circuitry, transmitting the execution command to the determined particular information processing apparatus to instruct the particular information processing apparatus to execute processing of the process data.

8. The information processing method of claim 7, further comprising:
   using the first circuitry, generating the process data to be processed by the particular information processing apparatus based on the generated processing command; and
   transmitting the generated process data from the first circuitry to the second circuitry.

9. The information processing method of claim 8, further comprising.
   using the first circuitry, generating address information representing an address on a network for acquiring the generated process data;
   using the first circuitry, transmitting the generated address information to the second circuitry; and
   using the second circuitry, transmitting the generated address information to the particular information processing apparatus to instruct the particular information processing apparatus to acquire the process data based on the n ted address information.

10. A non-transitory recording medium storing a plurality of instructions which, when executed by causes the circuitry, to perform an information processing method comprising:
   storing in a memory, for each voice input device of a plurality of voice input devices, information associating identification information identifying the voice input device with identification information identifying an information processing apparatus;

generating a processing command by analyzing audio data received from a particular voice input device identified by particular identification information;

instructing second circuitry to process process data based on the generated processing command;

generating an execution command in response to the instruction;

determining, by accessing the information stored in the memory, a particular information processing apparatus associated with the particular identification information; and transmitting the execution command to the determined particular information processing apparatus to instruct the particular information processing apparatus to execute processing of the process data.

11. The non-transitory recording medium of claim 10, wherein the information processing method further comprises:

generating the process data to be processed by the particular information processing apparatus based on the generated processing command.

12. The non-transitory recording medium of claim 11, wherein the information processing method further comprises:

generating address information representing an address on a network for acquiring the generated process data; and transmitting the generated address information to the particular information processing apparatus to instruct the particular information processing apparatus to acquire the process data based on the generated address information.

13. The information processing system of claim 1, wherein the first circuitry is further configured to convert the received audio data into text data, and the second circuitry is further configured to interpret the text data.

14. The information processing system of claim 1, wherein the memory stores, for each voice input device, the identification information identifying the voice input device in association with the identification information identifying the information processing apparatus, the information processing apparatus being a particular information process apparatus permitted to be operated by the voice input device.

15. The information processing method of claim 7, wherein the storing comprises storing in the memory, for each voice input device, the identification information identifying the voice input device in association with the identification information identifying the information processing apparatus, the information processing apparatus being a particular information process apparatus permitted to be operated by the voice input device.

16. The recording medium of claim 10, wherein the storing comprises storing in the memory, for each voice input device, the identification information identifying the voice input device in association with the identification information identifying the information processing apparatus, the information processing apparatus being a particular information process apparatus permitted to be operated by the voice input device.

* * * * *